United States Patent
Hagiwara et al.

(10) Patent No.: US 6,871,259 B2
(45) Date of Patent: Mar. 22, 2005

(54) FILE SYSTEM INCLUDING NON-VOLATILE SEMICONDUCTOR MEMORY DEVICE HAVING A PLURALITY OF BANKS

(75) Inventors: Masato Hagiwara, Hyogo (JP); Mamoru Sakamoto, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 286 days.

(21) Appl. No.: 10/166,636

(22) Filed: Jun. 12, 2002

(65) Prior Publication Data

US 2003/0110343 A1 Jun. 12, 2003

(30) Foreign Application Priority Data

Dec. 11, 2001 (JP) ........................................ 2001-377610

(51) Int. Cl.[7] ............................................. G06F 12/00
(52) U.S. Cl. ......................... 711/103; 711/5; 711/100; 711/117; 711/118; 711/141; 711/144; 365/185.11; 365/185.29; 717/168; 717/169; 717/170; 717/171; 717/172; 717/173
(58) Field of Search ............................ 711/5, 100, 103, 711/117–118, 141, 144; 365/185.11, 185.29; 717/168–173

(56) References Cited

U.S. PATENT DOCUMENTS

| 5,404,485 A | * | 4/1995 | Ban | 711/202 |
|---|---|---|---|---|
| 5,551,002 A | * | 8/1996 | Rosich et al. | 711/134 |
| 5,845,313 A | * | 12/1998 | Estakhri et al. | 711/103 |
| 6,212,097 B1 | * | 4/2001 | Kihara et al. | 365/185.04 |
| 6,721,843 B1 | * | 4/2004 | Estakhri | 711/103 |
| 2002/0184436 A1 | * | 12/2002 | Kim et al. | 711/103 |

FOREIGN PATENT DOCUMENTS

JP    2001-51889    2/2001

OTHER PUBLICATIONS

Kim et al., Oct. 27–29, 1999, IEEE COMPSAC 99, pp. 284–289.*

* cited by examiner

Primary Examiner—Nasser Moazzami
Assistant Examiner—Hashem Farrokh
(74) Attorney, Agent, or Firm—McDermott Will & Emery LLP

(57) ABSTRACT

A flash memory includes a data bank having a plurality of banks, a merge bank, and an update data bank. A file system using the flash memory includes a unit storing update data corresponding to a data rewrite command into the update data bank, a unit selecting the latest update data for each block from update data stored in the update data bank when the update data bank becomes full, and a processing unit processing the latest update data. The processing unit includes a unit storing latest update data into a merge bank, a unit selecting data associated with the latest update data from the data bank to store the selected data into the merge bank, and a unit setting the merge bank as a new data bank.

15 Claims, 63 Drawing Sheets

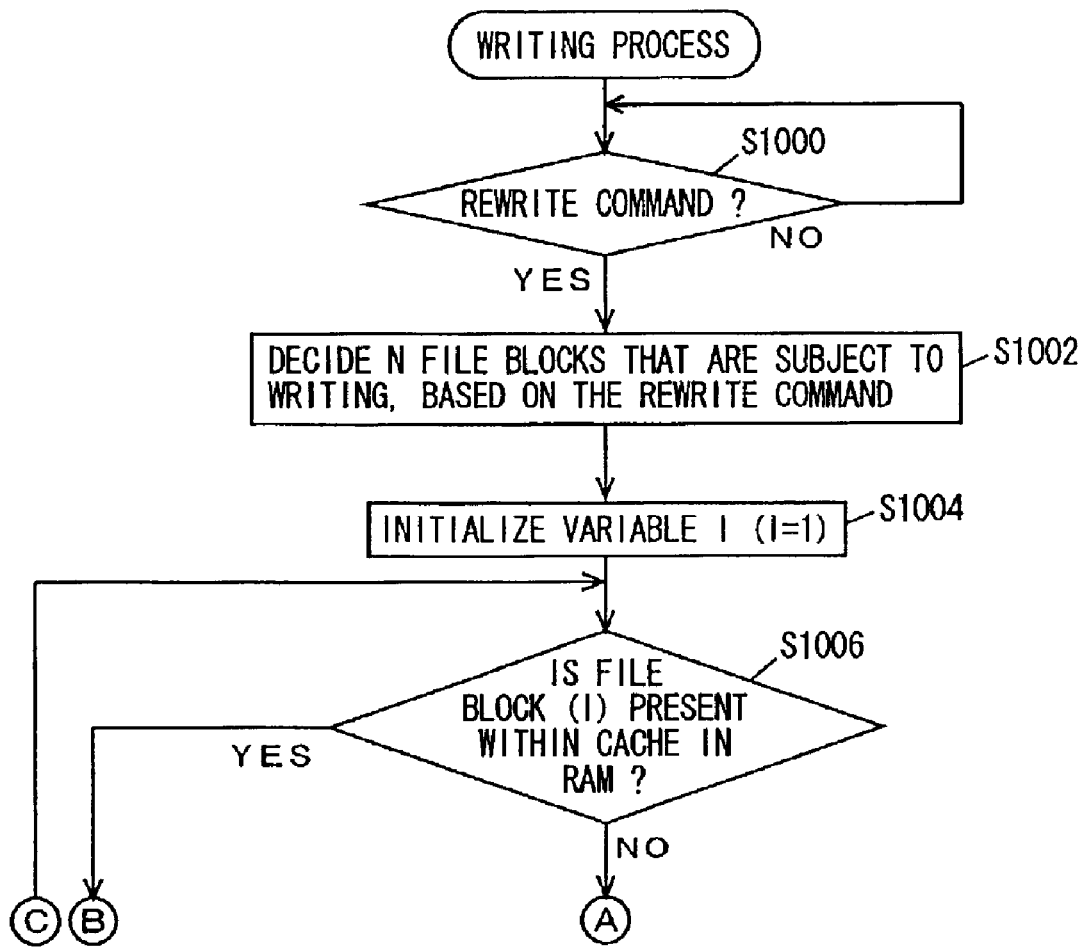
F I G. 1 2 A

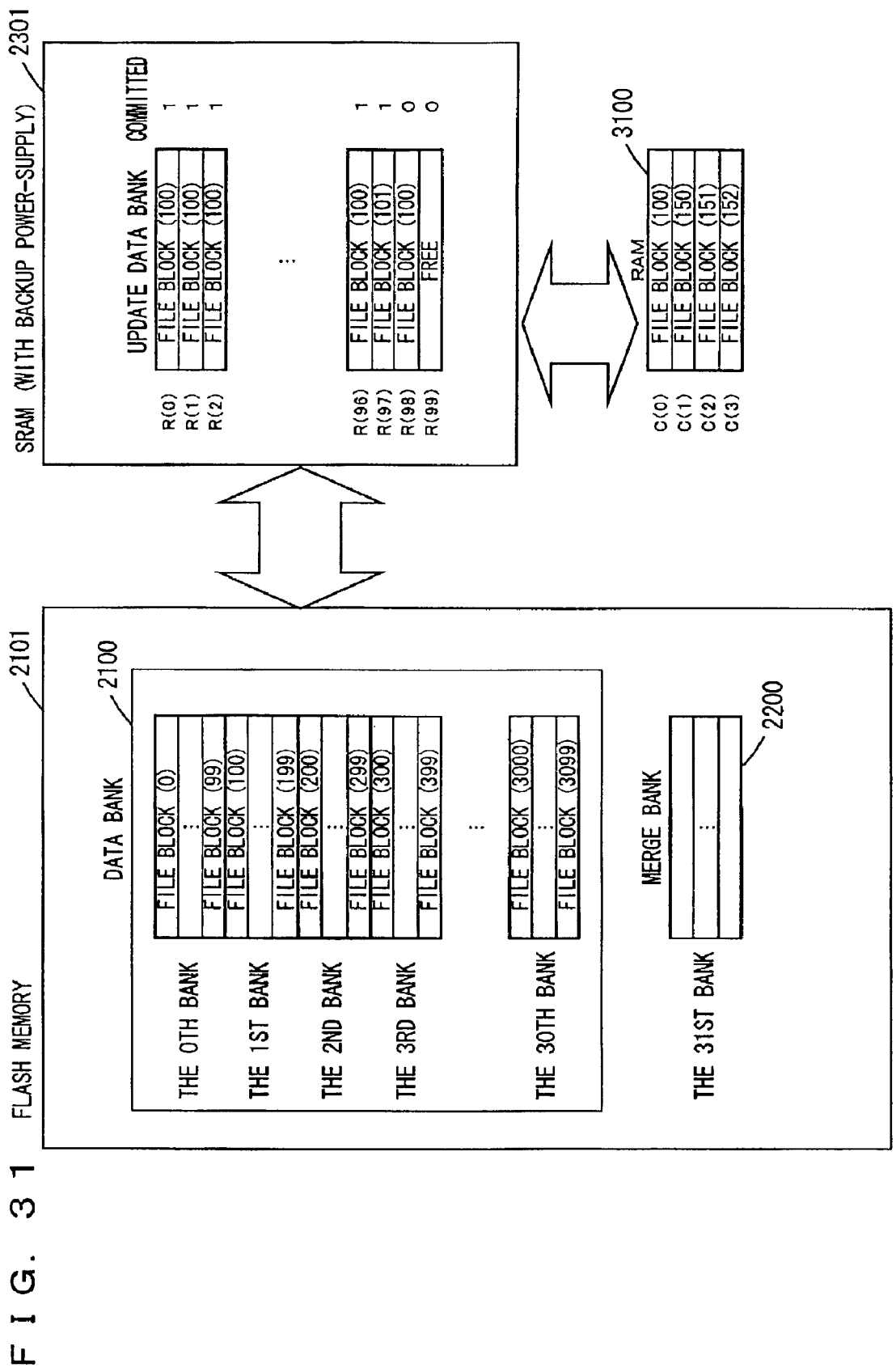

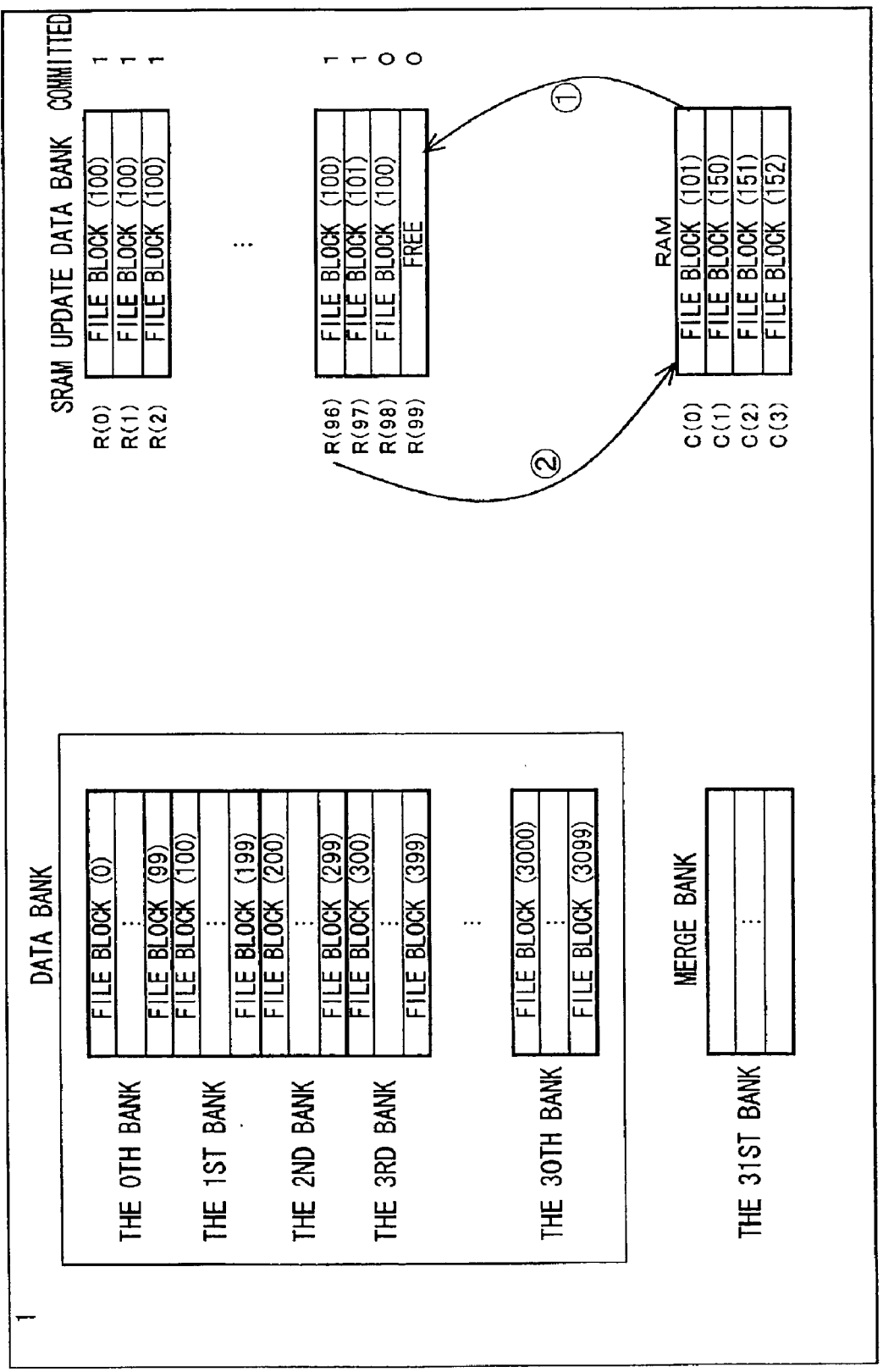
F I G. 34

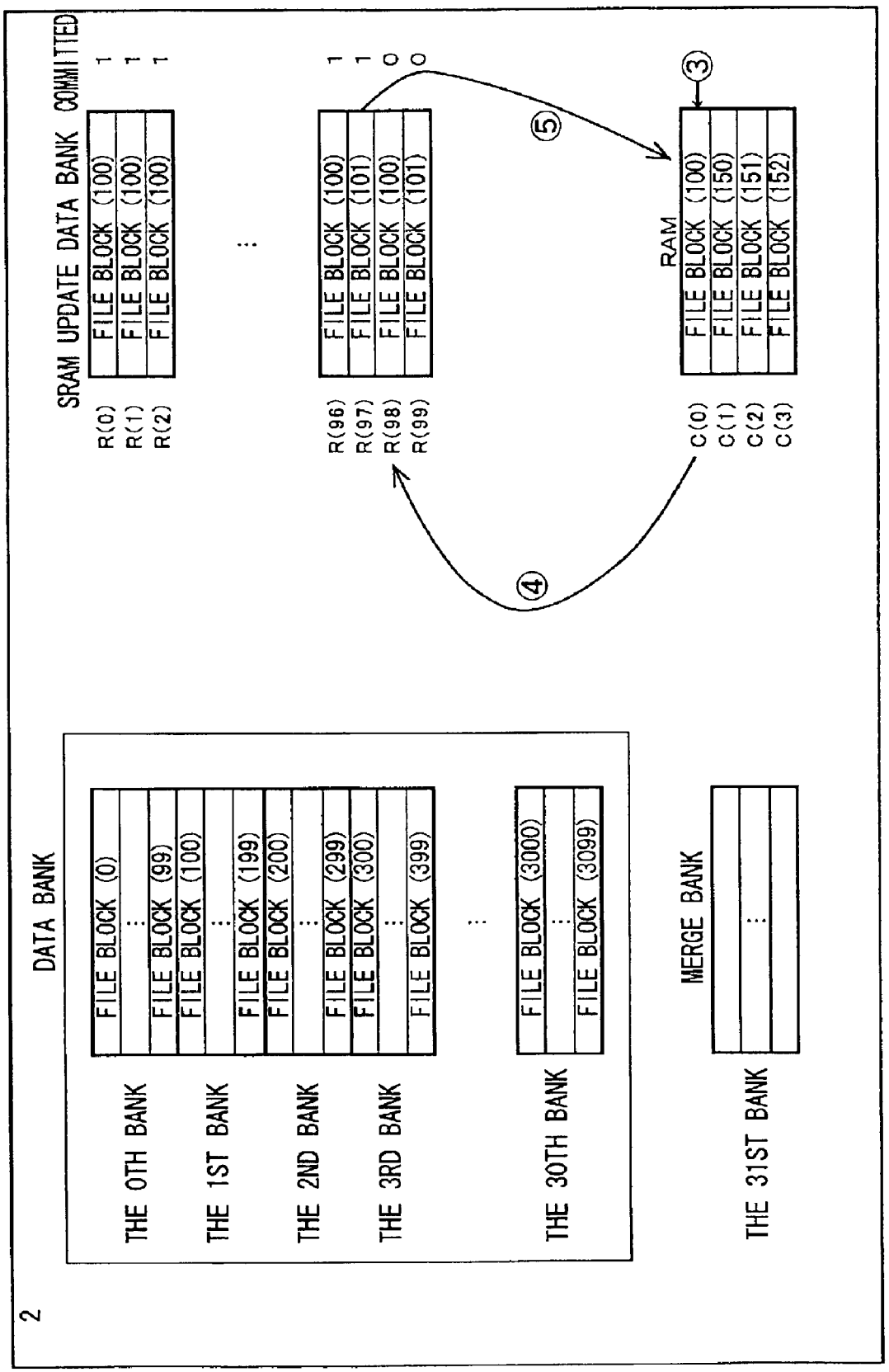
F I G. 35

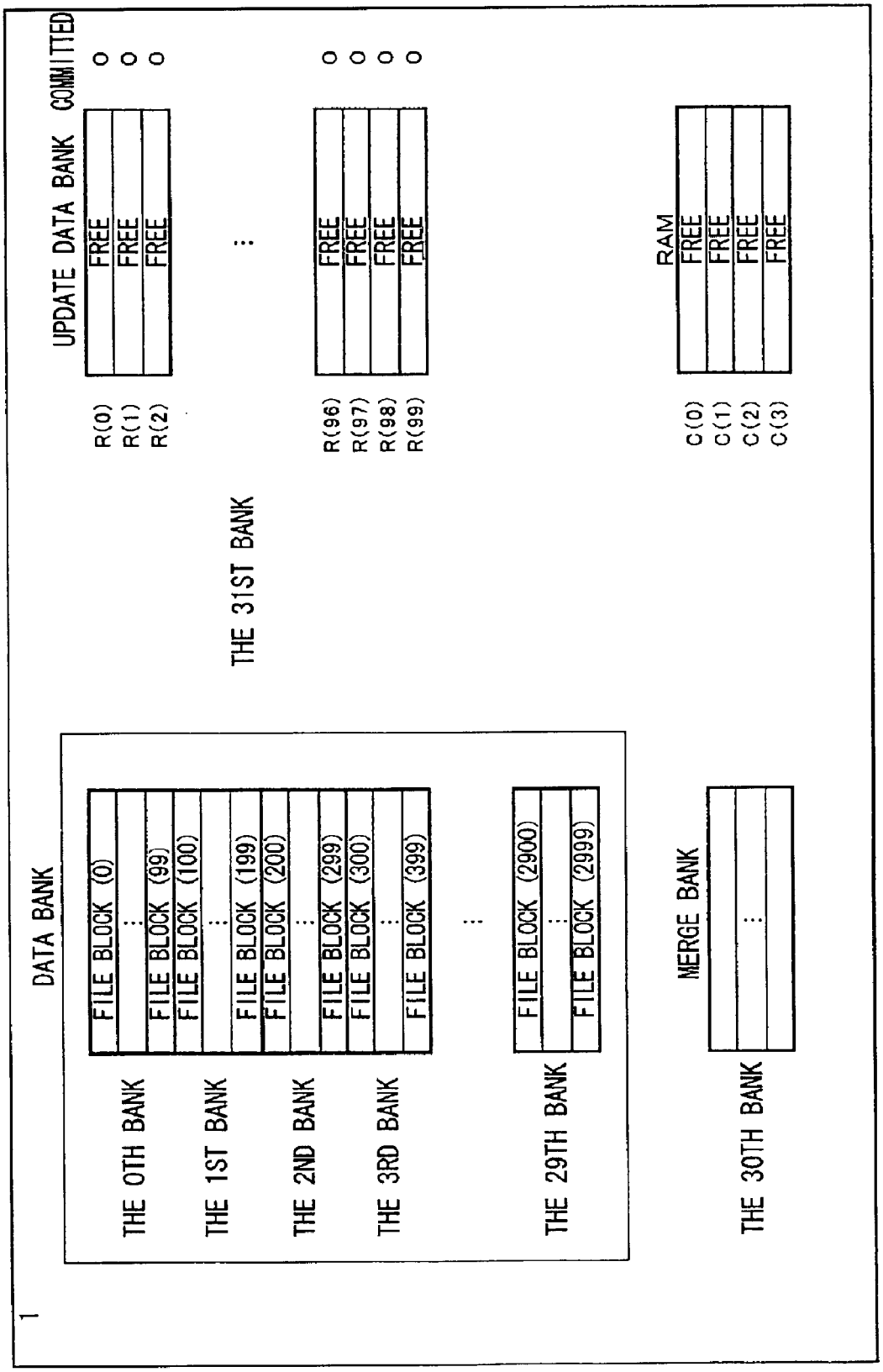
F I G. 40

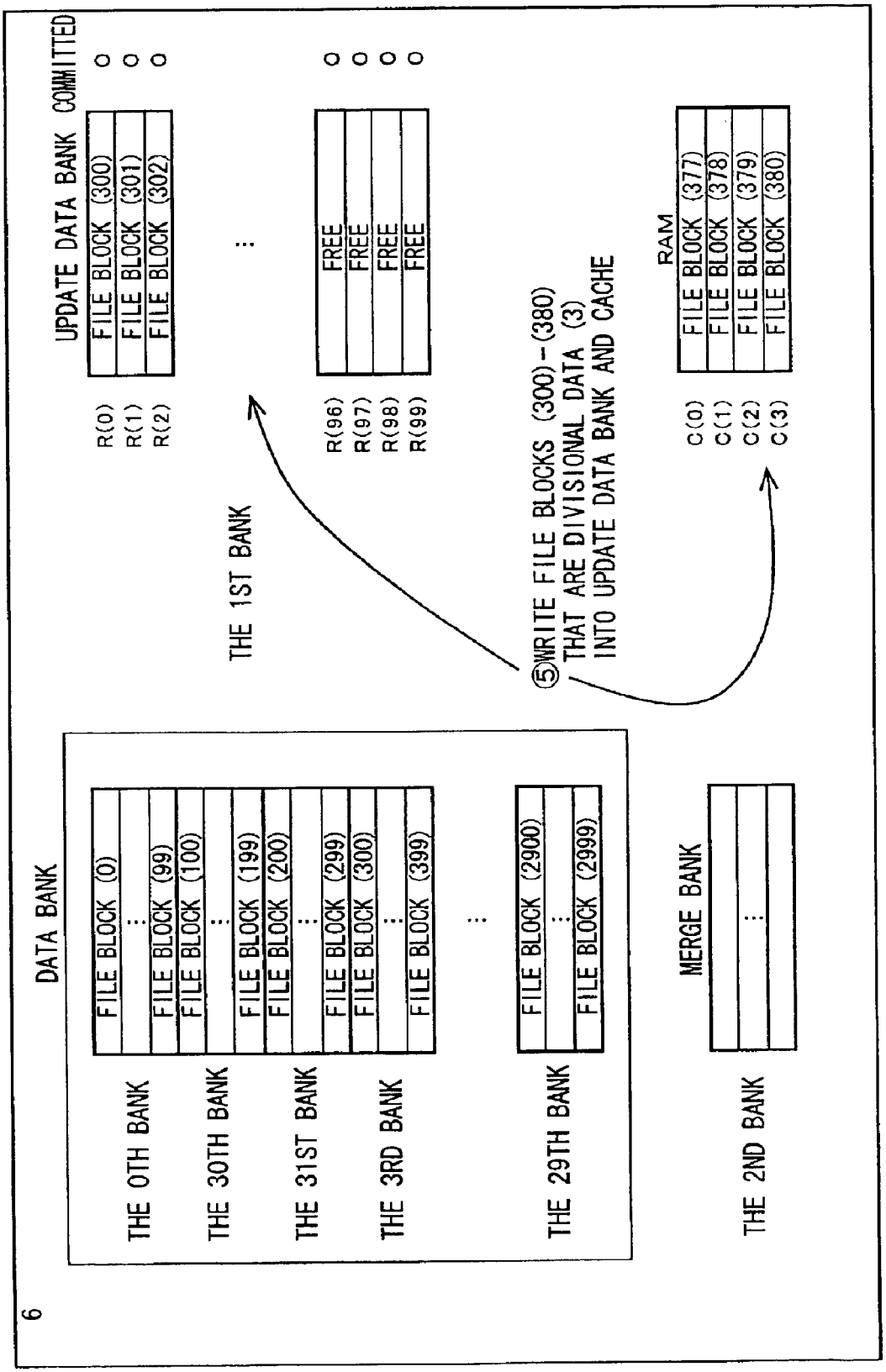

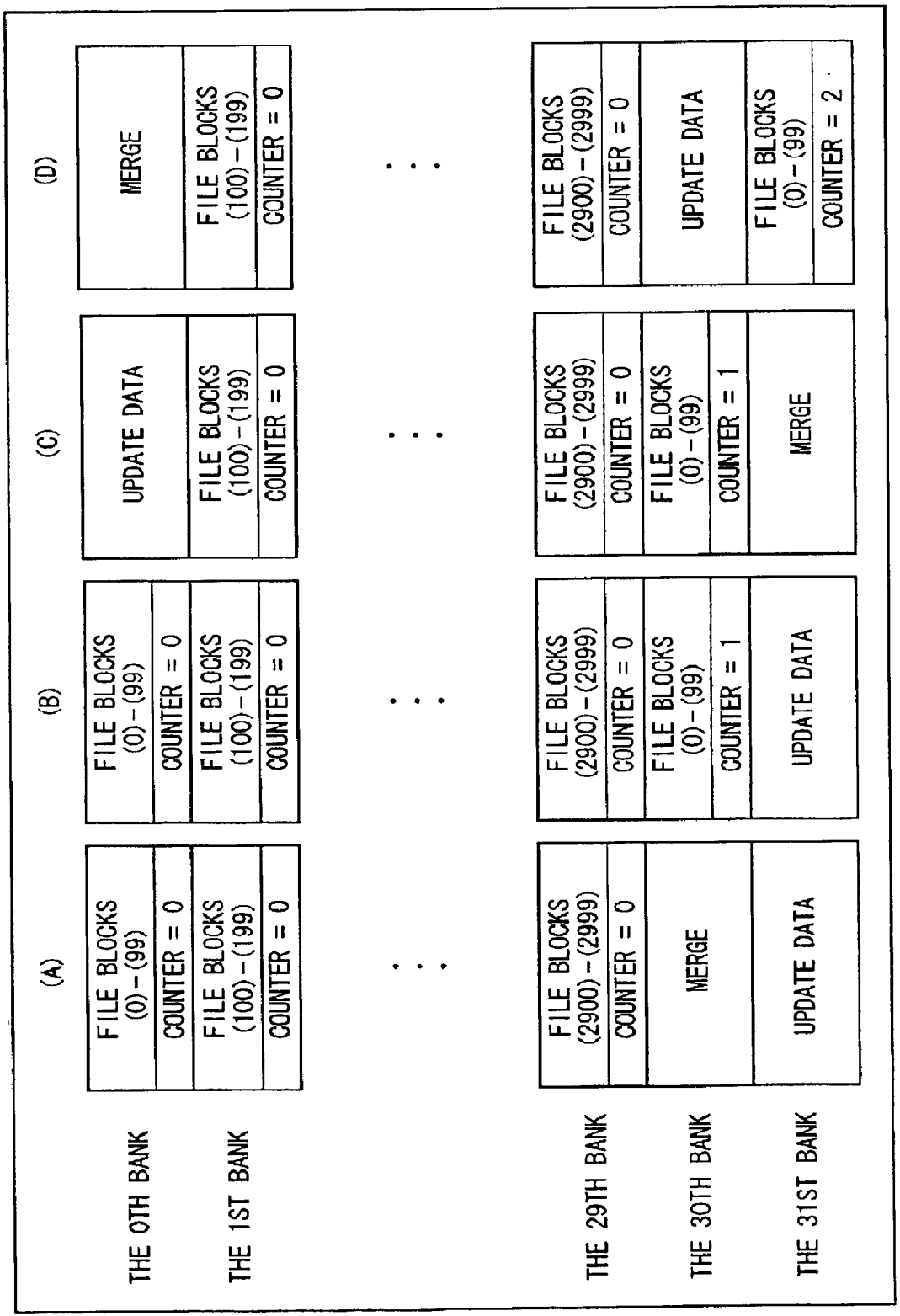

FILE SYSTEM INCLUDING NON-VOLATILE SEMICONDUCTOR MEMORY DEVICE HAVING A PLURALITY OF BANKS

BACKGROUND OF THE INVENTION

1. Field of the Invention

The present invention relates to a file system of a computer system, and particularly to a file system using a non-volatile semiconductor memory device such as a flash memory or the like.

2. Description of the Related Art

A flash memory is a type of an EEPROM (Electrically Erasable and Programmable ROM) which can be rewritten electrically, and has such characteristics that it is less expensive than a DRAM (Dynamic Random Access Memory), a backup power supply is unnecessary, the change of bits is irreversible, data is erased bank by bank, erasure of a bank requires time, and the number of bank erasures is limited.

The flash memory having such characteristics is widely used as a data storage device in equipment such as a mobile phone, a PDA (Personal Digital Assistant), a digital still camera and the like. In such equipment, varieties of data to be stored have increased, leading to frequent operations such as saving, deleting and moving of data, so that a file system operating on the flash memory is required. The flash memory has such a characteristic that the change of bits is irreversible, i.e., the change from bit 1 to 0 is possible whereas the inverse change of bit 0 to 1 is limited. This raises a problem as described below when a file system is constructed on the flash memory. Everytime the contents of a file are changed, a corresponding bank must be erased for the changed contents to be written thereto. A memory related to the present invention will be described with reference to the drawings.

FIG. 1 shows the structure of a memory related to the present invention. As shown in FIG. 1, a memory 122 includes a flash memory 200 and a RAM 300. Flash memory 200 includes thirty-one data banks 210 and one merge bank. One bank includes a hundred file blocks. RAM 300 includes one file block as a cache memory. When a rewrite command is executed for a file, data to be written into the file is written into RAM 300 which is a cache memory, and thereafter flash memory 200 is accessed for the data to be written into a prescribed file block.

Referring to FIGS. 2 to 6, the operation of the memory will be described. In the description below, it is assumed that data is written into file blocks in the order of a file block (100), a file block (210), a file block (250), a file block (300) and a file block (301). The operation proceeds in the ascending order of circled numbers in the drawings. The numbers indicated at the head of each paragraph below corresponds to each of the circled numbers.

1) The 31st bank which is a merge bank 220 is in an initial state (all bits are 1), while the first file block (100) that is the subject of writing (such a file block is hereinafter referred to as "target file block") is copied from the first bank in data bank 210 within flash memory 200 to an entry C (0) of RAM 300.

2) The data of file block (100) that was copied to entry C (0) of RAM 300 is updated.

3) File block (100) at entry C (O) of RAM 300 is copied to the 31st bank which is merge bank 220.

4) From the first bank in data bank 210, file blocks other than file block (100) are copied to the 31st bank which is merge bank 220.

5) The first bank is erased to be in the initial state and is newly set as merge bank 220. New file blocks (100) to (199) including the updated file block (100) are stored in the 31st bank.

6) The first bank which is merge bank 220 is in the initial state, while the second target file block (210) is copied from the second bank in data bank 210 within flash memory 200 to entry C (0) of RAM 300.

7) The data of file block (210) that was copied to entry C (0) of RAM 300 is updated.

8) File block (210) at entry C (0) of RAM 300 is copied to the first bank which is merge bank 220.

9) From the second bank in data bank 210, file blocks other than file block (210) is copied to the first bank which is merge bank 220.

10) The second bank is erased to be in the initial state, and is newly set as merge bank 220. New file blocks (200) to (299) including the updated file block (210) are stored in the first bank.

11) The second bank which is merge bank 220 is in the initial state, while the third target file block (250) is copied from the second bank of data bank 210 in flash memory 200 to entry C (0) of RAM 300.

12) The data of file block (250) that was copied to entry C (0) of RAM 300 is updated.

13) File block (250) at entry C (0) of RAM 300 is copied to the second bank which is merge bank 220.

14) From the first bank in data bank 210, file blocks other than file block (250) are copied to the second bank which is merge bank 220.

15) The first bank is erased to be in the initial state, and is newly set as merge bank 220. New file blocks (200) to (299) including the updated file block (250) are stored in the second bank.

16) The first bank which is merge bank 220 is in the initial state, while the fourth target file block (300) is copied from the third bank of data bank 210 in flash memory 200 to entry C (0) of RAM 300.

17) The data of file block (300) that was copied to entry C (0) of RAM 300 is updated.

18) File block (300) at entry C (0) of RAM 300 is copied to the first bank which is merge bank 220.

19) From the third bank in data bank 210, file blocks other than file block (300) are copied to the first bank which is merge bank 220.

20) The third bank is erased to be in the initial state, and is newly set as new merge bank 220. New file blocks (300) to (399) including the updated file block (300) are stored in the first bank.

21) The third bank which is merge bank 220 is in the initial state, while the fifth target block (301) is copied from the first bank of data bank 210 in flash memory 200 to entry C (0) of RAM 300.

22) The data of file block (301) that was copied to entry C (0) of RAM 300 is updated.

23) File block (301) at entry C (0) of RAM 300 is copied to the third bank which is merge bank 220.

24) From the first bank in data bank 210, file blocks other than file block (301) are copied to the third bank which is merge bank 220.

25) The first bank is erased to be in the initial state, and is newly set as merge bank 220. New file blocks (300) to (399) including the updated file block (301) are stored in the third bank.

Thus, in order to update five file blocks, banks must be erased five times. As described earlier, a large amount of time is required for such erasure by the bank, and there is a certain limit for the number of erasures.

However, in the conventional file system, bank erasure frequently occurs, lowering operation speed and shortening lifetime of the flash memory. Moreover, in the conventional file system, if the power is shut off or reset with unexpected timing, the entire file system may be destroyed and hence become unworkable without reformat. If this happens, the stored data will be lost.

SUMMARY OF THE INVENTION

An object of the present invention is to provide a file system including a non-volatile semiconductor memory device, which can be executed at high speed.

Another object of the present invention is to provide a file system including a non-volatile semiconductor memory device, which has a long operation life.

A further object of the present invention is to provide a file system including a non-volatile semiconductor memory device, which can back up data even if unexpected power shut-off occur.

A yet further object of the present invention is to provide a file system including a non-volatile semiconductor memory device, which has a long operation life by averaging the number of erasures for each bank in the non-volatile semiconductor memory device.

A still further object of the present invention is to provide a file system including a non-volatile semiconductor memory device, which has a long operation life by making the number of bank erasures as small as possible in the non-volatile semiconductor memory device.

According to an aspect of the present invention, a file system includes a non-volatile semiconductor memory device having a plurality of banks. Each of the banks includes a plurality of blocks. The non-volatile semiconductor memory device is erasable by the bank. The plurality of banks are divided into at least one update data bank, at least one merge bank and a data bank. The file system includes an update data storage unit to store update data corresponding to a data rewrite command into the update data bank; a latest data selection unit to select, when a predetermined first condition is satisfied, latest update data for each block from the update data stored in the update data bank; and a processing unit to process the selected latest update data. The processing unit includes a first merge data storage unit to store the selected latest update data into a first block in the merge bank, an associated data selection unit to select data associated with the latest update data from the data bank, a second merge data storage unit to store the selected data into a second block in the merge bank, and a setting unit to set the merge bank storing the latest update data and the data associated with the latest update data as a new data bank.

According to another aspect of the present invention, a file system includes a non-volatile semiconductor memory device having a plurality of banks and a volatile semiconductor memory device having a backup function. The volatile semiconductor device includes at least one update data bank. Each of the banks includes a plurality of blocks. The non-volatile semiconductor memory device is erasable by the bank. The plurality of banks in the non-volatile semiconductor device are divided into at least one merge bank and a data bank. The file system includes an update data storage unit to store update data corresponding to a data rewrite command into the update data, bank; and a latest update data selection unit to select, when a predetermined first condition is satisfied, latest update data for each block, from update data stored in the plurality of blocks included in the update data bank; and a processing to process the selected latest update data. The processing unit includes a first merge data storage unit to store the selected latest update data into a first block in the merge bank, an associated data selection unit to select data associated with the latest update data from the data bank, a second merge data storage unit to store the selected data into a second block in the merge bank, and a setting unit to set a merge bank storing latest update data and the data associated with the latest update data as a new data bank.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 12A and 12B are flow charts illustrating the procedure of controlling a writing process according to the first embodiment of the present invention;

FIG. 31 shows a bank arrangement of a memory in which a file system according to the third embodiment of the present invention is implemented;

FIGS. 34 to 38 illustrate the change of contents stored in banks by a process according to the third embodiment of the present invention;

FIG. 40 illustrates an initial state of contents stored in banks by a process according to the fourth embodiment of the present invention;

FIGS. 46 to 51 illustrate the change of contents stored in banks by a process according to the fifth embodiment of the present invention;

FIG. 53 illustrates the change of contents stored in banks by a process according to the sixth embodiment of the present invention.

DESCRIPTION OF THE PREFERRED EMBODIMENTS

Figure 1:
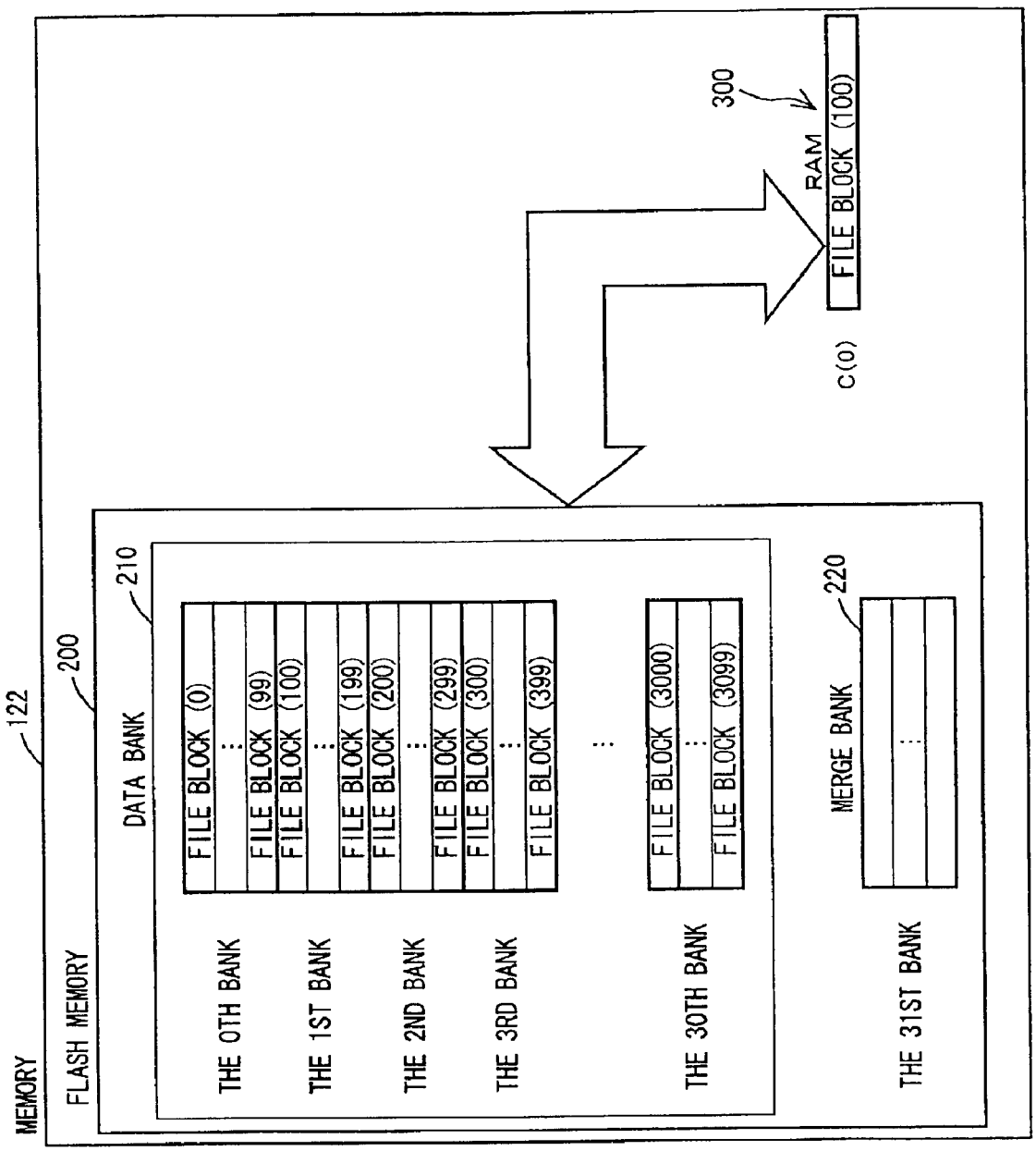
FIG. 1 is a control block diagram of a memory in which a file system related to the present invention is implemented.
Figure 2:
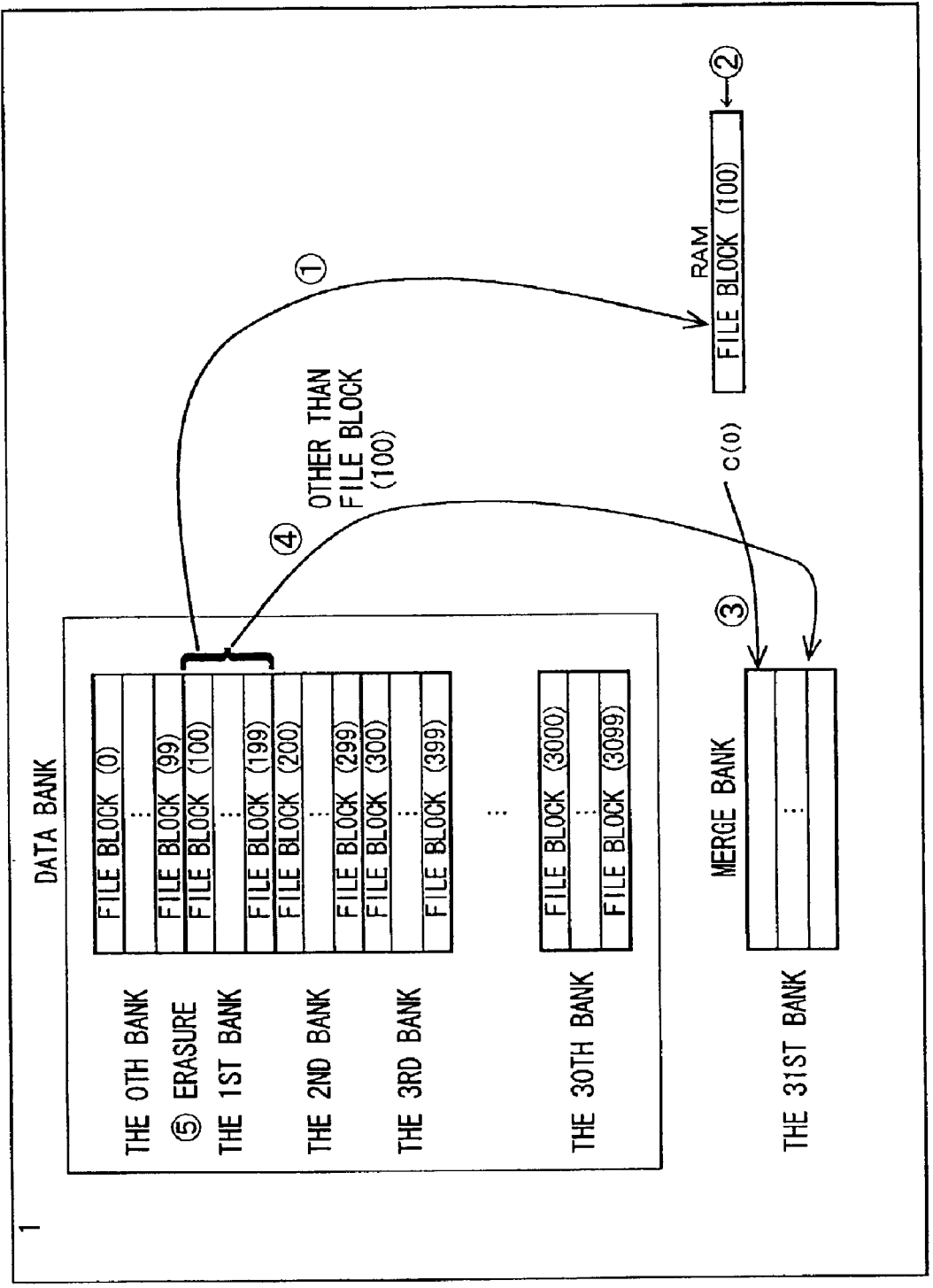
FIGS. 2 to 6 illustrate the change of contents stored in banks in the file system related to the present invention.
Figure 3:
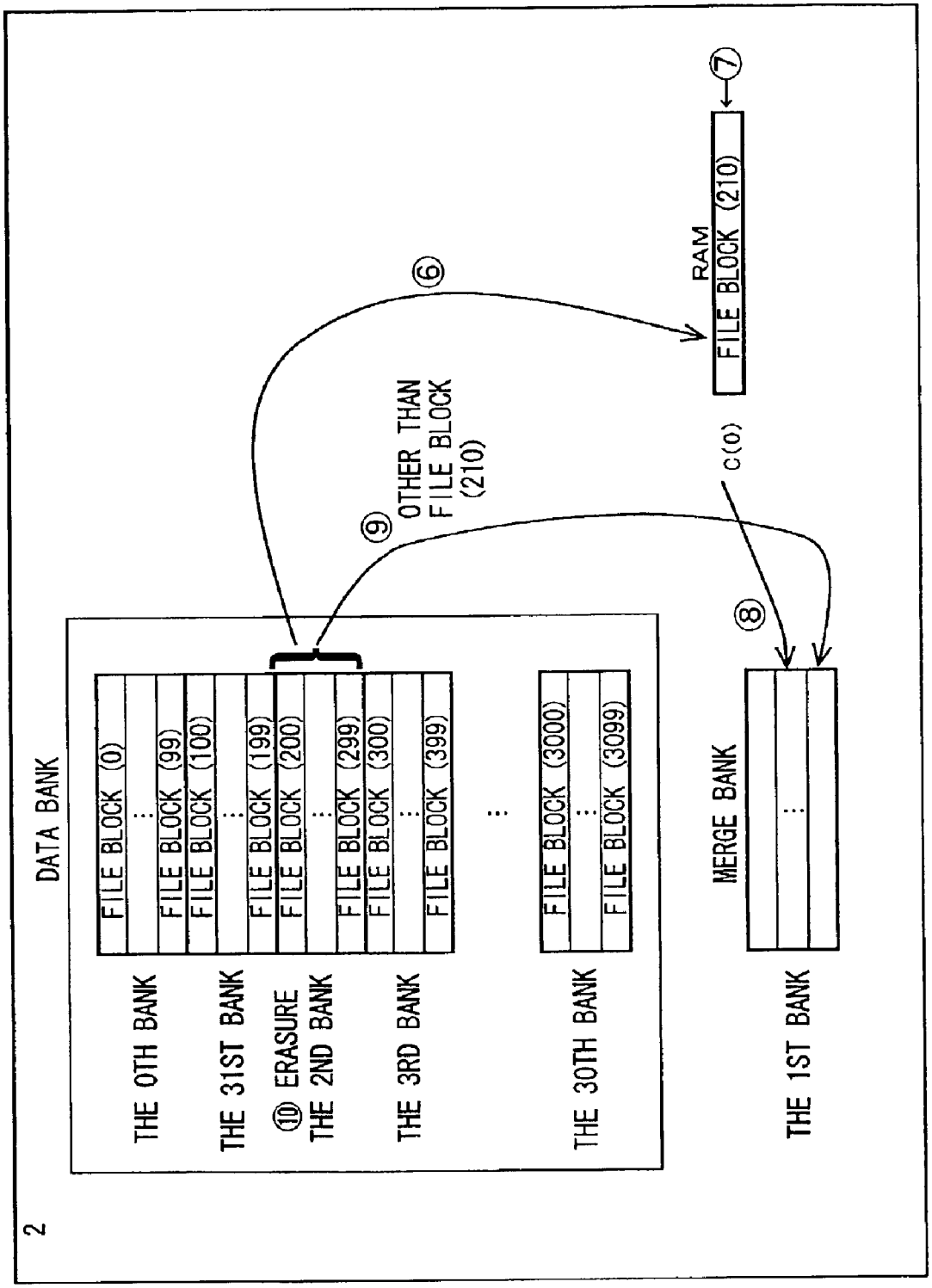
Figure 4:
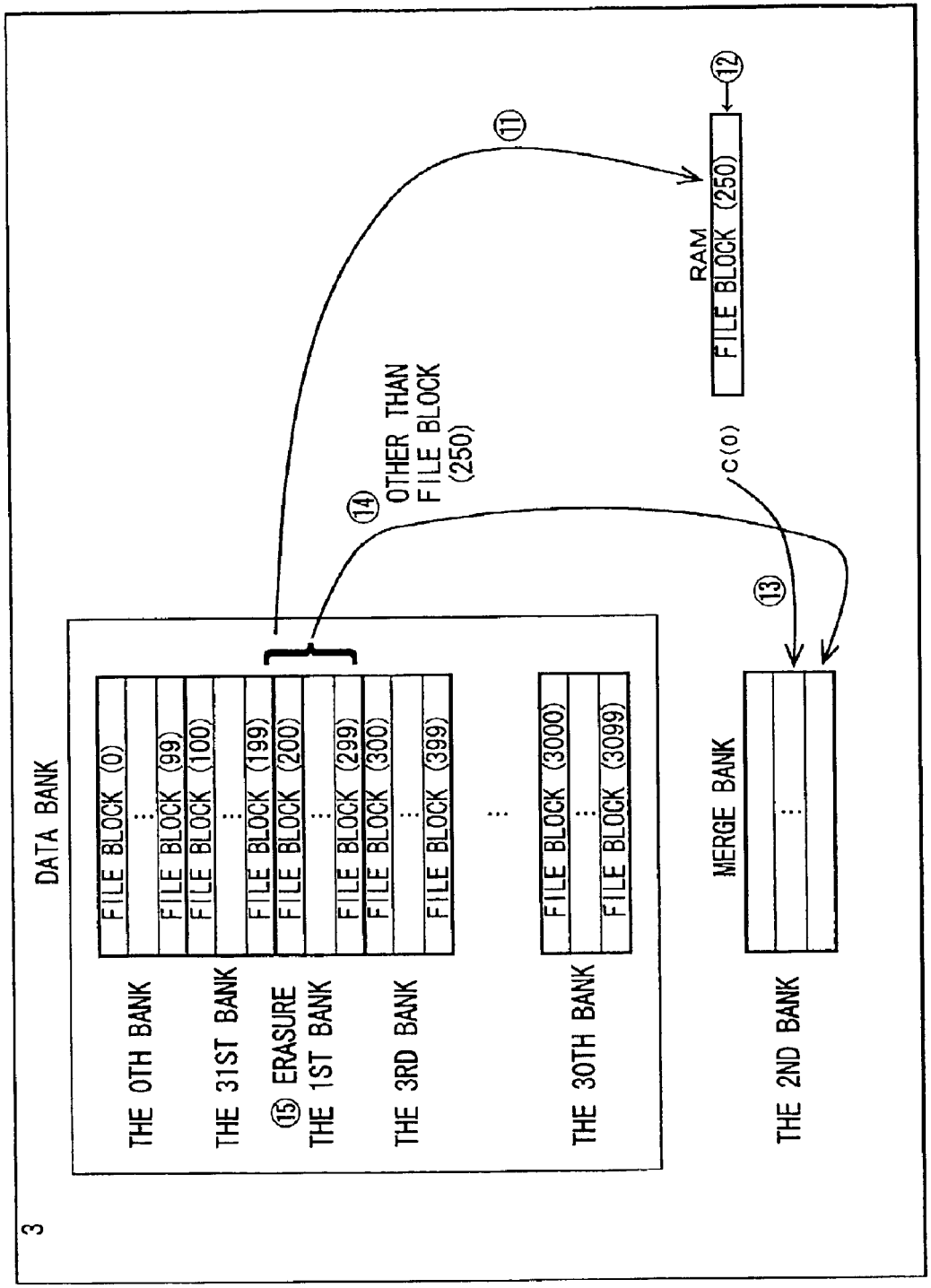
Figure 5:
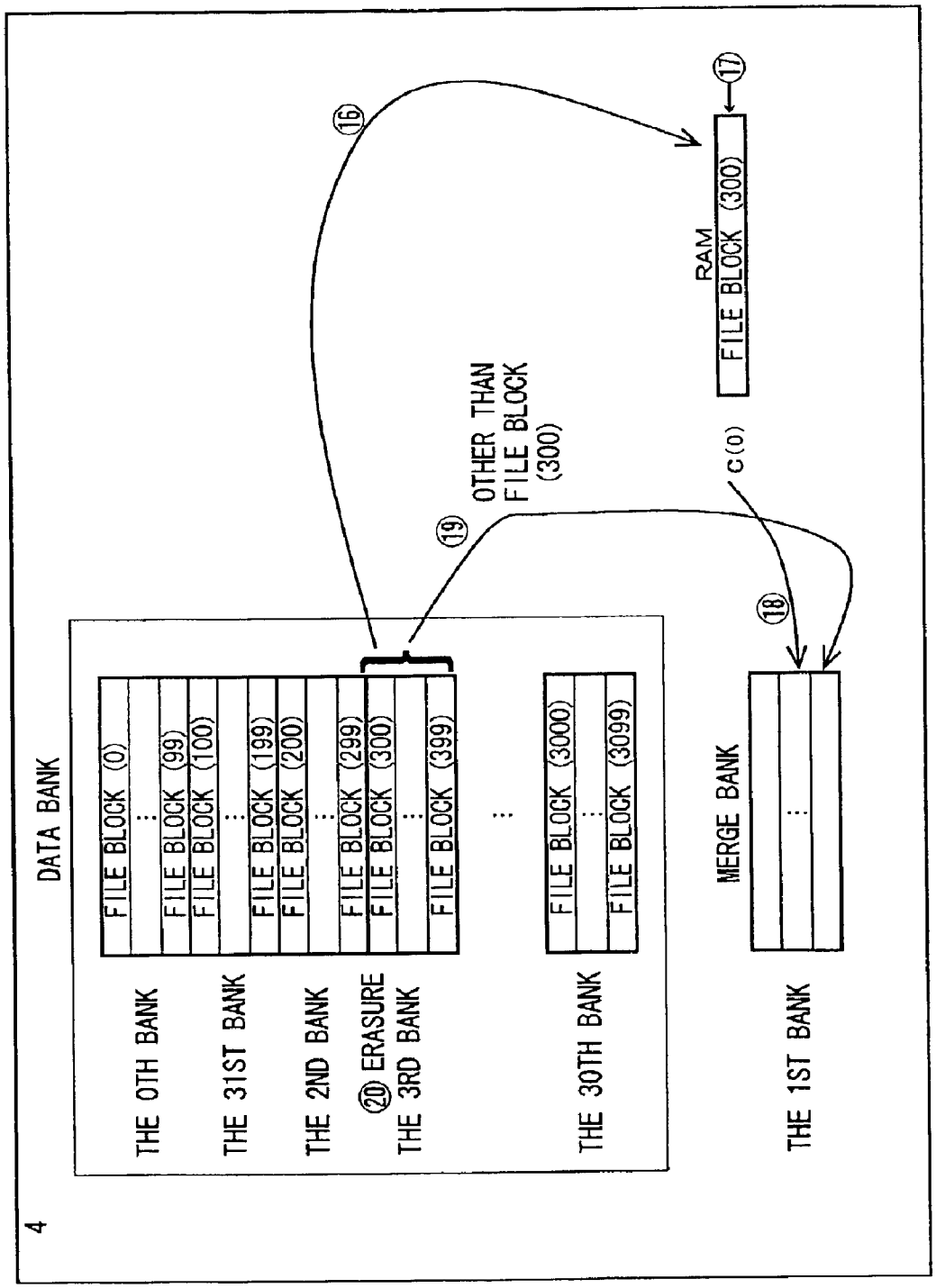
Figure 6:
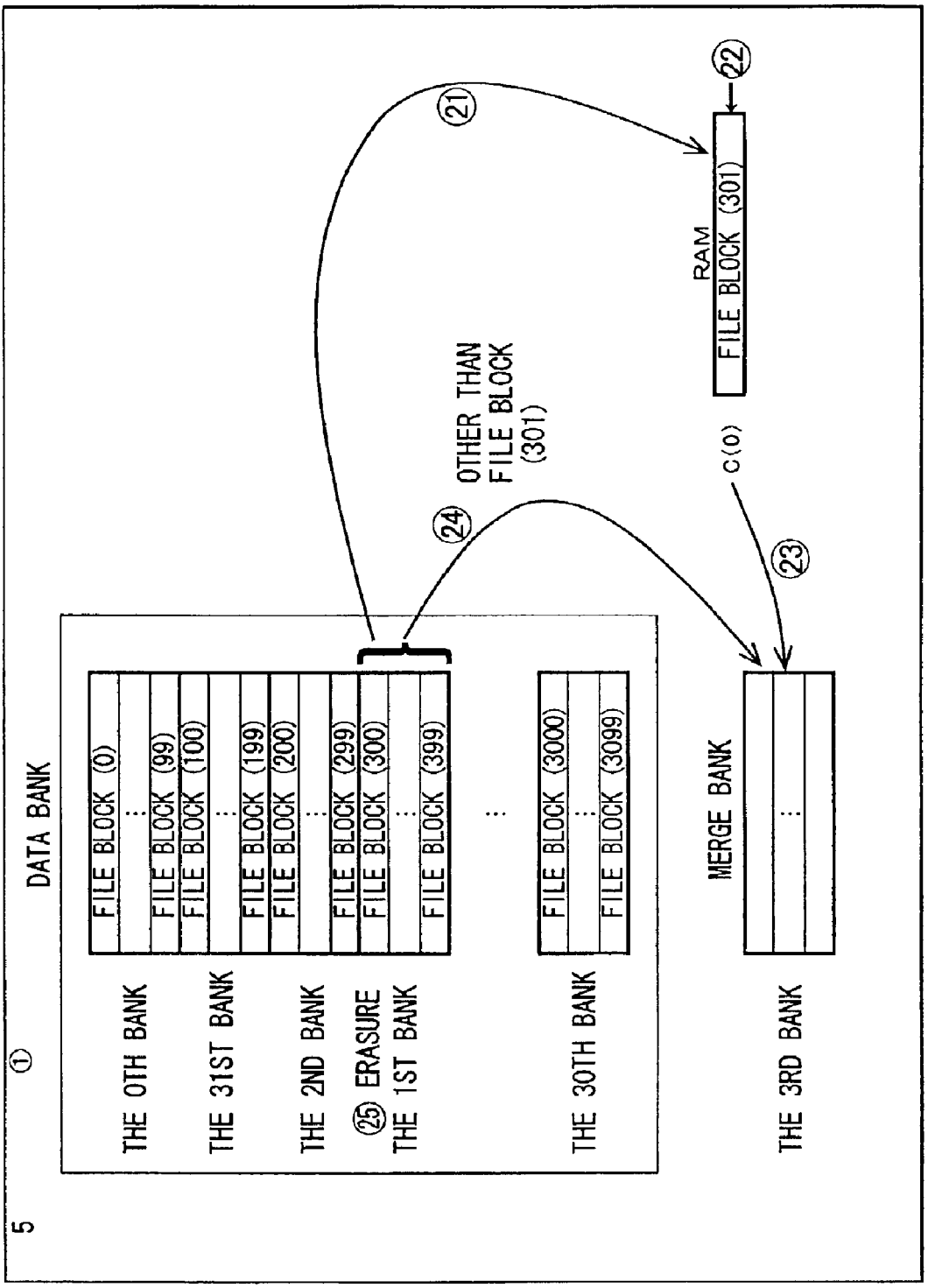

Embodiments of the present invention will be described below with reference to the drawings. In the following description and the drawings, the same components are denoted by the same reference characters. The name and functions thereof are also the same. Therefore, detailed description thereof will not be repeated.

First Embodiment

A file system according to the present embodiment involves file control of a non-volatile ROM (a flash memory) that is erasable bank by bank. The file system is used for, in particular, equipment in which a flash memory is mounted for the purpose of rewriting data more than once, e.g., portable equipment such as a mobile phone, a PDA and a digital still camera.

Figure 7:
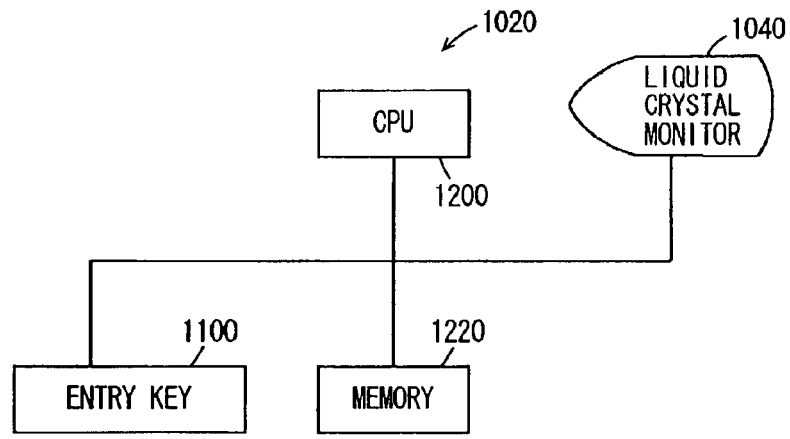
FIG. 7 is a control block diagram of portable machines in which a file system according to the present invention is used.

FIG. 7 shows the configuration of a portable equipment 1020 in the form of a block diagram. As shown in FIG. 7, portable equipment 1020 includes a CPU (Central Processing Unit) 1200, a memory 1220, an entry key 1100, and a liquid crystal monitor 1040 that are interconnected via a bus. A program for controlling the file system according to the present embodiment is pre-stored in a non-volatile memory portion (a flash memory) of memory 1220. The hardware itself in the portable equipment shown in FIG. 7 is a typical one. Thus, the essential part of the present invention is the file system implemented by a program stored in a storage medium such as memory 1220, and a method of controlling the file system.

Figure 8:
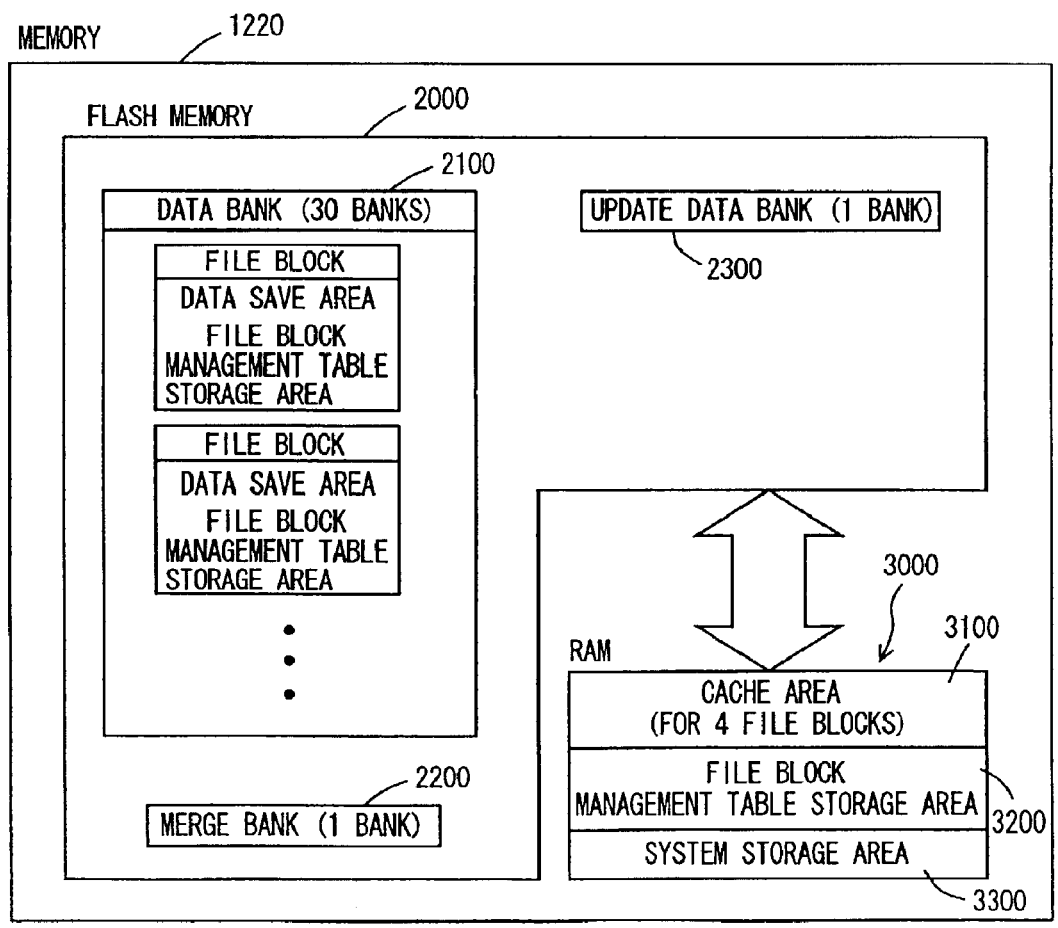
FIG. 8 is a control block diagram of a memory in which a file system according to the first embodiment of the present invention is implemented.

Referring to FIG. 8, the internal structure of memory 1220 is described. Memory 1220 includes a flash memory 2000 and a RAM 3000. Flash memory 2000 includes a data bank 2100, a merge bank 2200, and an update data bank 2300. Data bank 2100 is constituted by thirty banks. Each of merge bank 2200 and update data bank 2300 is formed by one bank. Thus, flash memory 2000 is constituted by thirty-two banks. One bank includes a hundred file blocks. Each file block includes a data save area and a management table storage area. RAM 3000 includes a cache area 3100, a file block management table storage area 3200 and a system storage area 3300. The cache area is constituted by four file blocks.

The present invention is not limited to such a configuration, but any system may be applicable that includes RAM 3000 constituted by a plurality of file blocks, merge bank 2200 including one or more banks, update data bank 2300 including one or more banks, and data bank 2100 including approximately thirty banks.

Figure 9:
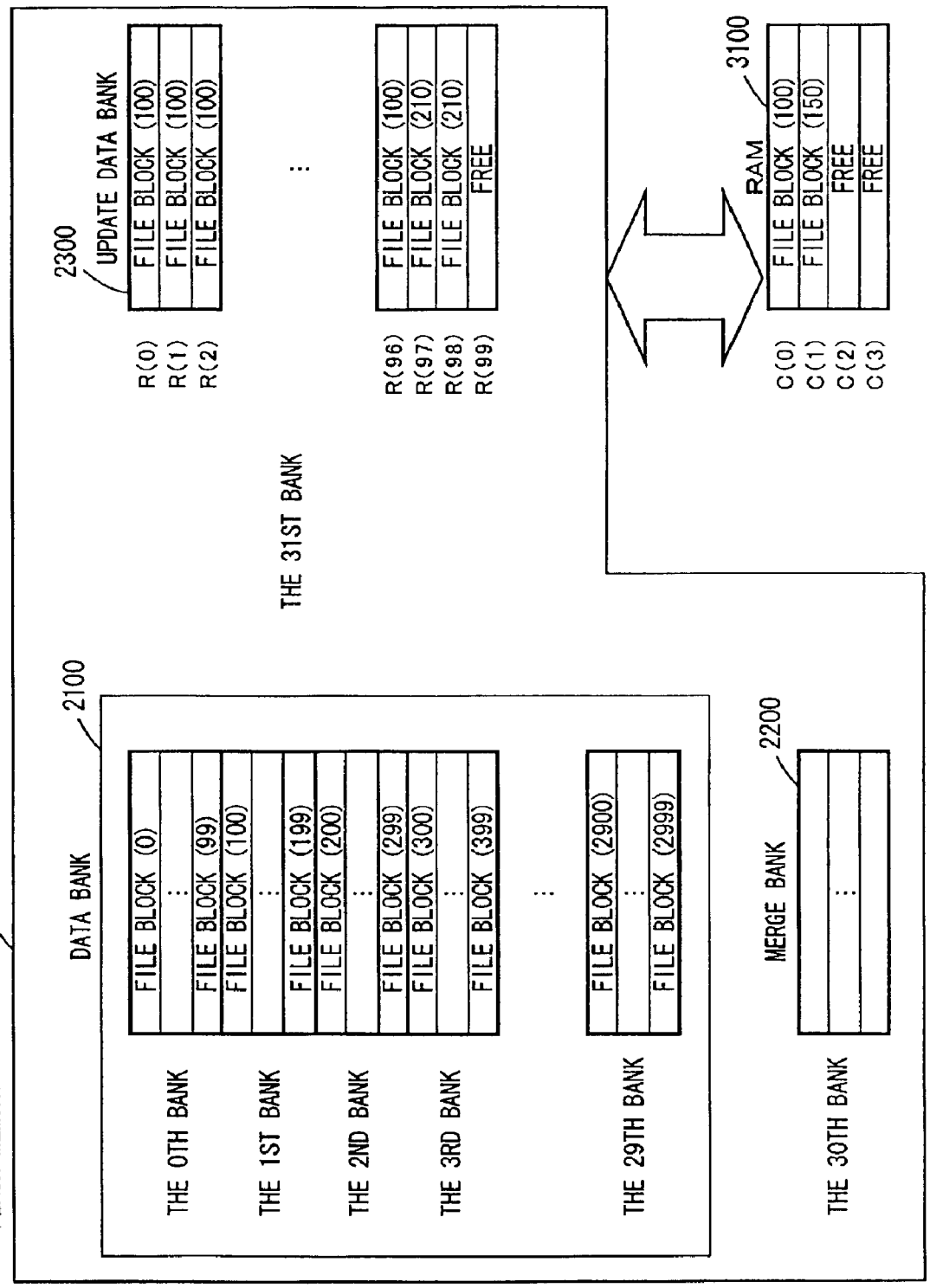
FIG. 9 shows a bank arrangement of a memory in which the file system according to the first embodiment of the present invention is implemented.

Referring to FIG. 9, the internal structure of memory 1220 is further described. As shown in FIG. 9, data bank 2100 includes thirty banks, i.e., the 0th bank constituted by file blocks (0) to (99), the first bank constituted by file blocks (100) to (199), the second bank constituted by file blocks (200) to (299), the third bank constituted by file blocks (300) to (399), . . . , and the 29th bank constituted by file blocks (2900) to (2999).

Update data bank 2300 includes a hundred entries (R (0), R (1), R (2), . . . , R (96), R (97), R (98), R (99)). Cache area 3100 in RAM 3000 is constituted by four entries (C (0), C (1), C (2), C (3)).

Figure 10:
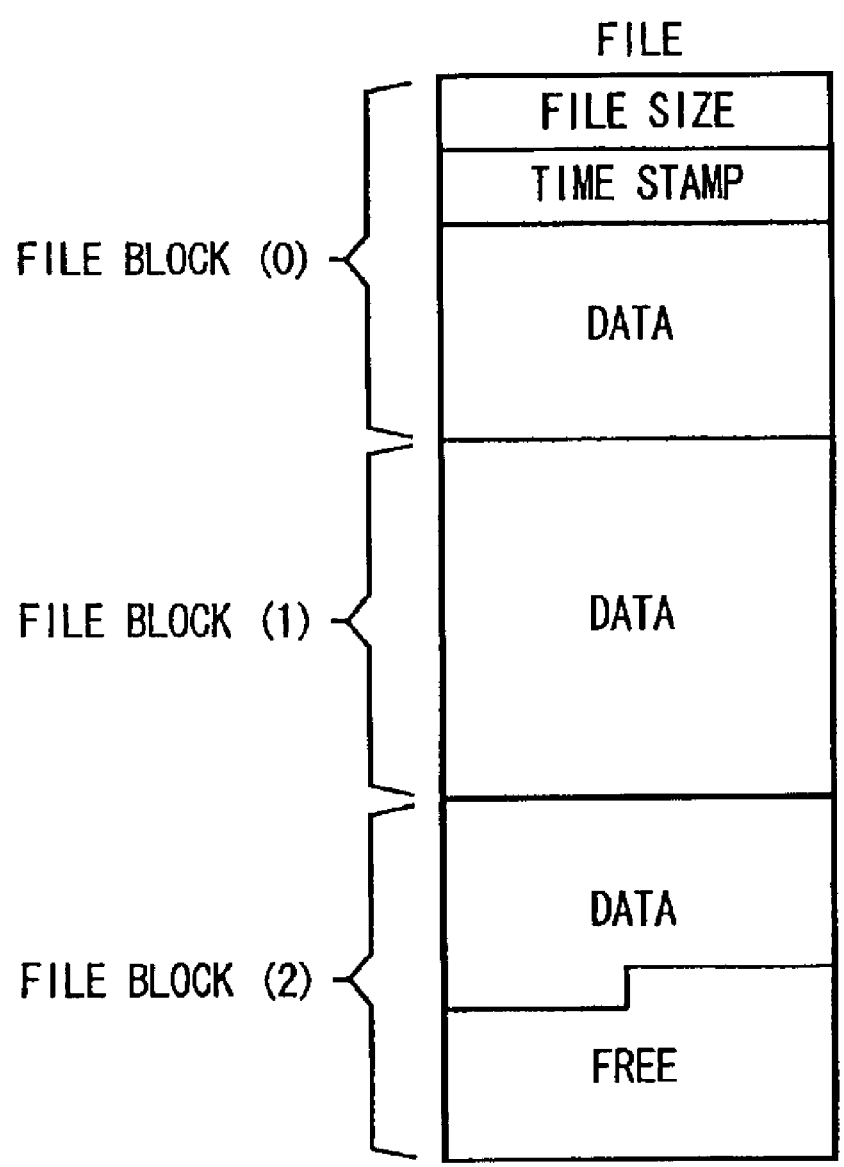
FIG. 10 shows a data structure of a file.

Referring to FIG. 10, a file configuration is described. FIG. 10 shows a configuration of a file constituted by three file blocks. A file has areas for storing file size and time stamp. If the file size becomes too large to be stored by the three file blocks as shown in FIG. 10, a new file block is added.

Figure 11:
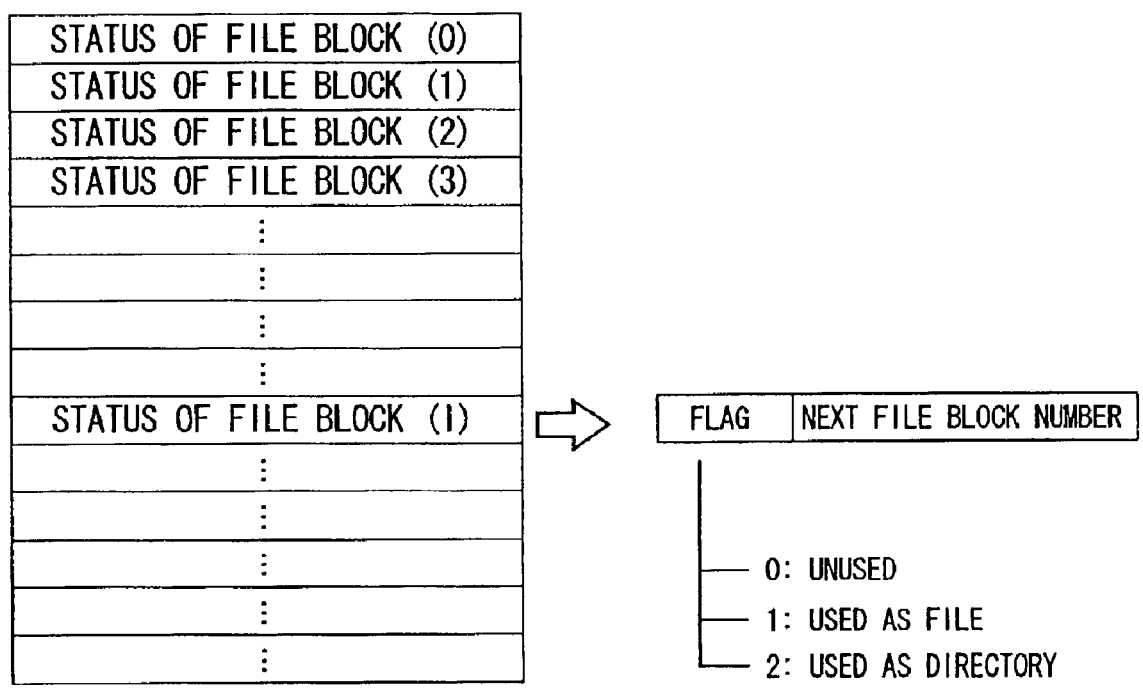
FIG. 11 shows a data structure of a file block management table.

Referring to FIG. 11, a file block management table is described. As shown in FIG. 11, a file block management table stores entries for all file blocks. Status is stored for each file block. The status includes a flag and the next file block number. The flag is an identification code indicating busy condition of a file block. For example, "0" is set to indicate "unused," while "1" indicates "used as file" and "2" indicates "used as directory."

Figure 12B:
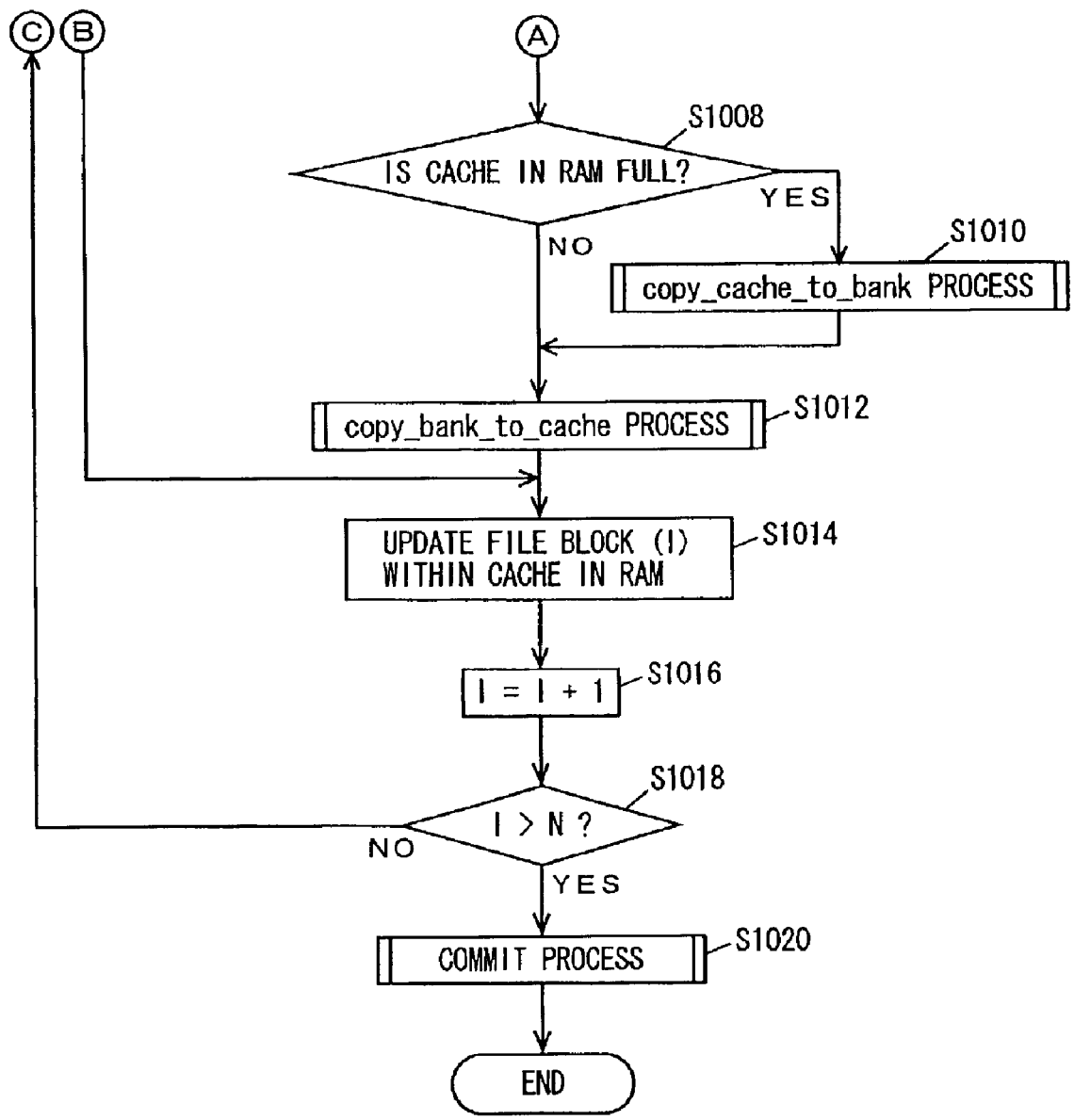

Referring to FIGS. 12A and 12B, the control structure of a writing process executed in the file system according to the present embodiment is described.

At step (hereinafter, step is abbreviated as "S") 1000, CPU 1200 determines whether or not a command to be processed is a rewrite command. If the command to be processed is a rewrite command (YES at S1000), the process goes on to S1002. If not (NO at S1000), the process goes back to S1000, and waits for a rewrite command.

At S1002, CPU 1200 decides N file blocks that are subject to writing, based on the rewrite command. Here, information to be written into a file in response to the rewrite command includes not only data, but also time stamp, size and the like. One time stamp and one size are stored for each file, not for each file block. Thus, in most cases, the file blocks to which data is written in response to one rewrite command spread across two or more file blocks.

At S1004, CPU 1200 initializes a variable I (I=1). At S1006, CPU 1200 determines whether or not file block (I) is present within cache area 3100 (entries C (0) to C (3)) in RAM 3000. If file block (I) is present in cache area 3100 of RAM 3000 (YES at S1006), the process goes on to S1014. If not (NO at S1006), the process goes on to S1008.

At S1008, CPU 1200 determines whether or not cache area 3100 of RAM 3000 is full. If cache area 3100 of RAM 3000 is full (YES at S1008), the process goes on to S1010. If not (NO at S1008), the process goes on to S1012.

At S1010, CPU 1200 executes a copy_cache_to_bank process. The copy_cache_to_bank process will be described later in detail. At S1012, CPU 1200 executes a copy_bank_to_cache process. The copy_bank_to_cache process will be described later in detail.

At S1014, file block (I) within cache area 3100 of RAM 3000 is updated. At S1016, CPU 1200 adds 1 to variable I. At S1018, CPU 1200 determines whether or not variable I is greater than the number of file blocks N. If variable I is greater than the number of file blocks N (YES at S1018), the process goes on to S1020. If not (NO at S1018), the process goes back to S1006, and a process for the next file block is executed. At S1020, CPU 1200 executes a commit process. The commit process will be described later in detail.

Figure 13A:
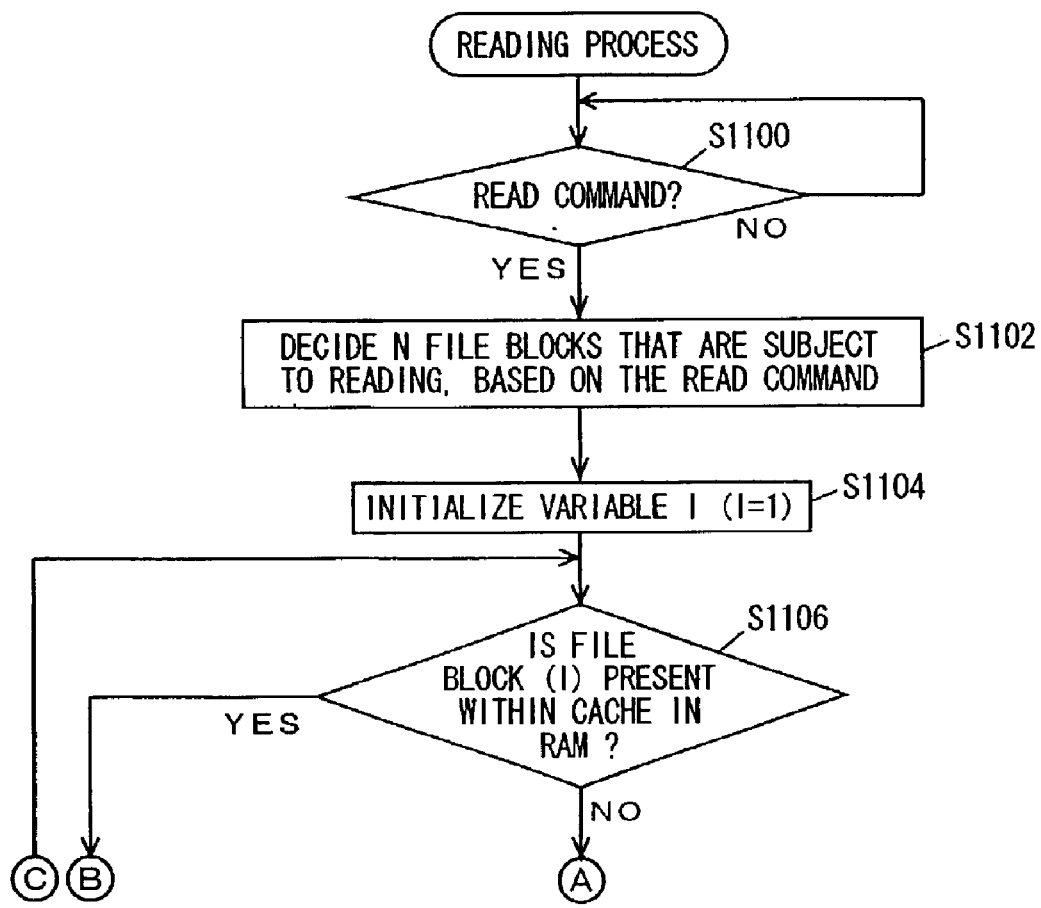
FIGS. 13A and 13B are flow charts illustrating the procedure of controlling a reading process according to the first embodiment of the present invention.
Figure 13B:
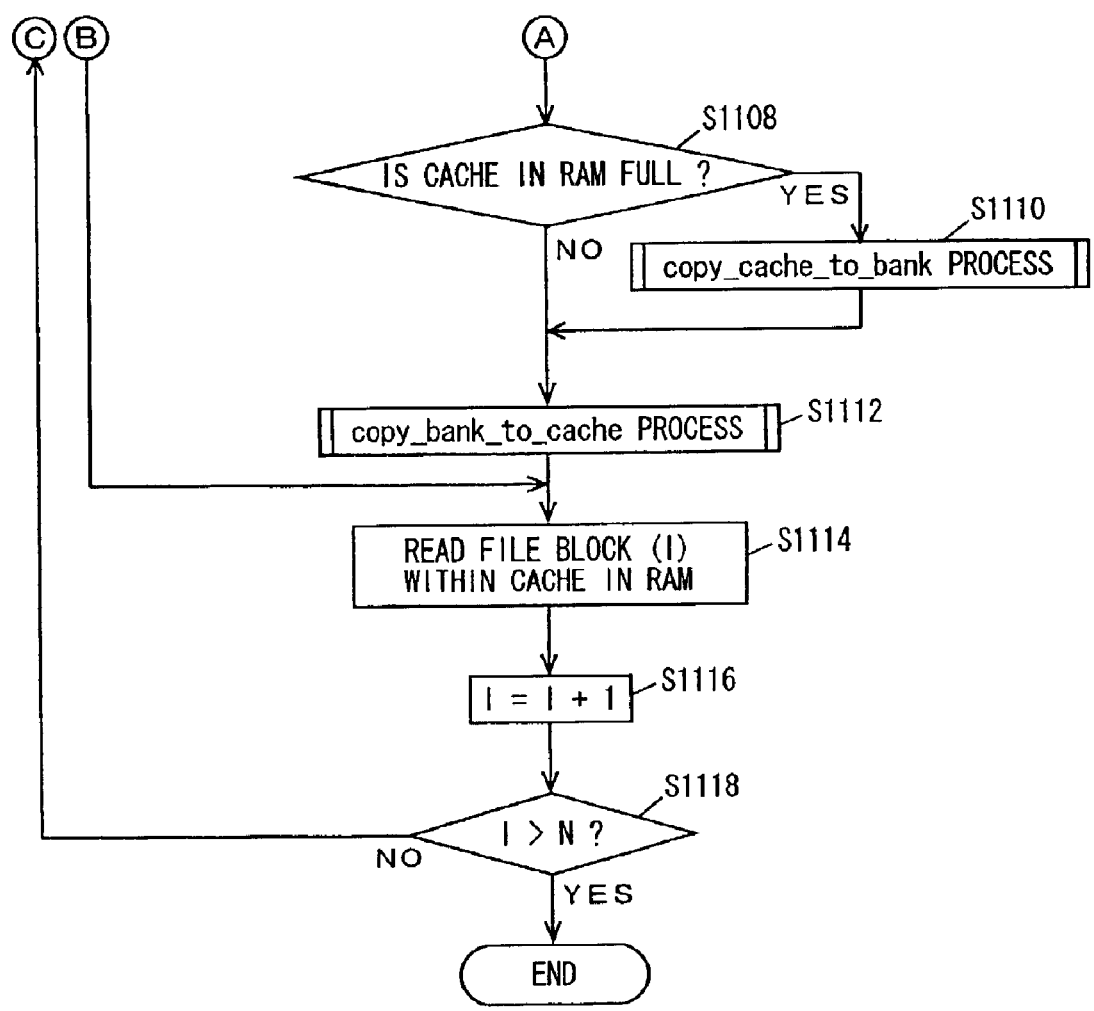

Referring to FIGS. 13A and 13B, the control structure of a reading process executed in the file system according to the present embodiment is described.

At S1100, CPU 1200 determines whether or not a command to be processed is a read command. If the command to be processed is a read command (YES at S1100), the process goes on to S1102. If not (NO at SI 100), the process goes back to S1100, and waits for a read command.

At S1102, CPU 1200 decides N file blocks that are subject to reading, based on the read command. In most cases, the file blocks from which data is read in response to one read command spread across two or more file blocks.

At S1104, CPU 1200 initializes variable I (I=1). At S106, CPU 1200 determines whether or not file block (I) is present within cache area 3100 (entries C(0) to C (3)) of RAM 3000. If file block (I) is present in cache area 3100 of RAM 3000 (YES at S1106), the process goes on to S1114. If not (NO at S1106), the process goes on to S1108.

At S1108, CPU 1200 determines whether or not cache area 3100 of RAM 3000 is full. If cache area 3100 of RAM 3000 is full (YES at S 1108), the process goes on to S1110. If not, (NO at S1108), the process goes on to S1112.

At S1110, CPU 1200 executes a copy_cache_to_bank process. The copy_cache_to_bank process will be described later in detail. At S1112, CPU 1200 executes a copy_bank_to_cache process. The copy_bank_to_cache process will be described later in detail.

At S1114, data stored in the file block (I) in cache area 3100 of RAM 3000 is read out. At S1116, CPU 1200 adds 1 to variable I. At S1118, CPU 1200 determines whether or not variable I is greater than the number of file blocks N. If variable I is greater than the number of file blocks N (YES at S1118), the process is terminated. If not (NO at S1118), the process goes back to S1106, and a process for the next file block is executed.

Figure 14:
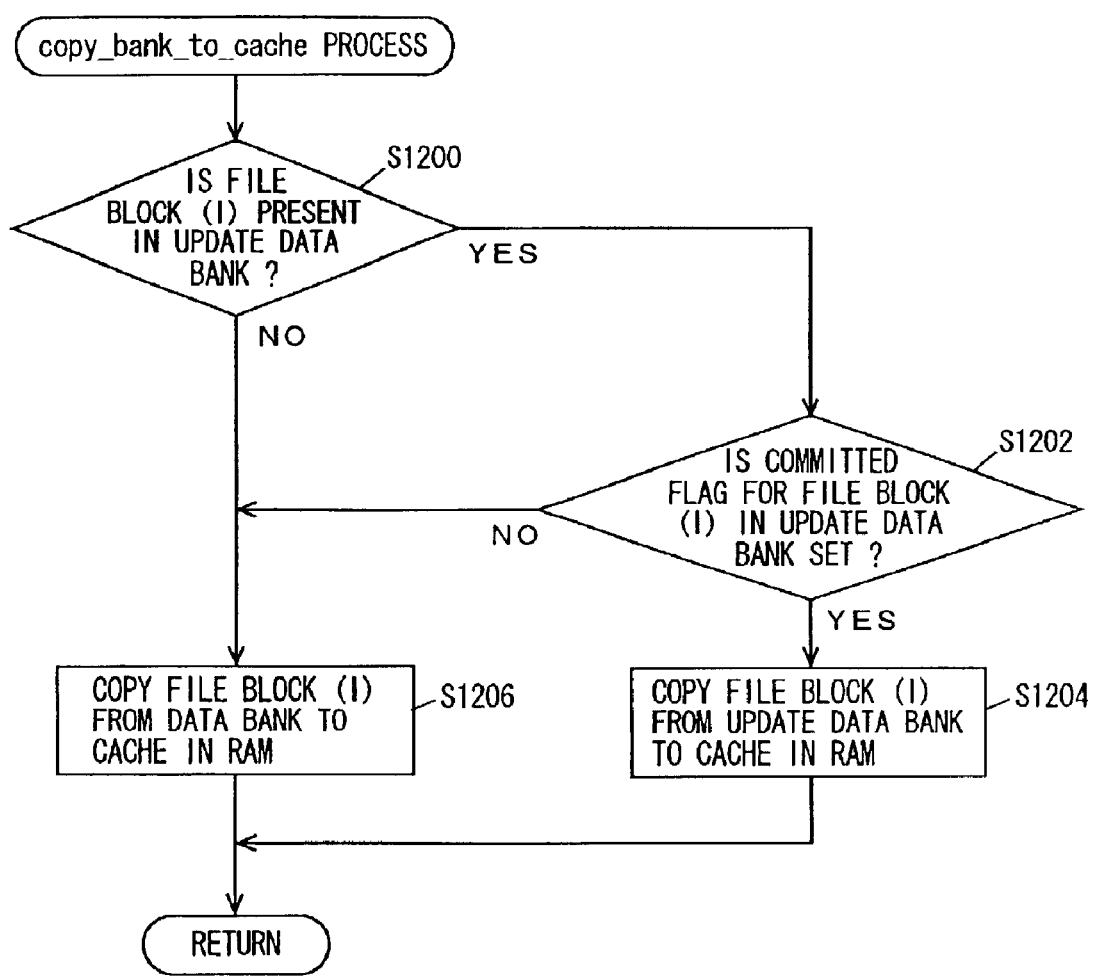
FIG. 14 is a flow chart illustrating the procedure of controlling a copy_bank_to_cache process according to the first embodiment of the present invention.

Referring to FIG. 14, the control structure of the copy_bank_to_cache process executed in the file system according to the present embodiment is described.

At S1200, CPU 1200 determines whether or not file block (I) is present within update data bank 2300. If file block (I) is present within update data bank 2300 (YES at S1200), the process goes on to S1202. If not (NO at S1200), the process goes on to S1206.

At S1202, CPU 1200 determines whether or not a committed flag of file block (I) in update data bank 2300 is set. If the committed flag of file block (I) in update data bank 2300 is set (YES at S1202), the process goes on to S1204. If not (NO at S1202), the process goes on to S1206.

At S1204, CPU 1200 copies file block (I) from update data bank 2300 to cache area 3100 of RAM 3000. At S1206, CPU 1200 copies file block (I) from data bank 2000 to cache area 3100 of RAM 3000. After the process at S1204 or at S1206, the copy_bank_to_cache process is terminated.

Figure 15:
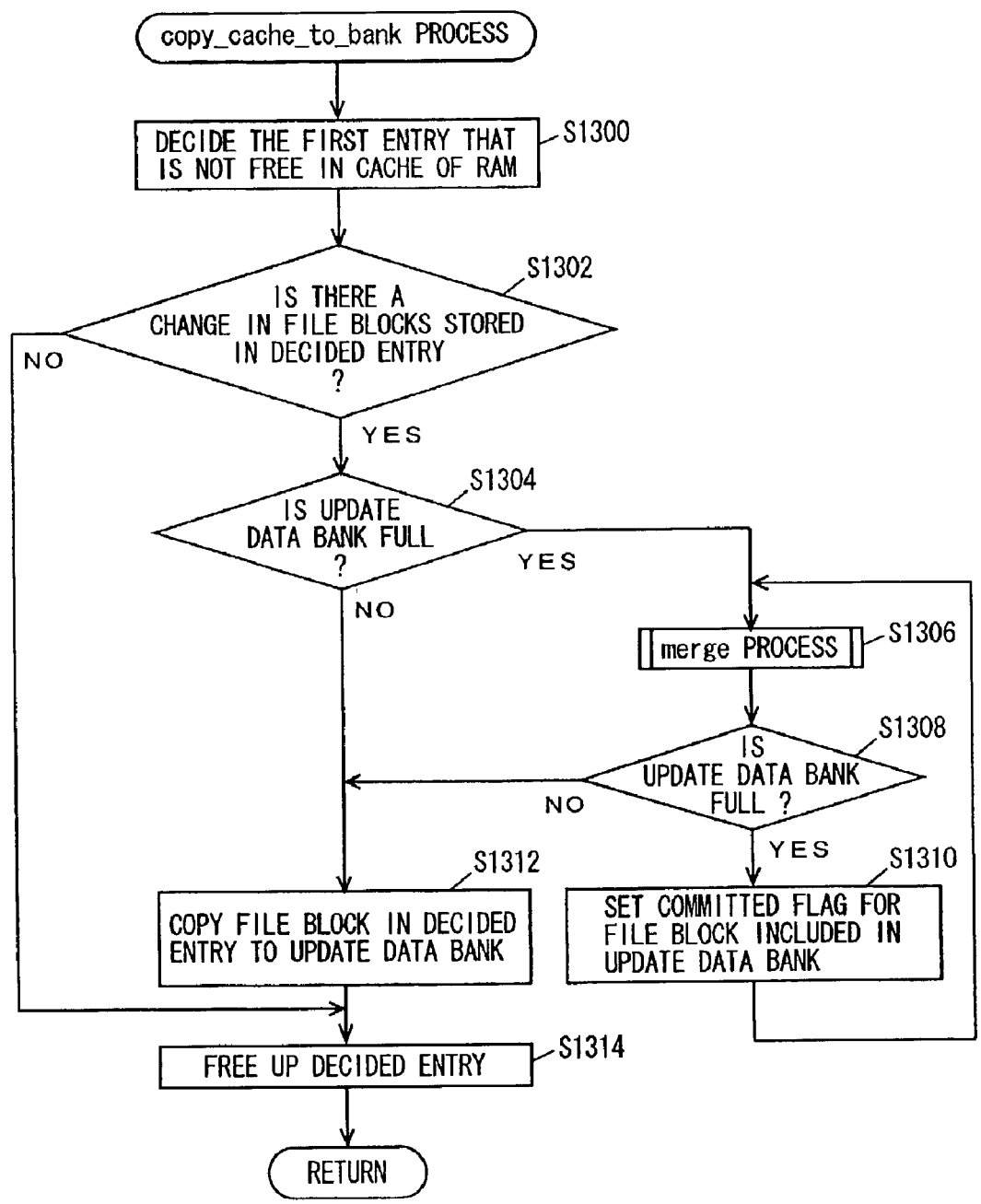
FIG. 15 is a flow chart illustrating the procedure of controlling a copy_cache_to_bank process according to the first embodiment of the present invention.

Referring to FIG. 15, the control structure of the copy_cache_to_bank process executed in the file system according to the present embodiment is described.

At S1300, CPU 1200 decides the first entry that is not free in cache area 3100 of RAM 3000. At S1302, CPU 1200 determines whether or not there is a change in file blocks stored in the decided entry. If there is a change in the file blocks stored in the decided entry (YES at S1302), the process goes on to S1304. If not (NO at S1302), the process goes on to S1314.

At S1304, CPU 1200 determines whether or not update data bank 2300 is fill. If update data bank 2300 is full (YES at S1304), the process goes on to S1306. If not (NO at S1304), the process goes on to S1312.

At S1306, CPU 1200 executes a merge process. The merge process will be described later in detail.

At S1308, CPU 1200 determines whether or not update data bank 2300 is full. If update data bank 2300 is full (YES at S1308), the process goes on to S1310. If not (NO at S1308), the process goes on to S1312.

At S1310, CPU 1200 sets a committed flag for a file block included in update data bank 2300. After S1310, the process goes back to S1306.

At S1312, CPU 1200 copies the file block in the decided entry to update data bank 2300. At S1314, CPU 1200 frees up the decided entry. After S1314, the copy_cache_to_bank process is terminated.

Figure 16A:
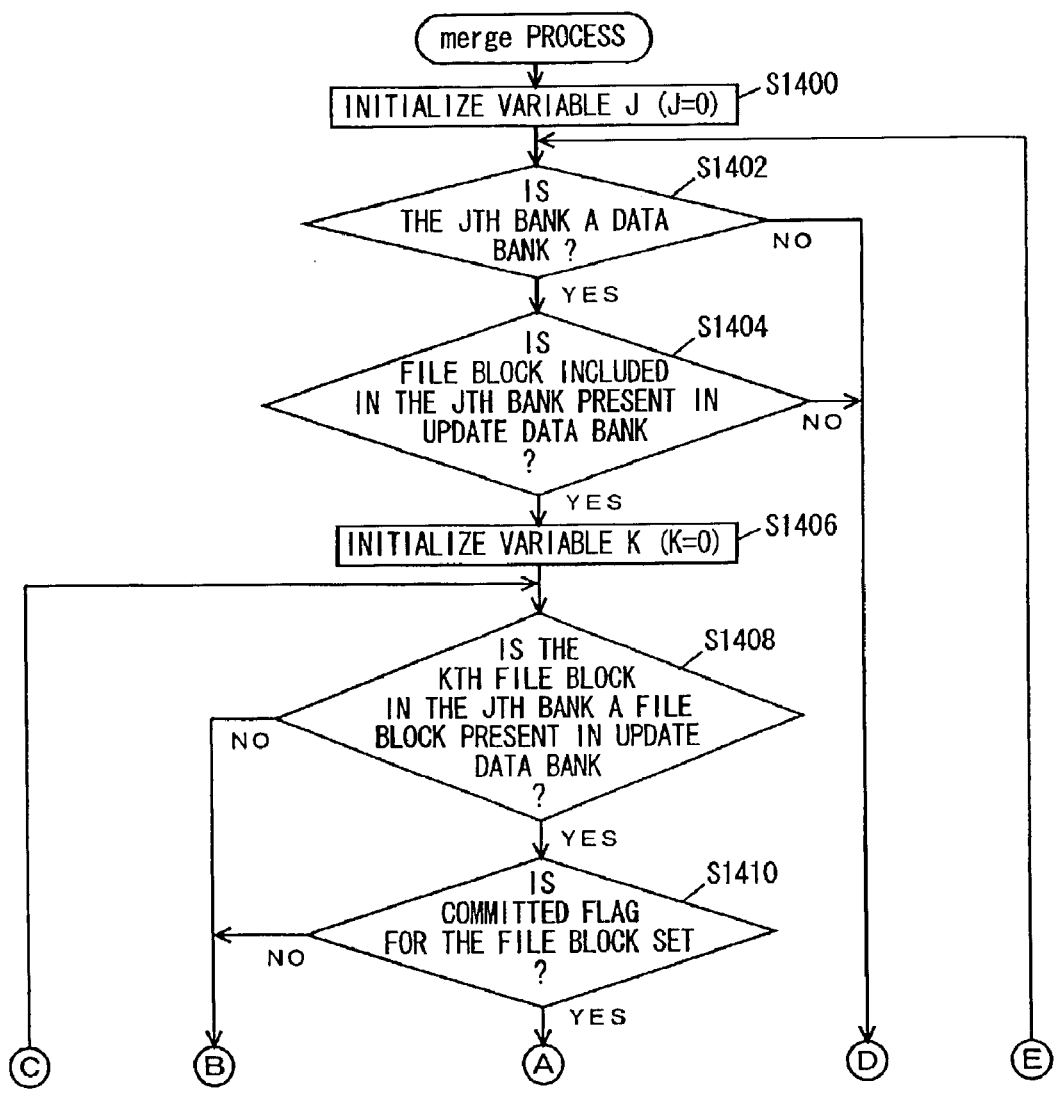
FIGS. 16A and 16B are flow charts illustrating the procedure of controlling a merge process according to the first embodiment of the present invention.
Figure 16B:
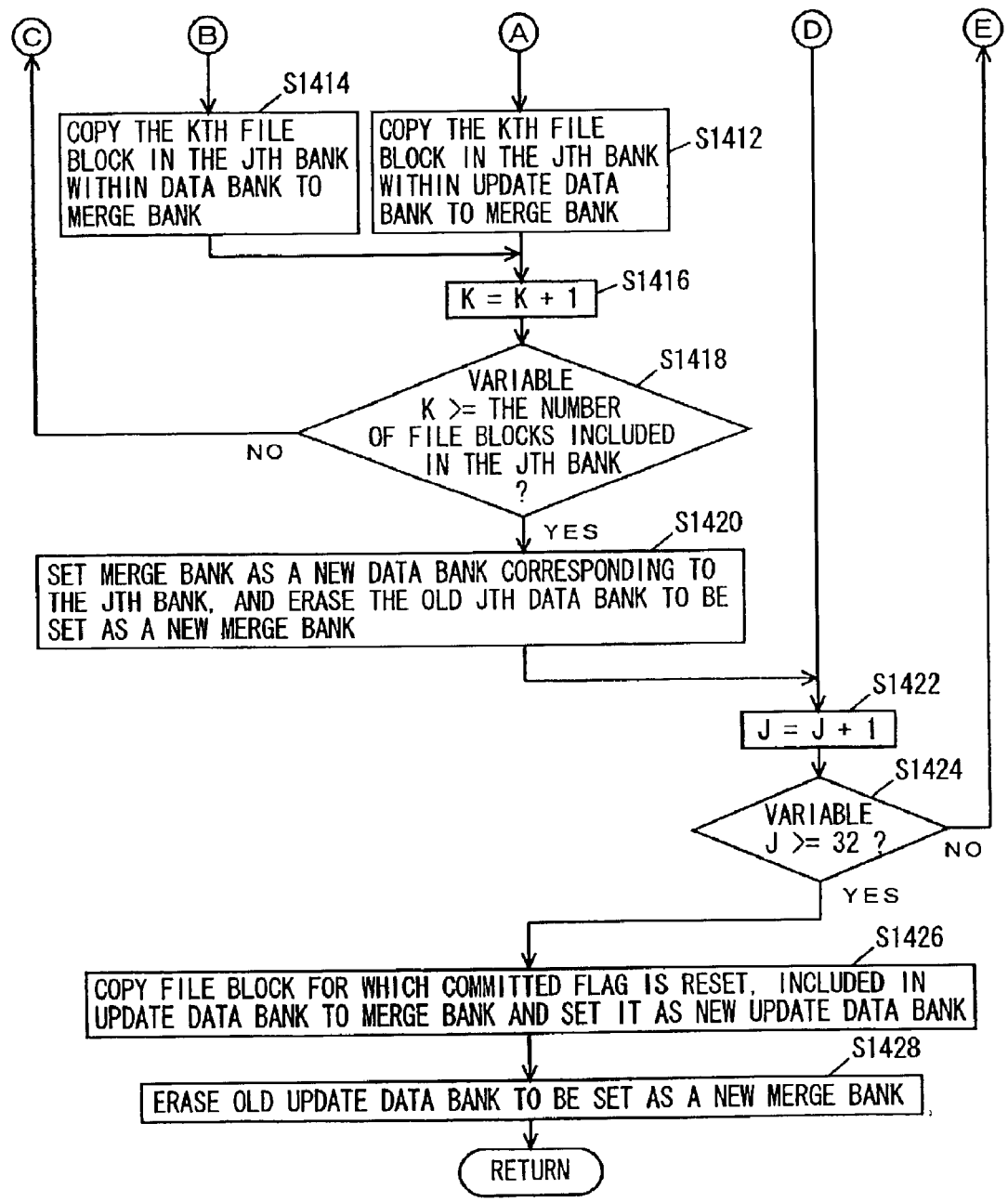

Referring to FIGS. 16A and 16B, the control structure of the merge process executed in the file system according to the present embodiment is described.

At S1400, CPU 1200 initializes a variable J (J=0).

At S1402, CPU 1200 determines whether or not the Jth bank is a data bank. If the Jth bank is a data bank (YES at S1402), the process goes on to S1404. If not NO at S1402), the process goes on to S1422.

At S1404, CPU 1200 determines whether or not a file block included in the Jth bank is present in update data bank 2300. If a file block included in the Jth bank is present in update data bank 2300 (YES at S1404), the process goes on to S1406. If not (NO at S1404), the process goes on to S1422.

At S1406, CPU 1200 initializes a variable K (K=0).

At S1408, CPU 1200 determines whether or not the Kth file block in the Jth bank is a file block present in update data bank 2300. If the Kth file block in the Jth bank is a file block present in update data bank 2300 (YES at S1408), the process goes on to S1410. If not NO at S1408), the process goes on to S1414.

At S1410, CPU 1200 determines whether or not a committed flag of the file block is set. If the committed flag of the file block is set (YES at S1410), the process goes on to S1412. If not (NO at S1410), the process goes on to S1414.

At S1412, CPU 1200 copies the Kth file block in the Jth bank within update data bank 2300 to the merge bank. At S1414, CPU 1200 copies the Kth file block of the Jth bank in data bank 2000 to merge bank 2200.

At S1416, CPU 1200 adds 1 to variable K. At S1418, CPU 1200 determines whether or not variable K is greater than the number of file blocks included in the Jth bank. If variable K is greater than or equal to the number of file blocks included in the Jth bank (YES at S1418), the process goes on to S1420. If not (NO at S1418), the process goes back to S1408.

At S1420, CPU 1200 sets merge bank 2200 as a new data bank corresponding to the Jth bank, while erasing the old Jth data bank to set it as a new merge bank. At S1422, CPU 1200 adds 1 to variable J. At S1424, CPU 1200 determines whether or not variable J is greater than 32. Note that flash memory 2000 is constituted by thirty-two banks. If variable J is greater than or equal to 32(YES at S1424), the process goes on to S1426. If not (NO at S1424), the process goes back to S1402.

At S1426, CPU 1200 copies the file block for which the committed flag is reset, included in update data bank 2300, to the merge bank, which in turn is set as a new update data bank. At S1428, CPU 1200 erases the old update data bank to set it as a new merge bank.

Figure 17A:
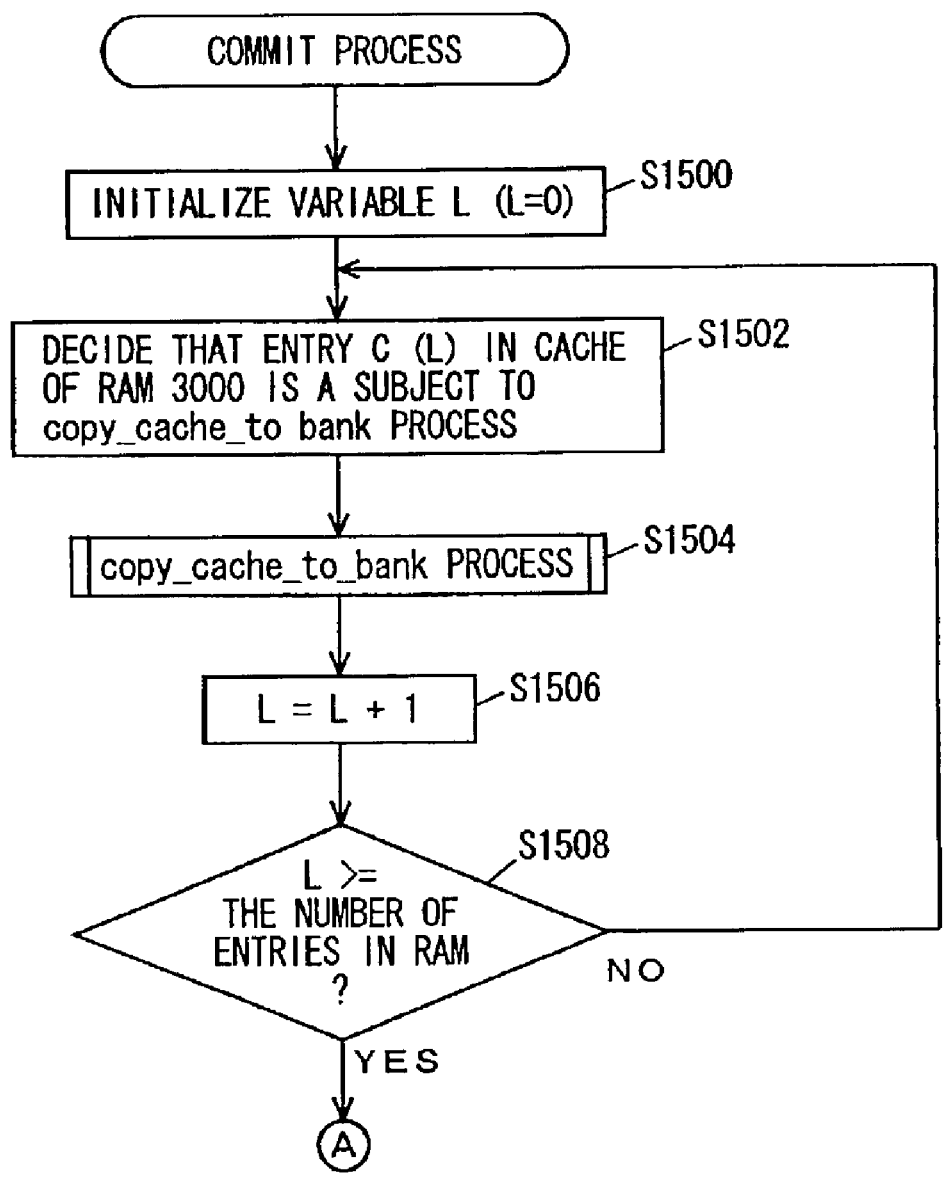
FIGS. 17A and 17B are flow charts illustrating the procedure of controlling a commit process according to the first embodiment of the present invention.
Figure 17B:
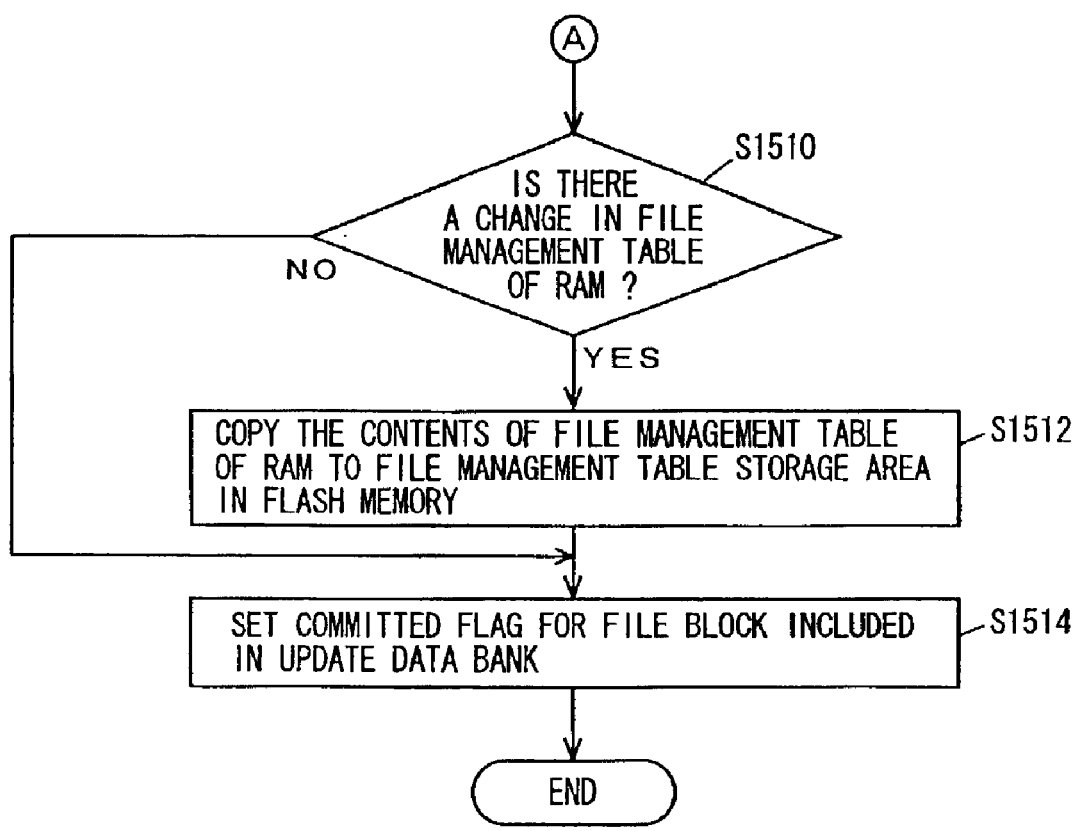

Referring to FIGS. 17A and 17B, the control structure of the commit process executed in the file system according to the present embodiment is described. At S1500, CPU 1200 initializes a valuable L (L=0). At S1502, CPU 1200 decides that an entry C (L) in cache area 3100 of RAM 3000 is a subject to the copy_cache_to_bank process. At S1504, CPU 1200 executes the copy_cache_to_bank process.

At S1506, CPU 1200 adds l to variable L. At S1508, CPU 1200 determines whether or not valuable L is greater than or equal to the number of entries in cache area 3100 of RAM 3000. If variable L is greater than or equal to the number of entries in cache area 3100 of RAM 3000 (YES at S1508), the process goes on to S1510. If not (NO at S1508), the process goes back to S1502.

At S1510, CPU 1200 determines whether or not there is a change in a file management table of RAM 3000. If there is a change in the file management table of RAM 3000 (YES at S1510), the process goes on to S1512. If not (NO at S1510), the process goes on to S1514.

At S1512, CPU 1200 copies the contents of the file management table of RAM 3000 to a file management table storage area in flash memory 2000. At S1514,CPU 1200 sets a committed flag for a file block included in update data bank 2300.

The operation of the file system according to the present embodiment, based on such structure and flow charts above, will be described with reference to FIGS. 18 to 25. In the description below, it is assumed that data is written into file blocks in response to one rewrite command, in the order of file block (100), file block (210), file block (250), file block (300), and file block (301). The operation proceeds in the ascending order of circled numbers in FIGS. 18 to 25. The number at the head of each paragraph below corresponds to each of the circled numbers.

Figure 18:
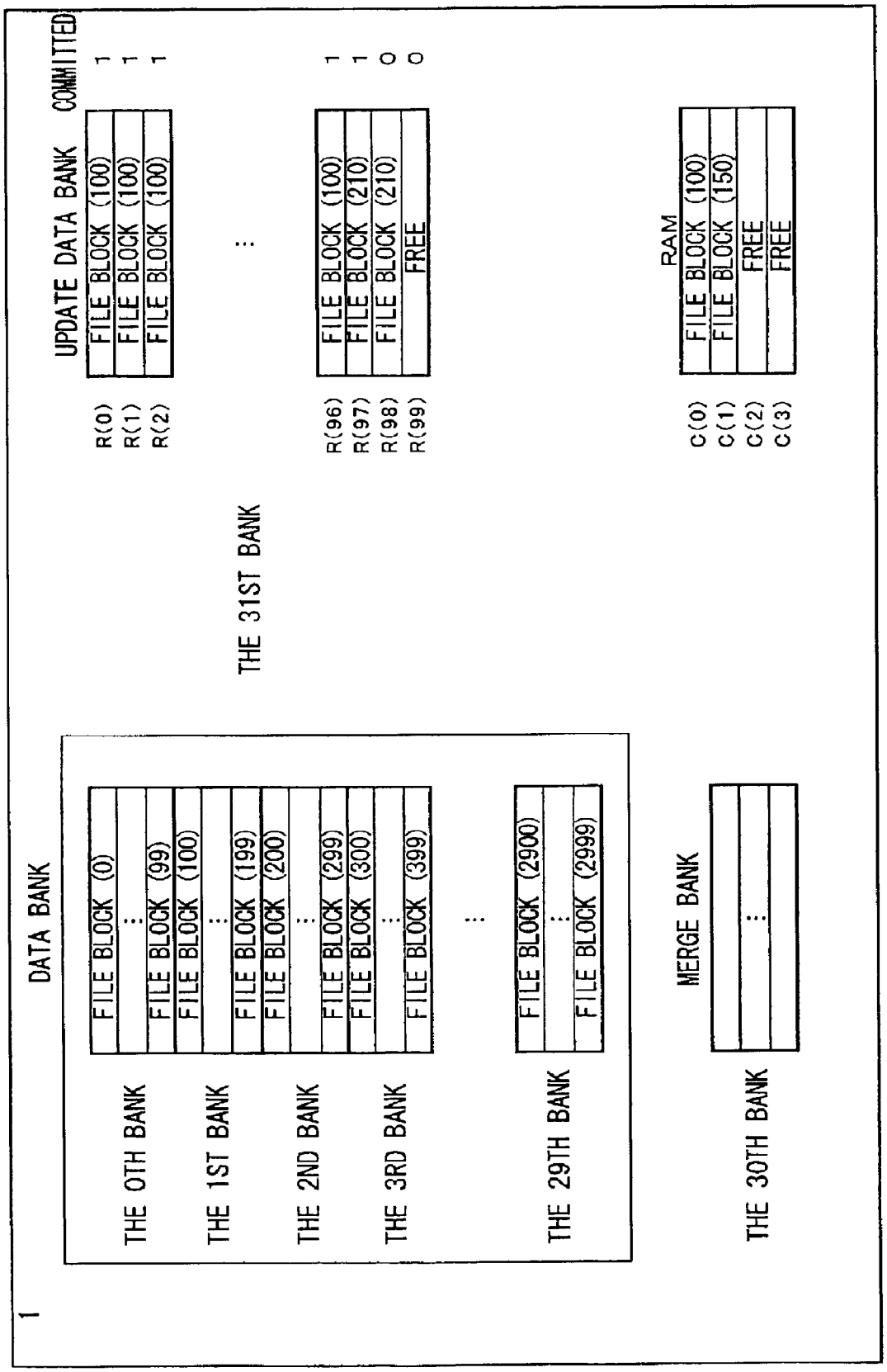
FIGS. 18 to 25 illustrate the change of contents stored in banks by a process according to the first embodiment of the present invention.
Figure 19:
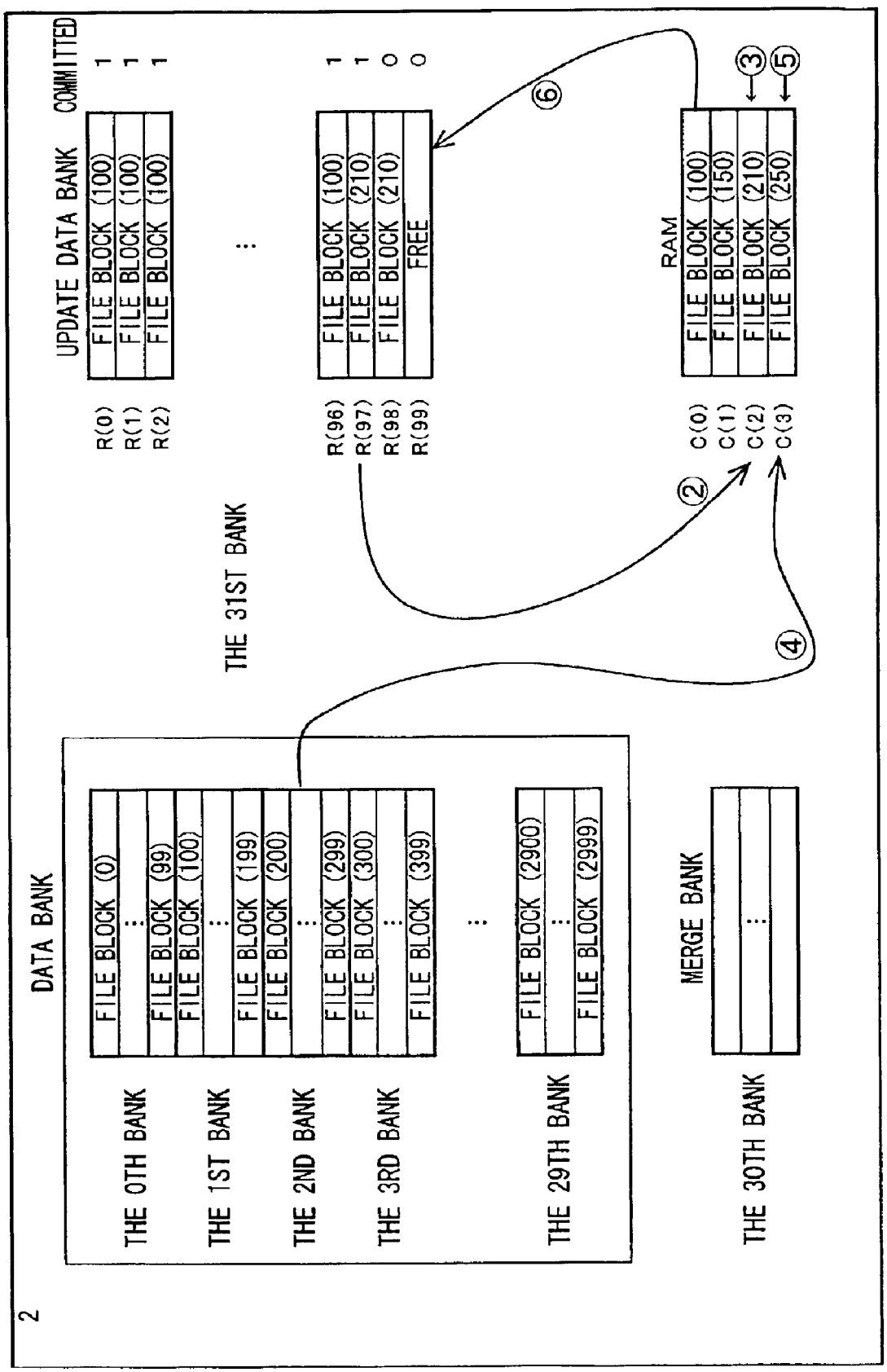
Figure 20:
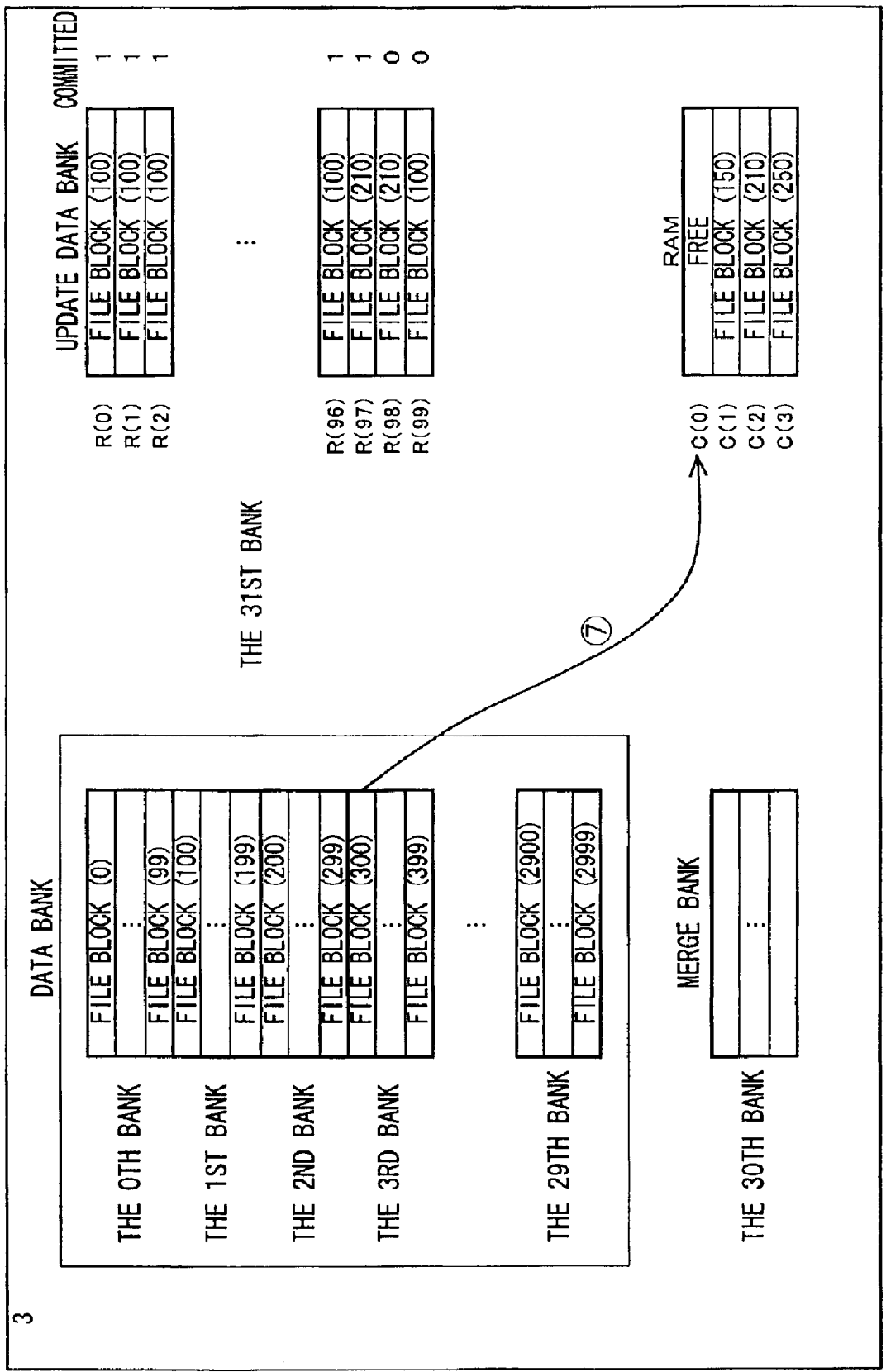
Figure 21:
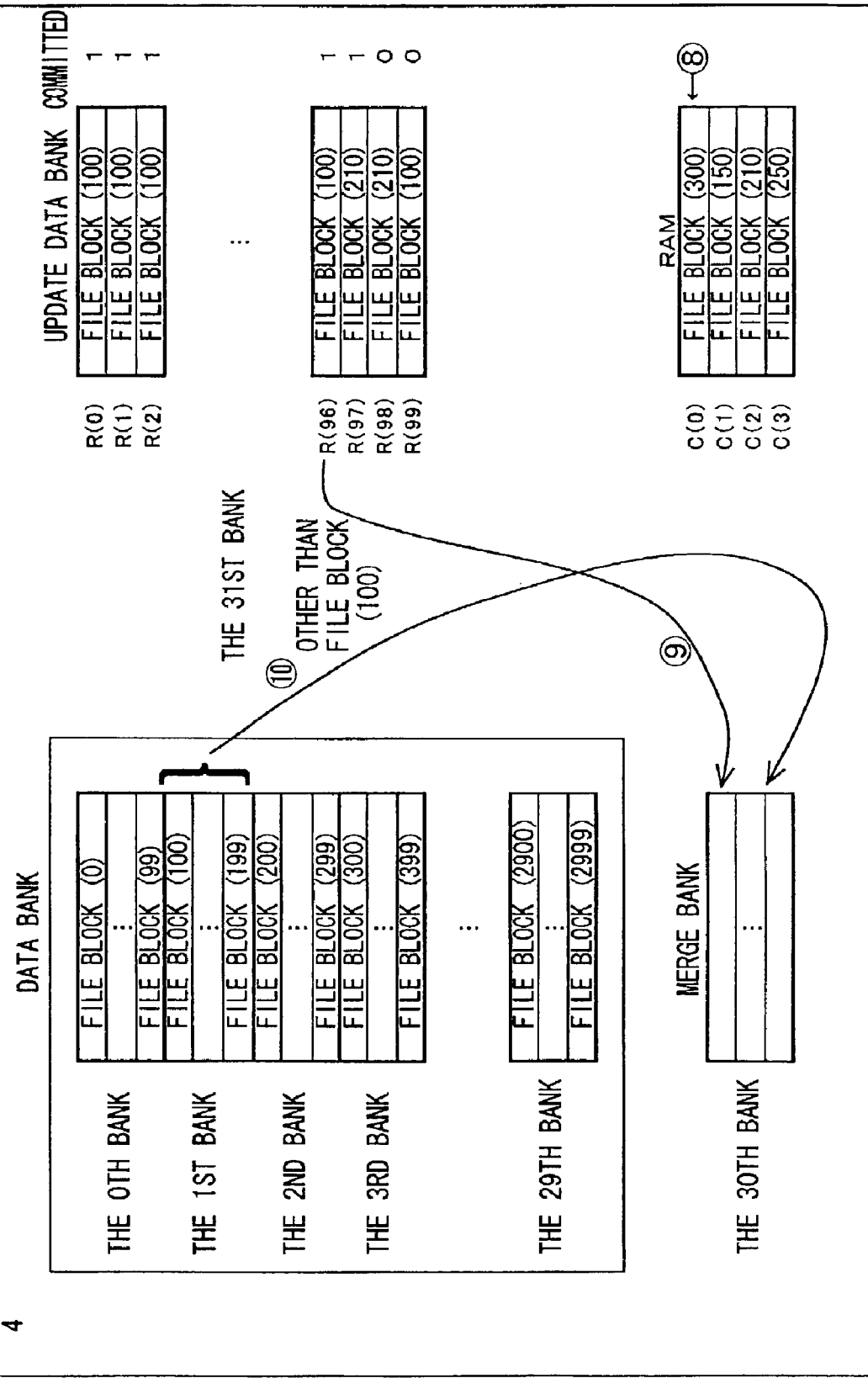
Figure 22:
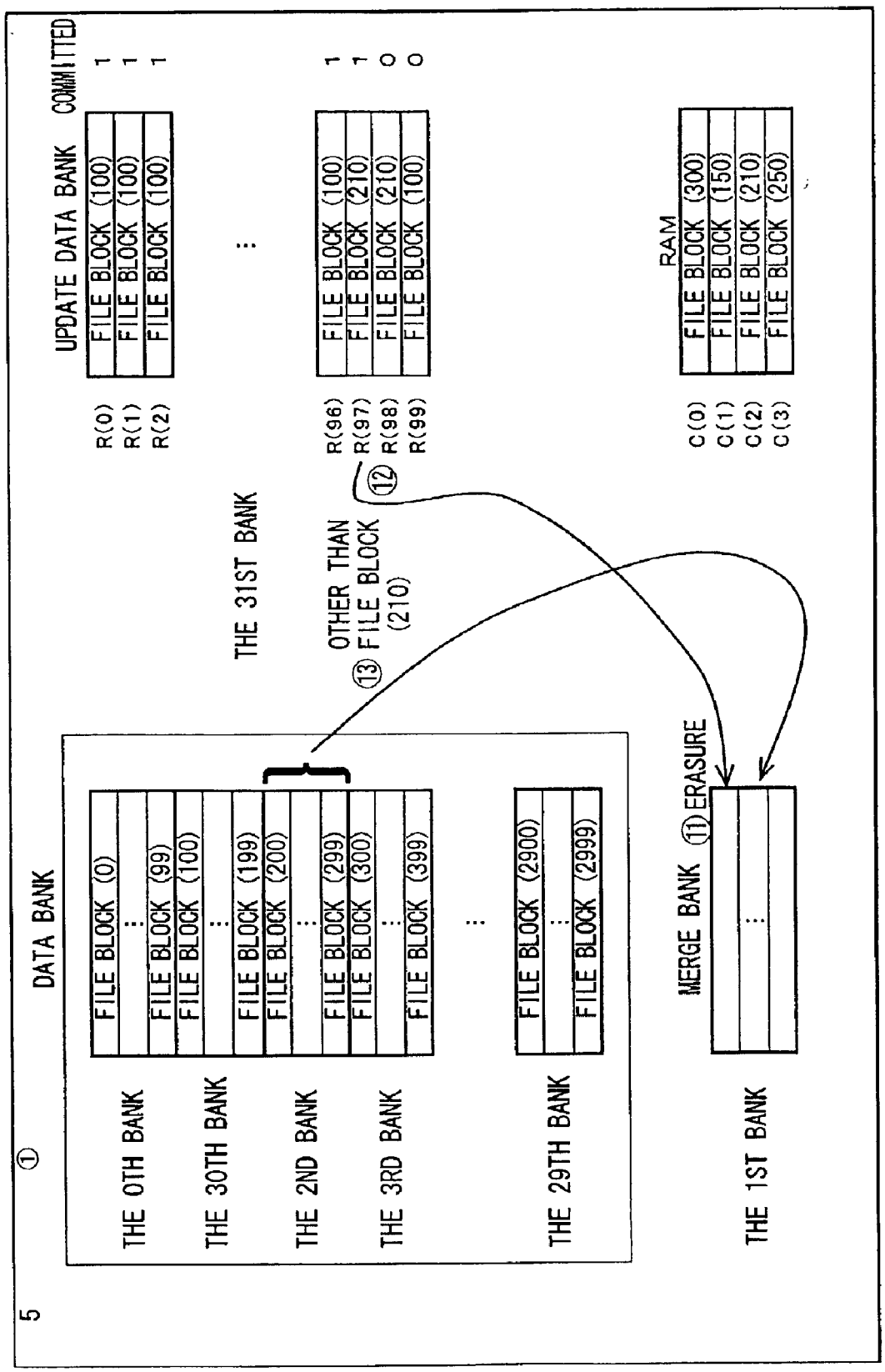
Figure 23:
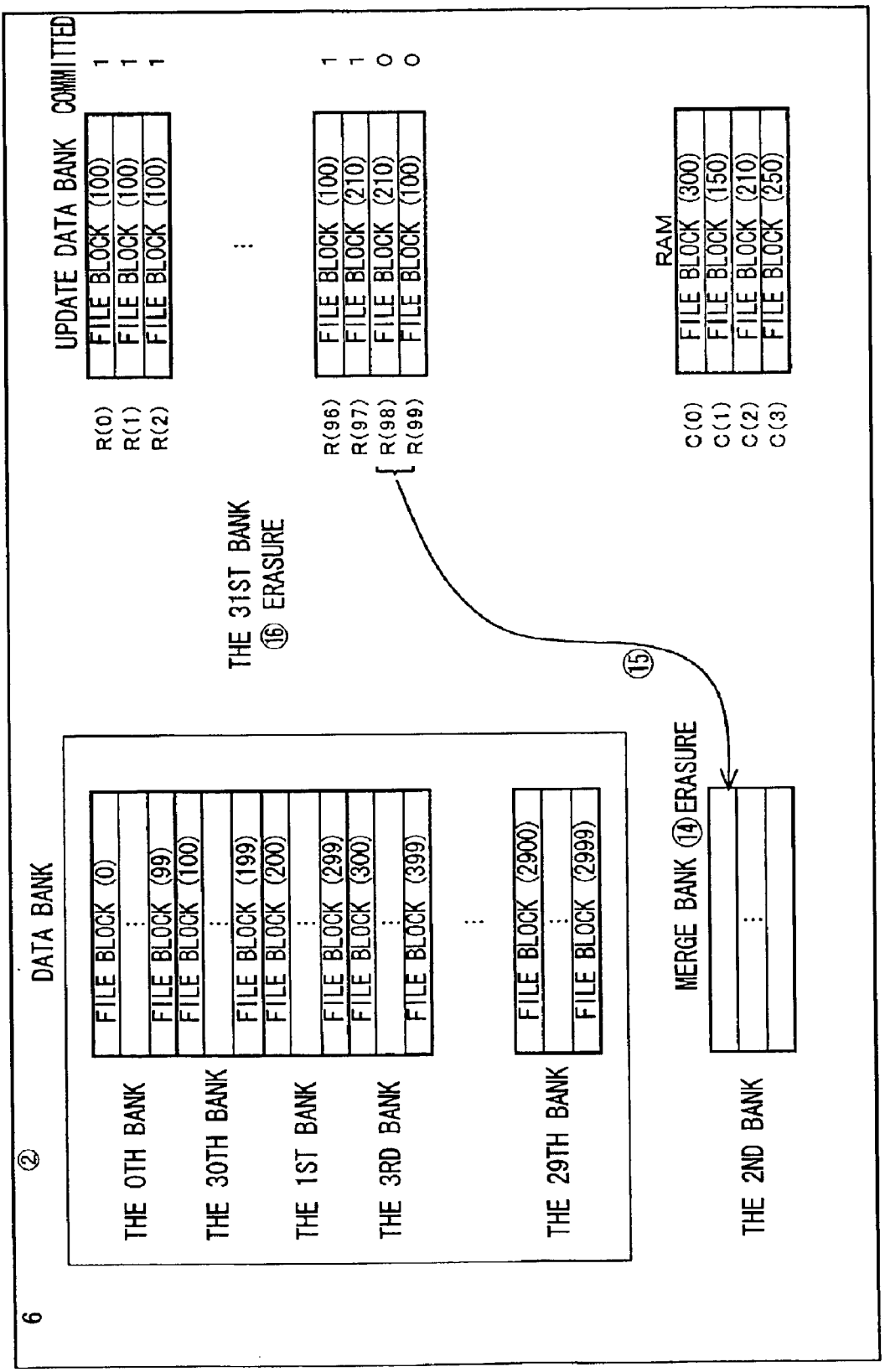
Figure 24:
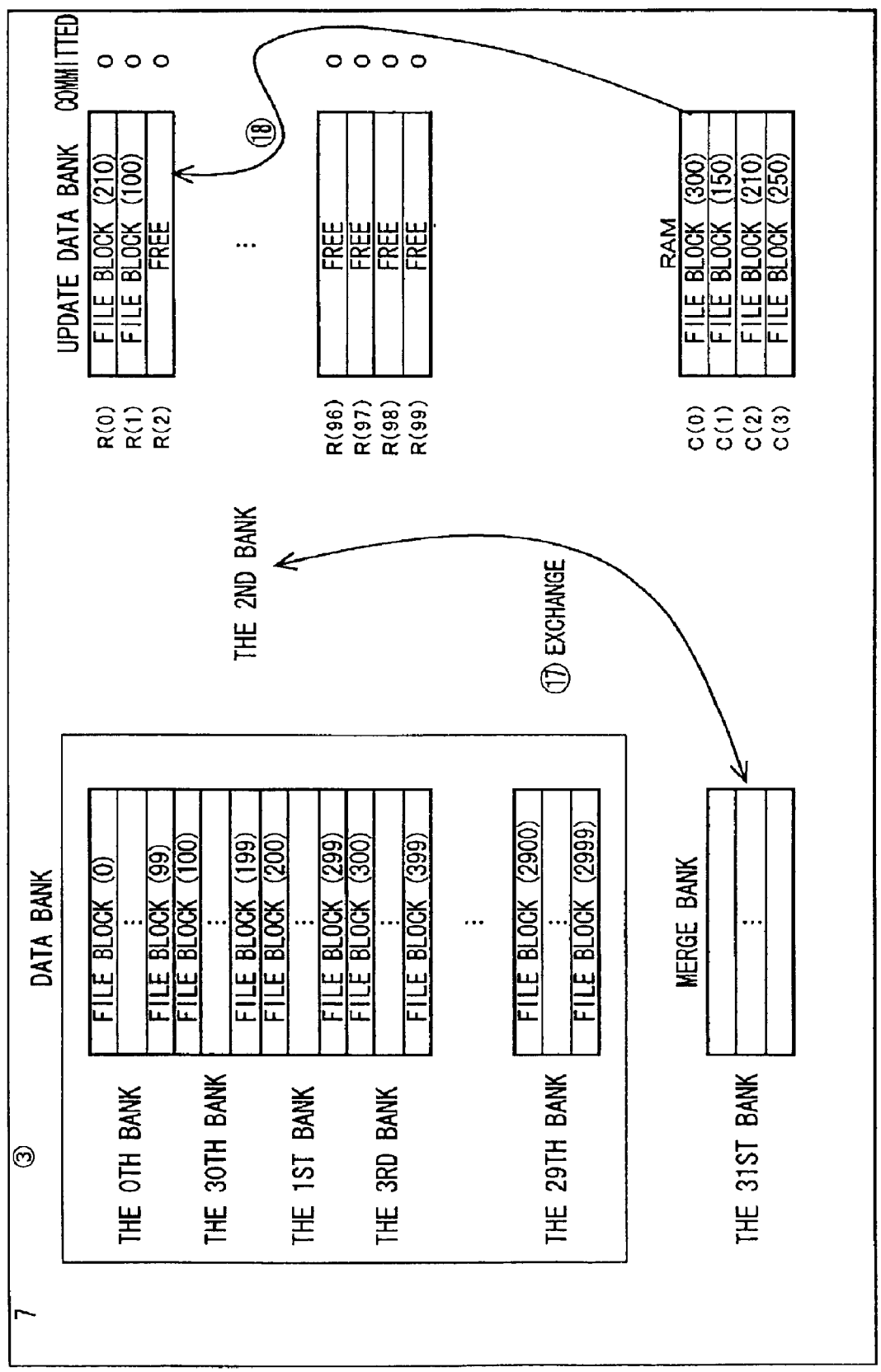
Figure 25:
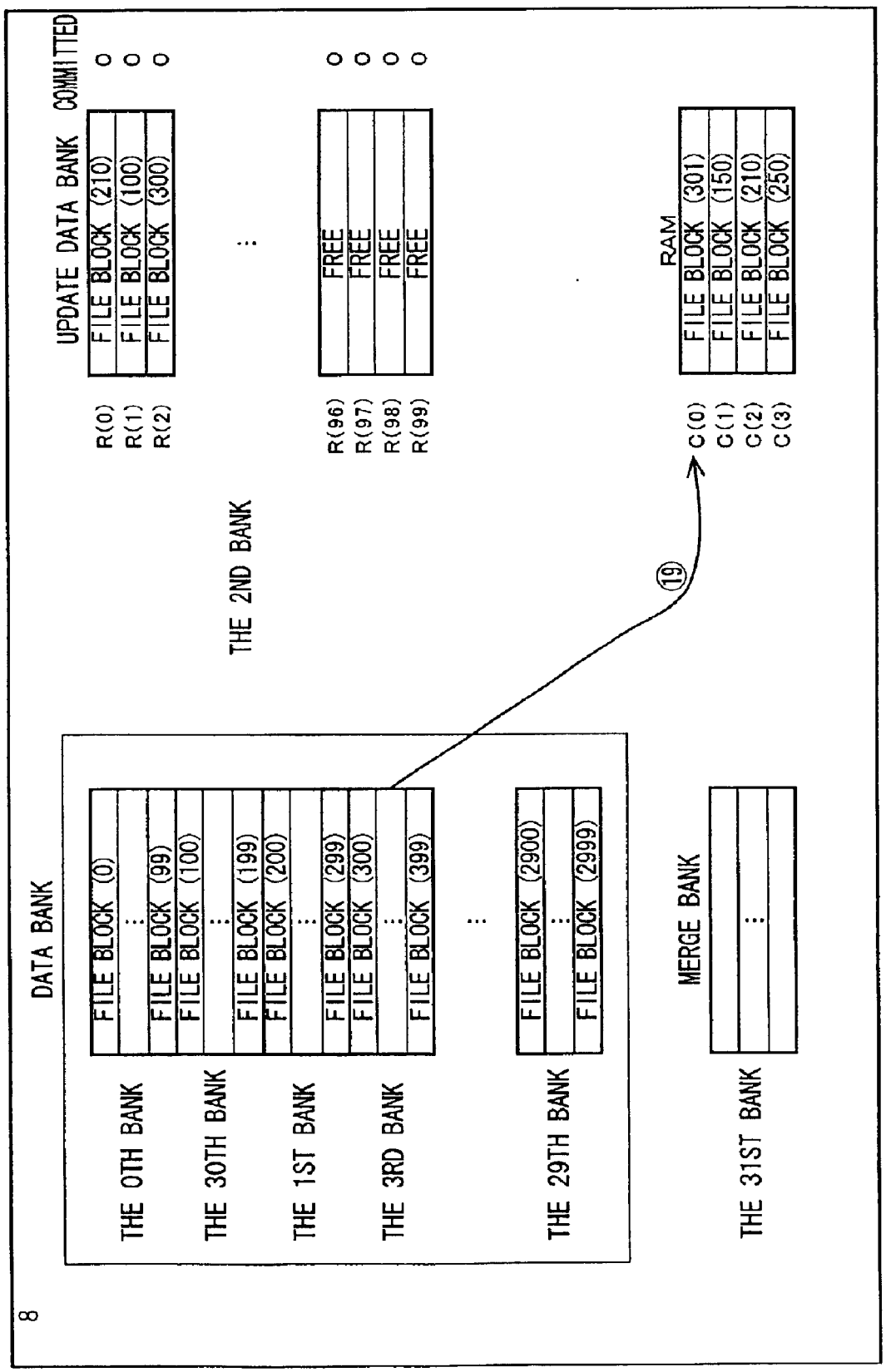

As shown in FIG. 18, in the initial state, thirty banks from the 0th bank to the 29th bank are set as data bank 2100, the 30th bank is set as merge bank 2200, and the 31st bank is set as update data bank 2300. In update data bank 2300, ninety-nine entries from R (0) to R (98) are used, with only one entry R (99) remaining free. Ninety-eight entries from R (0) to R (97) in update data bank 2300 have already been committed. In cache area 3100 of RAM 3000, file block (100) is stored in entry C (0), and file block (150) is stored in entry C (1). Entries C (2) and C (3) in cache area 3100 of RAM 3000 remain free.

1) The first target file block (100) is stored in entry C (0) in cache area 3100 of RAM 3000. Thus, the contents of entry C (0) are updated. This terminates the writing operation to file block (100).

2) The second target file block (210) is not stored in any entry in cache area 3100 of RAM 3000, but is stored in entry R (97) of update data bank 2300. Further, entries C (2) and C (3) in cache area 3100 of RAM 3000 are free. Thus, file block (210) stored in the committed entry R (97) in update data bank 2300 is stored into entry C (2) in cache area 3100 of RAM 3000. Here, entry R (98) in update data bank 2300 has not yet been committed. Thus, the data in file block (210) of R (98) may not match with the contents of the file management table, so that already-committed data is used rather than not-yet-committed data.

3) The contents of entry C (2) in cache area 3100 of RAM 3000 are updated. This terminates the writing operation to file block (210).

4) The third target file block (250) is stored neither in cache area 3100 of RAM 3000 nor in update data bank 2300. Moreover, entry C (3) in cache area 3100 of RAM 3000 is free. Thus, file block (250) in the second bank within data bank 2100 is stored into entry C (3) in cache area 3100 of RAM 3000.

5) The contents of entry C (3) in cache area 3100 of RAM 3000 are updated. This terminates the writing operation to file block (250).

6) The fourth target file block (300) is stored neither in cache area 3100 of RAM 3000 nor in update data bank 2300. Thus, file block (300) in the third bank of data bank 2100 is stored into an entry in cache area 3100 of RAM 3000. However, there is no free entry in cache area 3100 in RAM 3000. Hence, entry C (0) in cache area 3100 of RAM 3000 is stored into entry R (99) in the update data bank to free up entry C (0) in cache area 3100 of RAM 3000.

7) File block (300) in the third bank of data bank 2100 is stored into entry C (0) in cache area 3100 of RAM 3000.

8) The contents of entry C (0) in cache area 3100 of RAM 3000 are updated. This terminates the writing operation to file block (300).

9) The fifth target file block (301) is stored neither in cache area 3100 of RAM 3000 nor in update data bank 2300. Thus, file block (301) in the third bank of data bank 2100 is stored into an entry in cache area 3100 of RAM 3000. However, there is no free entry in cache area 3100 of RAM 3000, and also no free space in update data bank 2300. Accordingly, in order to create a free space in update data bank 2300, the newest R (96) in the committed file block (100) in update data bank 2300 is stored into merge bank 2200.

10) File blocks other than file block (100) in the first bank of data bank 2100 (file blocks (101) to (199)) are stored into merge bank 2200.

11) The first bank is erased to be in the initial state and is newly set as merge bank 2200. New file blocks (100) to (199) are stored in the 30th bank.

12) The newest R (97) in the committed file block (210) within update data bank 2300 is stored into merge bank 2200.

13) File blocks other than file block (210) in the second bank of data bank 2100 (file blocks (201) to (209) and file blocks (211) to (299)) are stored into merge bank 2200.

14) The second bank is erased to be in the initial state and is newly set as merge bank 2200. New file blocks (200) to (299) are stored in the first bank.

15) File blocks (210) and (100) stored in not-yet-committed entries R (98) and R (99) in update data bank 2300 are stored into merge bank 2200.

16) The 31st bank which was update data bank 2300 is erased.

17) The 31st bank which was update data bank 2300 is exchanged with the second bank which was a merge bank.

18) Entry C (0) in cache area 3100 of RAM 3000 is stored into entry R (2) of the update data bank, to free up entry C (0) in cache area 3100 of RAM 3000.

19) File block (301) in the third bank of data bank 2100 is stored into entry C (0) in cache area 3100 of RAM 3000. The contents of entry C (0) in cache area 3100 of RAM 3000 are updated. This terminates the writing operation to file block (301).

As described above, according to the file system of the present embodiment, the commit process is executed once a data rewrite command is terminated, allowing reproduction of secured consistency of the entire file system even if unexpected power shut-off occurs. In addition, it is not required to erase a bank every time data is written into one file block as in the conventional case, so that the number of bank erasures can be reduced for the same number of writings to file blocks. This increases the life of a flash memory and realizes a high speed process.

Second Embodiment

The file system according to the present embodiment executes a writing process different from that in the first embodiment described above. The other parts of the hardware configuration and the flow charts except for the process steps described below are similar to those in the first embodiment described above. Therefore, detailed description thereof will not be repeated here.

Figure 26A:
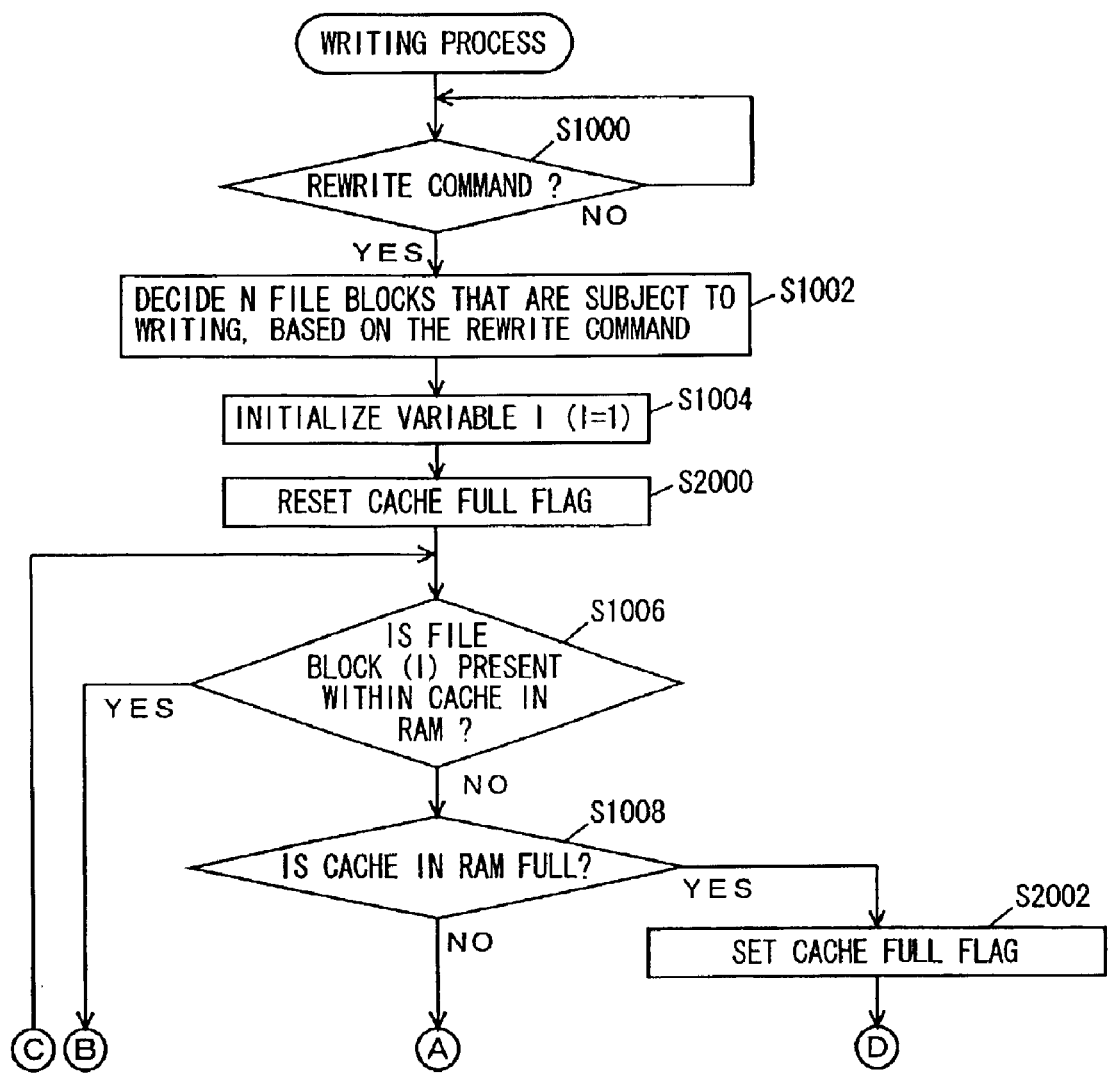
FIGS. 26A and 26B are flow charts illustrating the procedure of controlling a write process according to the second embodiment of the present invention.
Figure 26B:
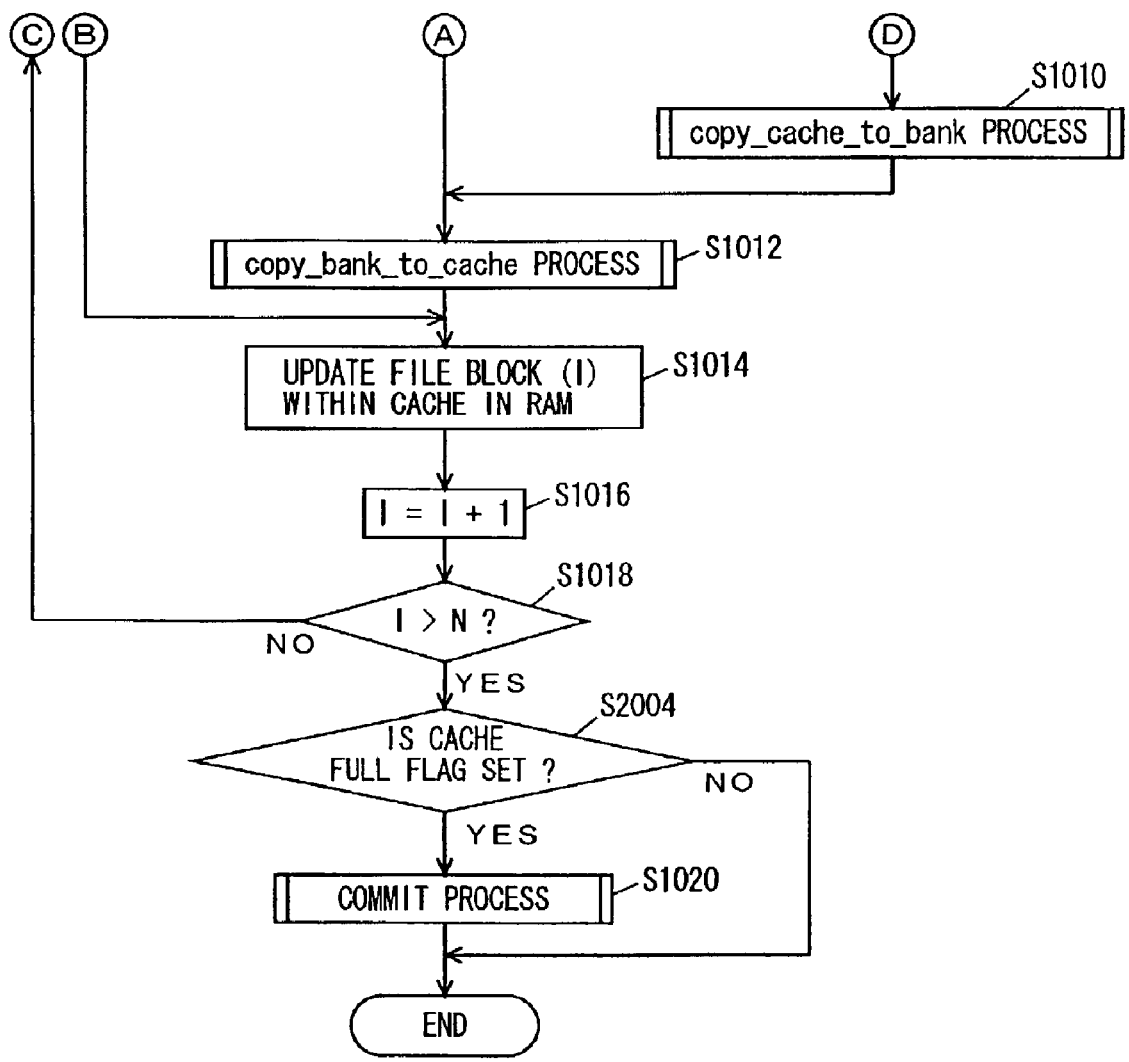

Referring to FIGS. 26A and 26B, the control structure of the writing process executed in the file system according to the present embodiment is described. It is noted that the process steps in FIGS. 26A and 26B that are the same as the ones in FIGS. 12A and 12B are denoted by the same step numbers. The processes thereof are also the same. Therefore, detailed description thereof will not be repeated here.

At S2000, after initializing variable I, CPU 1200 resets a cache full flag. At S2002, if there is no free space in cache area 3100 of RAM 3000, CPU 1200 sets the cache full flag. Thereafter, the copy_cache_to_bank process is executed. At S2004, if variable I is greater than the number of target file blocks N to which data is written in response to the rewrite command, CPU 1200 determines whether or not the cache full flag is set. If the cache full flag is set (YES at S2004), the process goes on to S1020. If not (NO at S2004), the writing process is terminated. At S1020, CPU 1200 executes a commit process. The commit process is similar to that in the first embodiment described earlier. Therefore, detailed description thereof will not be repeated here.

The operation of the file system according to the present embodiment, based on the structure and flow charts above, will be described with reference to FIGS. 27 and 28. In the description below, it is assumed that data is written into file blocks in response to one data rewrite command, in the order of file block (150), file block (151), and file block (100), and this data rewrite command is repeated. An example is that data are written into both file blocks (150) and (151), while the file size and time stamp are stored in file block (100). The operation proceeds in the ascending order of the circled numbers in FIGS. 27 and 28. The number at the head of each paragraph below corresponds to each of the circled numbers.

Figure 27:
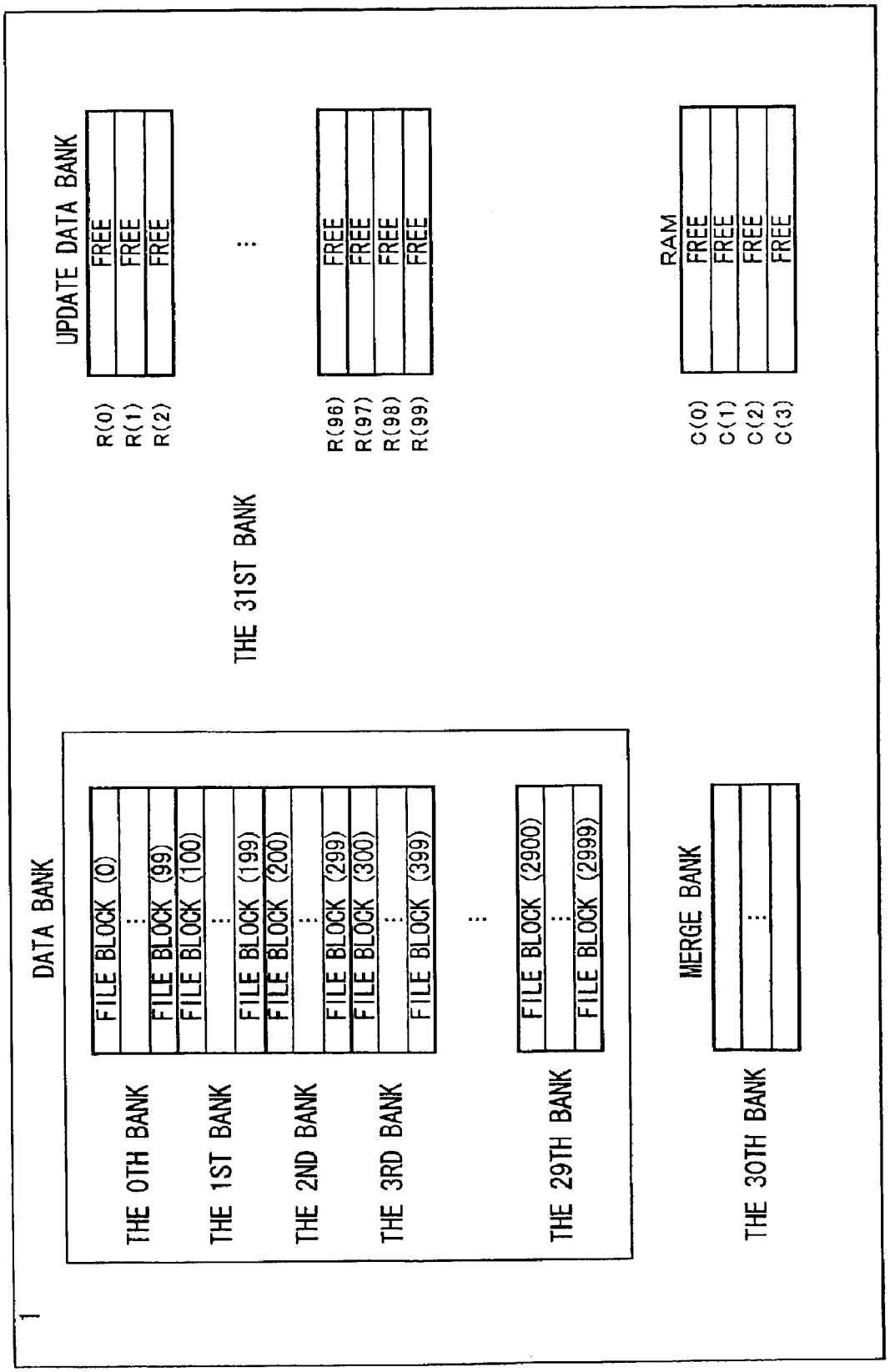
FIGS. 27 to 30 illustrate the change of contents stored in banks by a process according to the second embodiment of the present invention.
Figure 28:
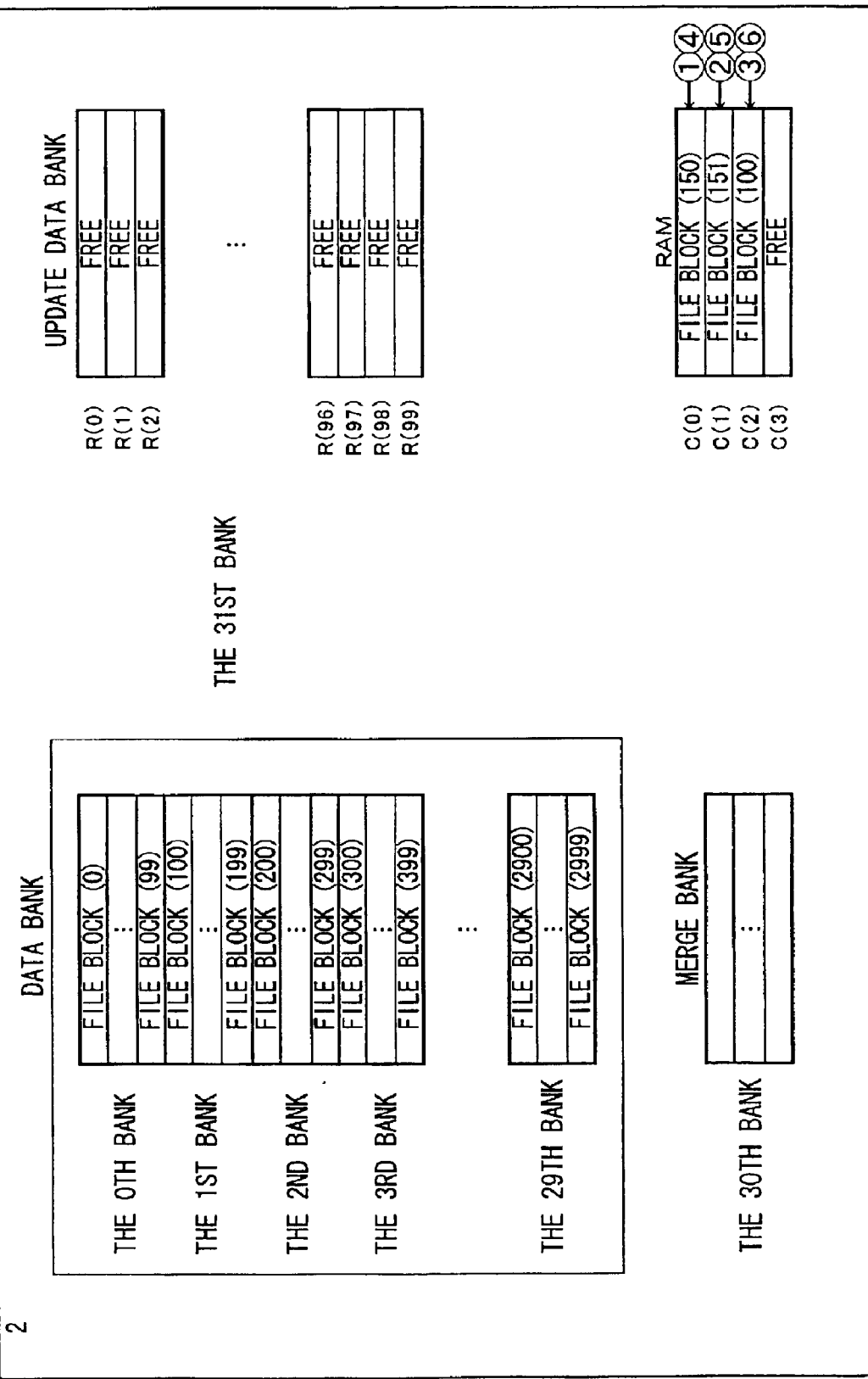

As shown in FIG. 27, in the initial state, thirty banks from the 0th bank to the 29th bank are set as data bank 2100, whereas the 30th bank is set as merge bank 2200 and the 31st bank is set as update data bank 2300. All entries in update data bank 2300 are free. All entries in cache area 3100 of RAM 3000 are also free.

1) The first target file block (150) is stored neither in cache area 3100 of RAM 3000 nor in update data bank 2300. Further, all entries in cache area 3100 of RAM 3000 are free. Thus, file block (150) in the first bank of data bank 2100 is stored into entry C (0) in cache area 3100 of RAM 3000. The contents of entry C (0) in cache area 3100 of RAM 3000 are updated. This terminates the writing operation to file block (150).

2) The second target file block (151) is stored neither in cache area 3100 of RAM 3000 nor in update data bank 2300. Further, entries other than entry C (0) in cache area 3100 of RAM 3000 are free. Thus, file block (151) in the first bank of data bank 2100 is stored into entry C (1) in cache area 3100 of RAM 3000. The contents of entry C (1) in cache area 3100 of RAM 3000 are updated. This terminates the writing operation to file block (151).

3) The third target file block (100) is stored in neither cache region 3100 of RAM 3000 nor in update data bank 2300. Further, entries other than entries C (0) and C (1) in cache area 3100 of RAM 3000 are free. Thus, file block (100) in the first bank of data bank 2100 is stored into entry C (2) in cache area 3100 of RAM 3000. The contents of entry C (2) in cache area 3100 of RAM 3000 are updated. This terminates the writing operation to file block (100). At this time point, since there is a free space in cache area 3100 of RAM 3000 (NO at S1008), no cache full flag is set. Accordingly, since the cache full flag has been reset (NO at S2004), no commit process is executed. As a result, no bank erasure is executed.

4) The fourth target file block (150) is stored in entry C (0) in cache area 3100 of RAM 3000. Thus, the contents of entry C (0) are updated. This terminates the writing operation to file block (150).

5) The fifth target file block (151) is stored in entry C (1) in cache area 3100 of RAM 3000. Thus, the contents of entry C (1) are updated. This terminates the writing operation to file block (151).

6) The sixth target file block (100) is stored in entry C (2) in cache area 3100 of RAM 3000. Thus, the contents of entry C (2) are updated. This terminates the writing operation to file block (100). From thereon, there is always a free space in cache area 3100 of RAM 3000 even if the data rewrite command is repeated, so that no commit process is executed. As a result, no bank erasure is executed.

The operation of the file system according to the first embodiment will be described, for comparison, with reference to FIGS. 29 and 30 in the case where the rewrite command to the same file block is repeated as in the present embodiment.

Figure 29:
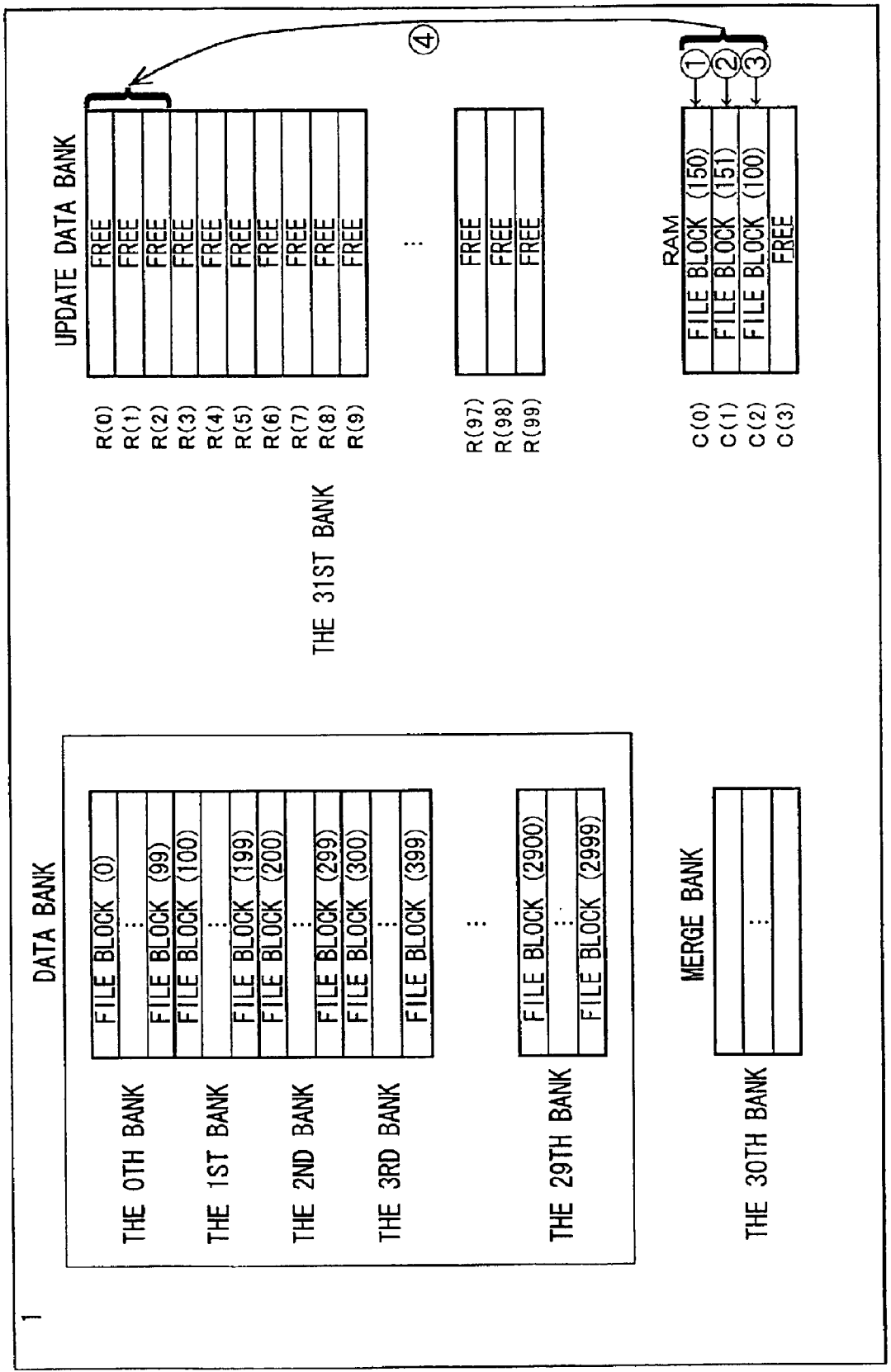

As shown in FIG. 29, the initial state is the same as that in FIG. 27.

1) For the first target file block (150), data is updated using a cache area (entry C (0)) of RAM 3000, as in the previous example.

2) For the second target file block (151), data is updated using a cache area (entry C (1)) of RAM 3000, as in the previous example.

3) For the third target file block (100), data is updated using a cache area (entry C (2)) of RAM 3000, as in the previous example.

4) When data update is terminated for file block (150), file block (151) and file block (100) that correspond to one rewrite command, a commit process is performed. That is, data is copied from entry C (0), entry C (1) and entry C (2) in cache area 3100 of RAM 3000 to entry R (0), entry R (1) and entry R (2) in update data bank 2300. Then, the copy_cache_to_bank process is executed.

Figure 30:
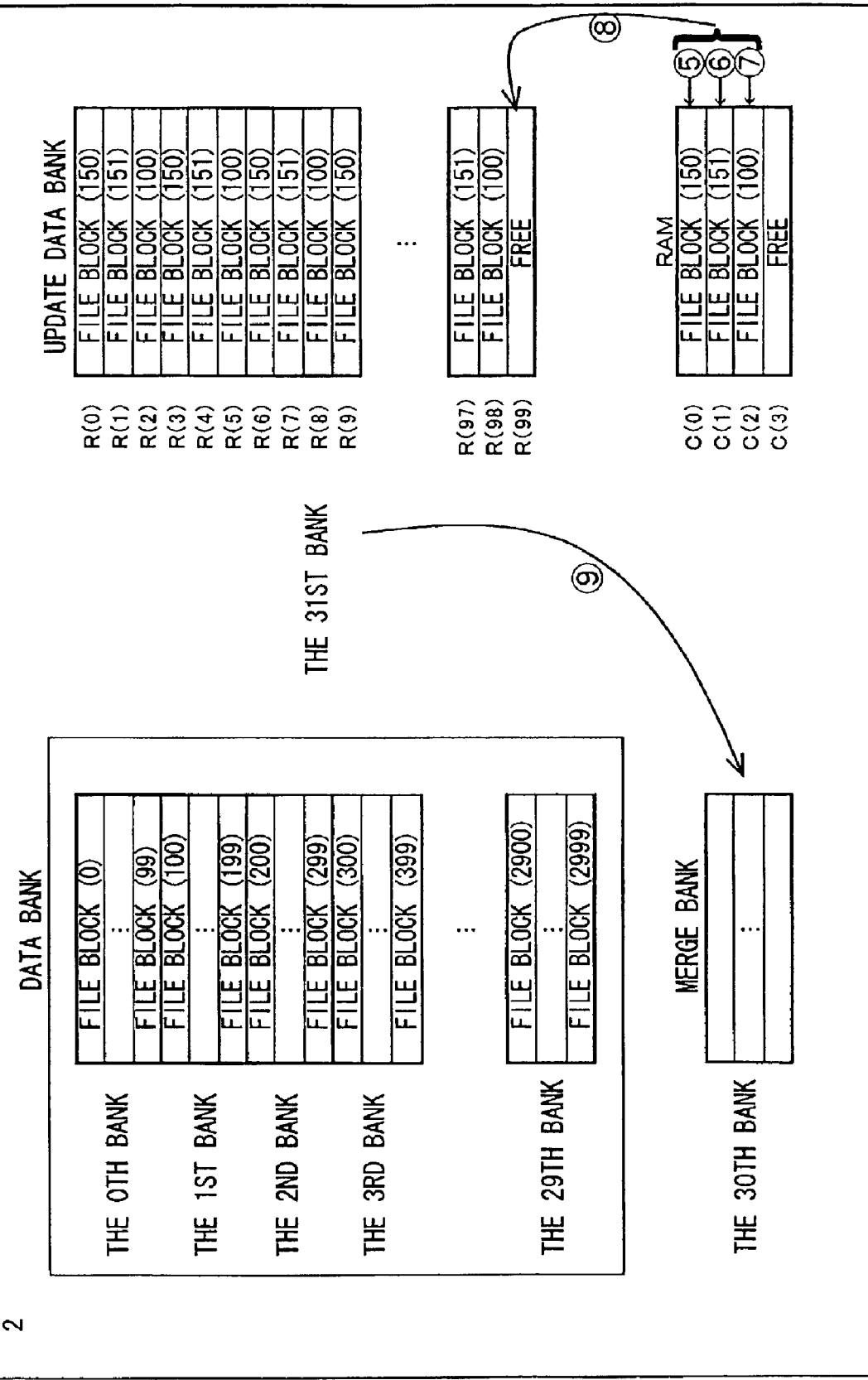

After repeating such data rewrite command thirty-three times, update data bank 2300 will have no free space except for entry (99), as shown in FIG. 30.

5) A cache area (entry C (0)) of RAM 3000 is used to update data for the first target file block (150) in response to the 34th data rewrite command, as in the previous example.

6) A cache area (entry C (1)) of RAM 3000 is used to update data for the second target file block (151), as in the previous example.

7) A cache area (entry C (2)) of RAM 3000 is used to update data for the third target file block (100), as in the previous example.

8) When data update is terminated for file block (150), file block (151) and file block (100) that correspond to one data rewrite command, a commit process is performed.

9) However, there is no free space in update data bank 2300. Thus, in order to create a free space in update data bank 2300, the newest file block (100) of the committed file blocks in update data bank 2300 is stored into merge bank 2200. As such, a merge process is performed in response to the 34th data rewrite command, and bank erasure is executed.

As described above, according to the file system of the present embodiment, a commit process is performed only as required (for example, when there is no free space in cache area 3100 of RAM 3000), rather than performed upon termination of one data rewrite command. This can reduce the number of bank erasures, increasing the life of a flash memory and realizing a high-speed process.

Thus, a cache full flag is provided that indicates whether or not there is a free space in a cache. If there is no free space in the cache, the state of the cache full flag is changed from "reset" to "set", and a commit process is performed only when the flag is set. This can avoid unnecessary procedure such that a commit process is executed when it is not required because there is a free space in the cache. Moreover, by thus executing the commit process as required, the secured consistency of the entire file system can be reproduced even if unexpected power shut-off and the like occur.

Third Embodiment

The file system according to the present embodiment is implemented using an SRAM (Static Random Access Memory) having a backup power-supply for update data bank 2300 in the first embodiment. Referring to FIG. 31, the internal structure of the memory in the file system according to the present embodiment is descried. As shown in FIG. 31, the memory in the file system according to the present embodiment includes a flash memory 2101 constituted by data bank 2100 and merge bank 2200, and an SRAM2301 constituted by an update data bank. The configuration of the other parts and the flow charts except for the process steps described below are the same as those in the first embodiment described earlier. Therefore, detailed description thereof will not be repeated here.

As the file system according to the present embodiment is implemented using the SRAM as an update data bank, there is no limit for data writing to the update data bank, compared to the case where a flash memory is used for the update data bank. Such a difference results in a different copy_cache_to_bank process and a different merge process in the file system according to the present embodiment, compared to those in the file system according to the first embodiment.

Figure 32A:
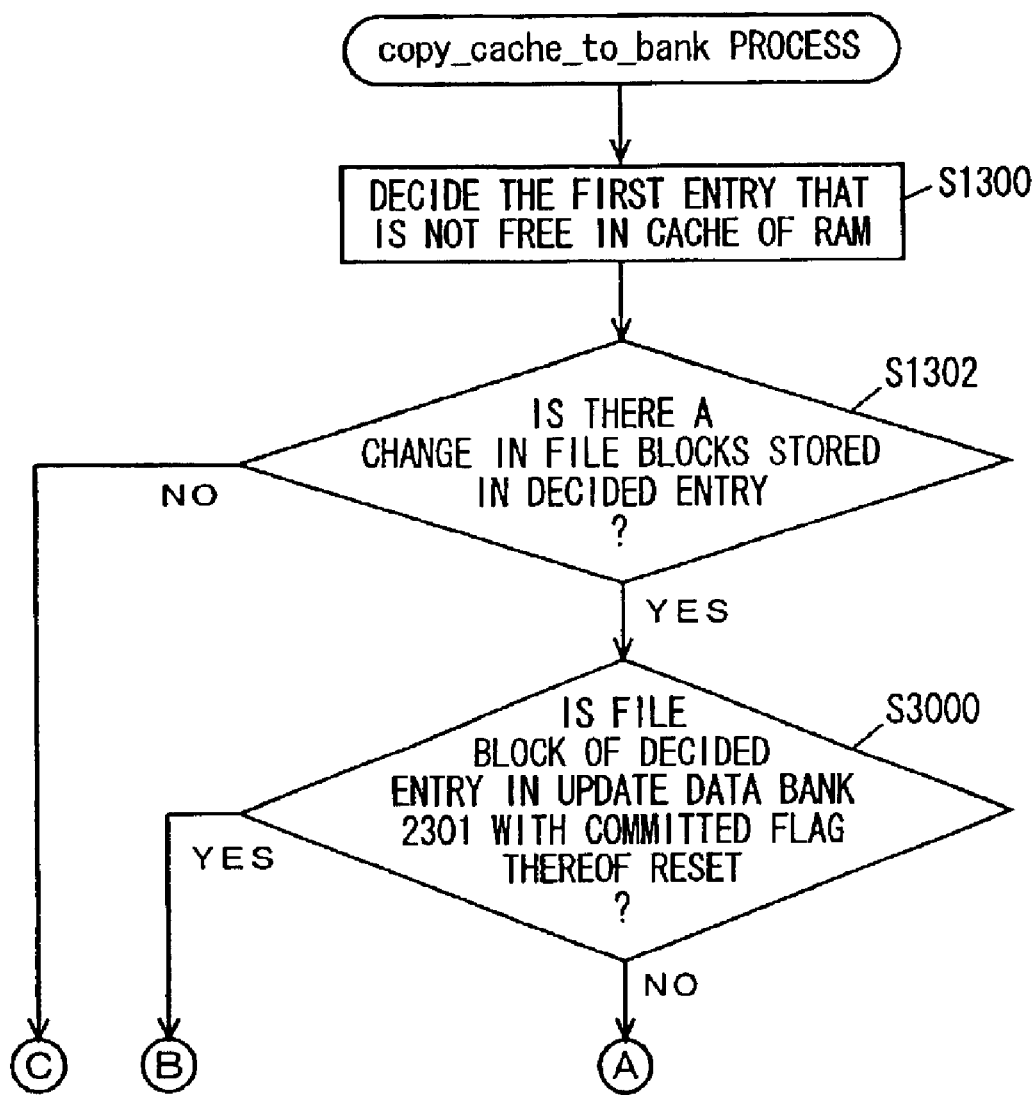
FIGS. 32A and 32B are flow charts showing the procedure of controlling a copy_cache_to_bank process according to the third embodiment of the present invention.
Figure 32B:
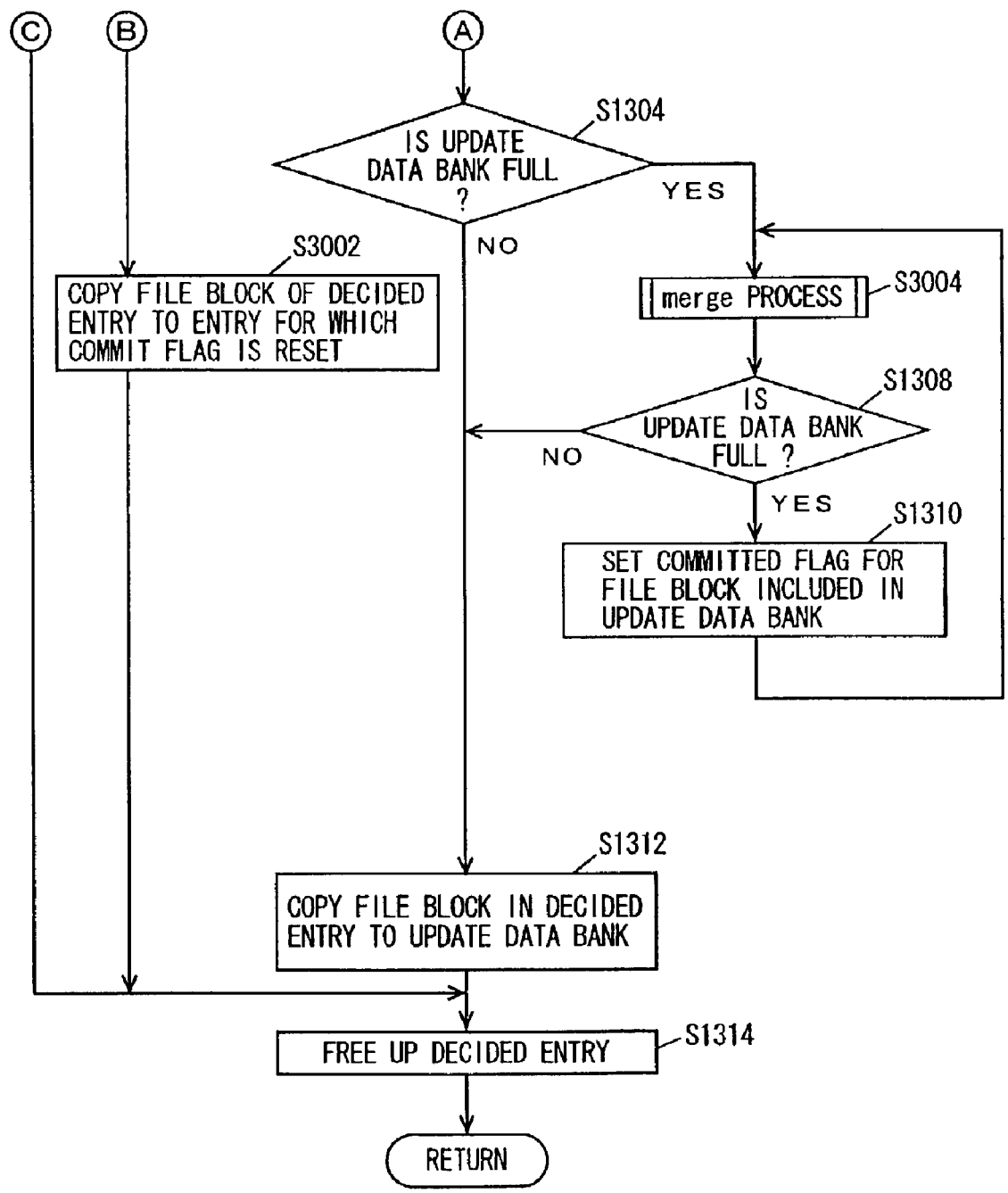

Referring to FIGS. 32A and 32B, the copy_cache_to_bank process executed in the file system according to the present embodiment is described. It is noted that the process steps in FIGS. 32A and 32B that are the same as the ones in FIG. 15 are denoted by the same step numbers. The processes thereof are also the same. Therefore, detailed description thereof will not be repeated here.

At S3000, CPU 1200 determines whether or not the file block of the decided entry is in update data bank 2301 and the committed flag thereof has been reset. If the file blocks of the decided entry is in update data bank 2301 and the committed flag thereof has already been reset (YES at S3000), the process goes on to S3002. If not (NO at S3000), the process goes on to S1304.

At S1304, CPU 1200 determines whether or not update data bank 2301 is full. If the update data bank is full (YES at S1304), the process goes on to S3004. If not (NO at S1304), the process goes on to S1312.

At S3002, CPU 1200 copies the file blocks of the decided entry to the entry for which the commit flag is reset.

At S3004, CPU 1200 executes a merge process. The merge process executed at S3004 is different from the merge process in the first embodiment described earlier.

Figure 33A:
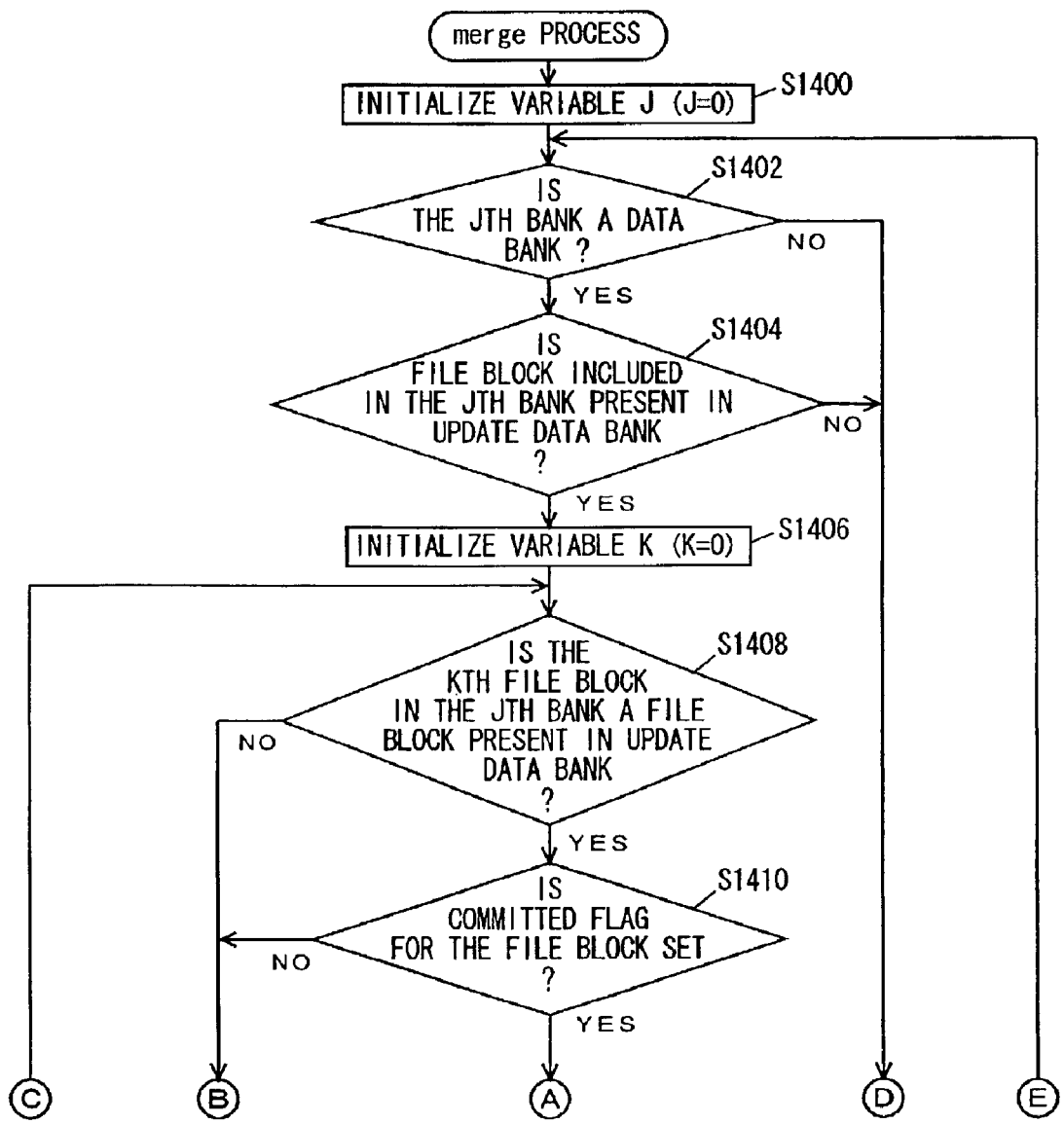
FIGS. 33A and 33B are flow charts showing the procedure of controlling a merge process according to the third embodiment of the present invention.
Figure 33B:
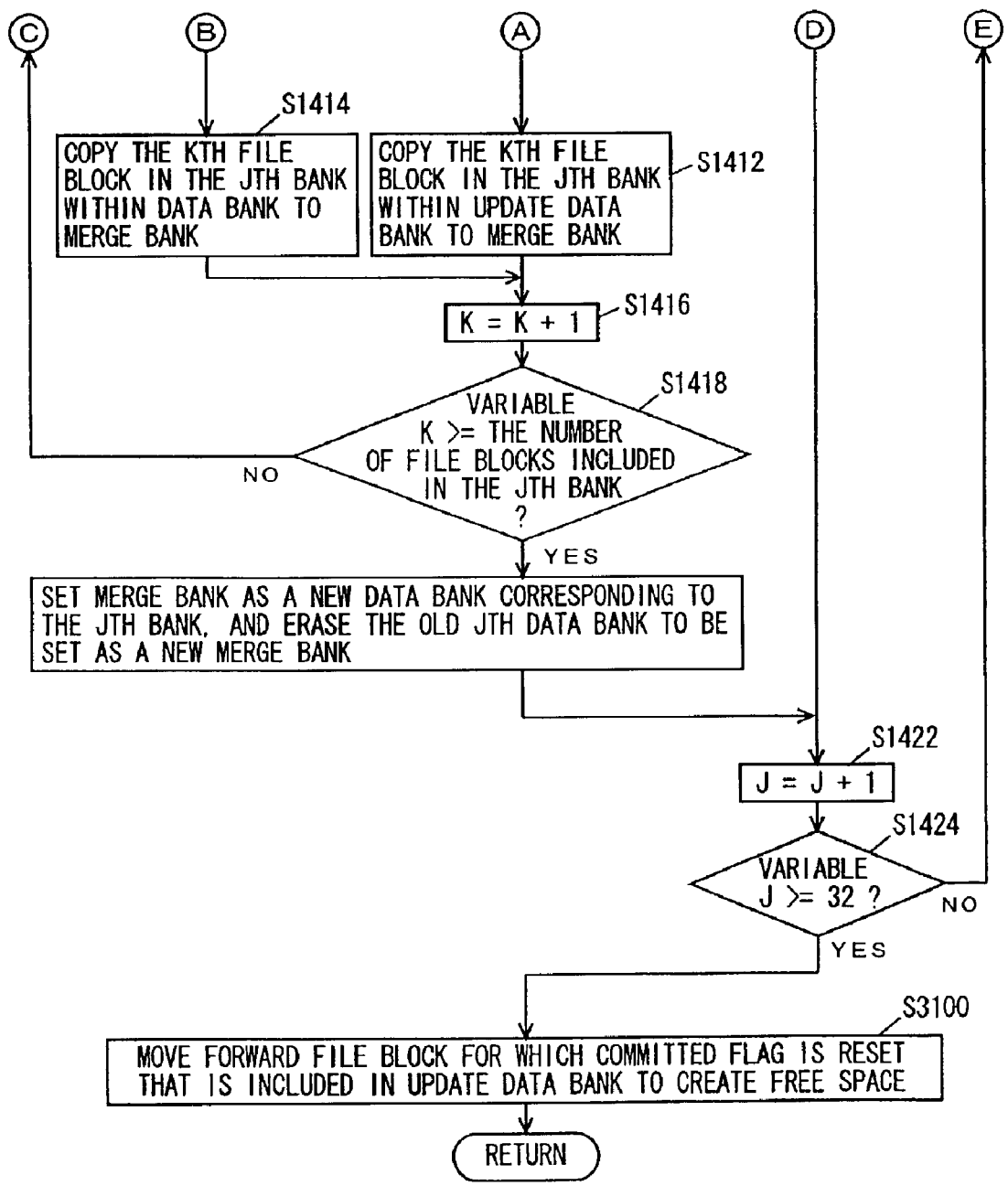
Figure 36:
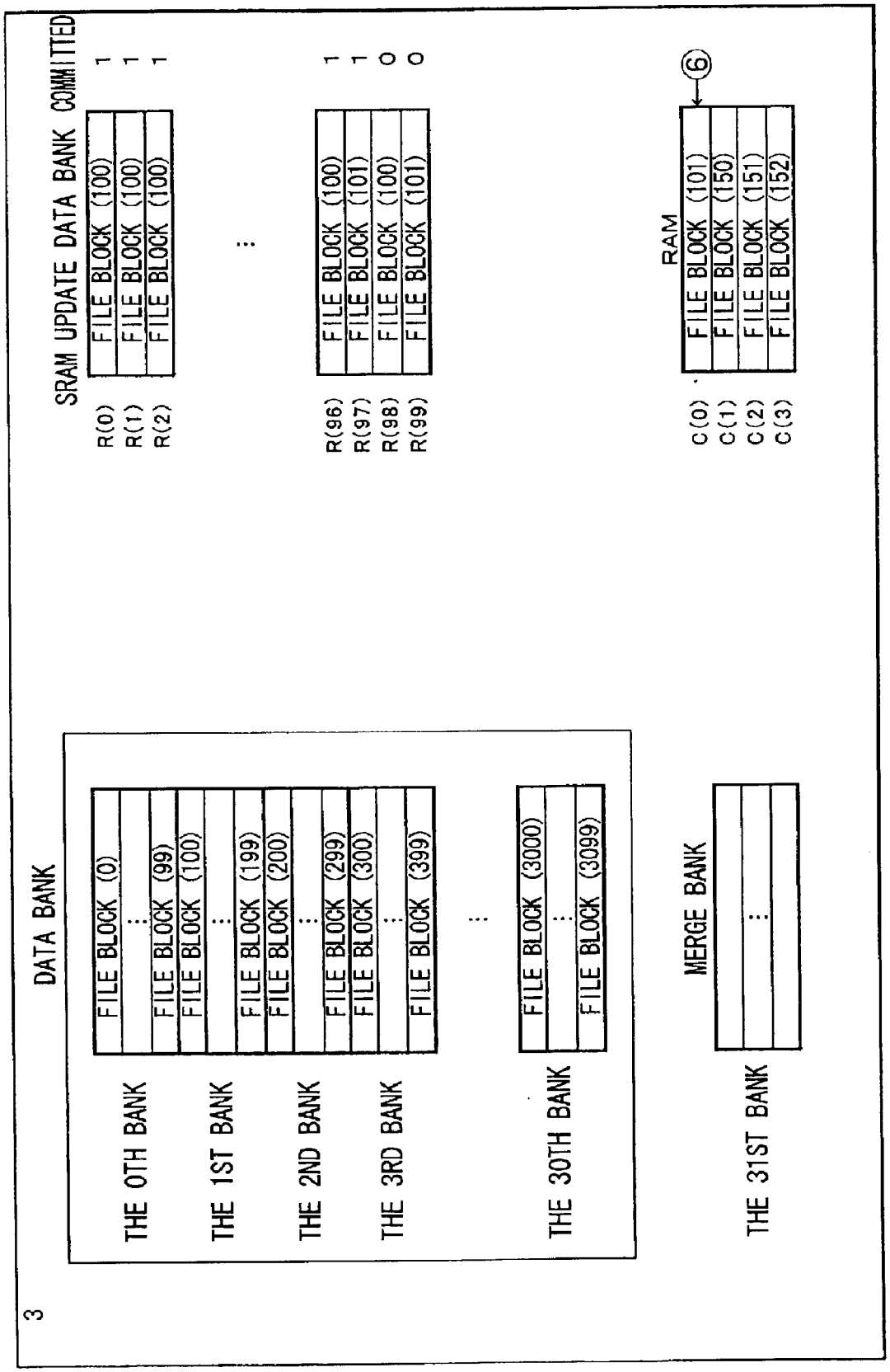
Figure 37:
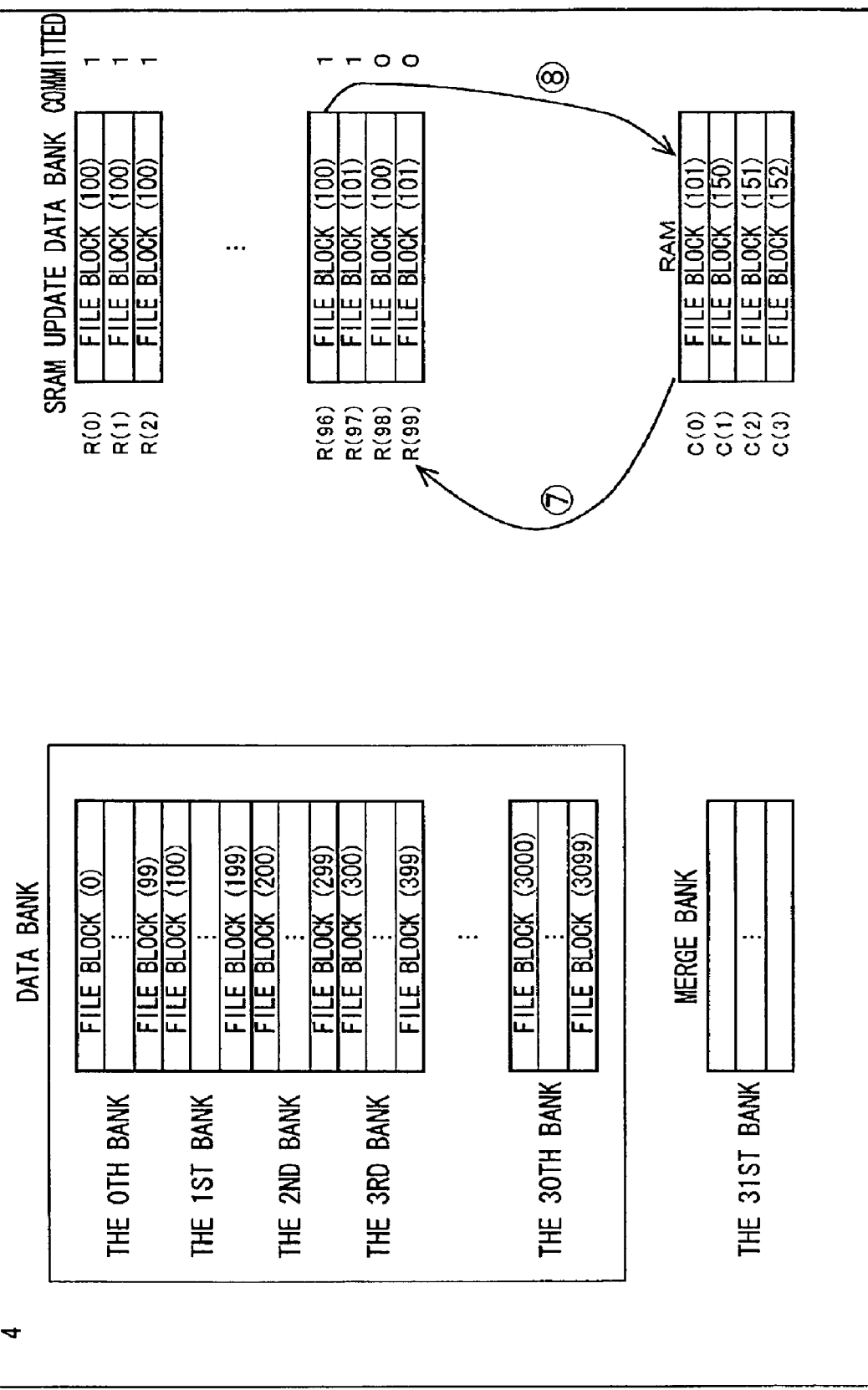
Figure 38:
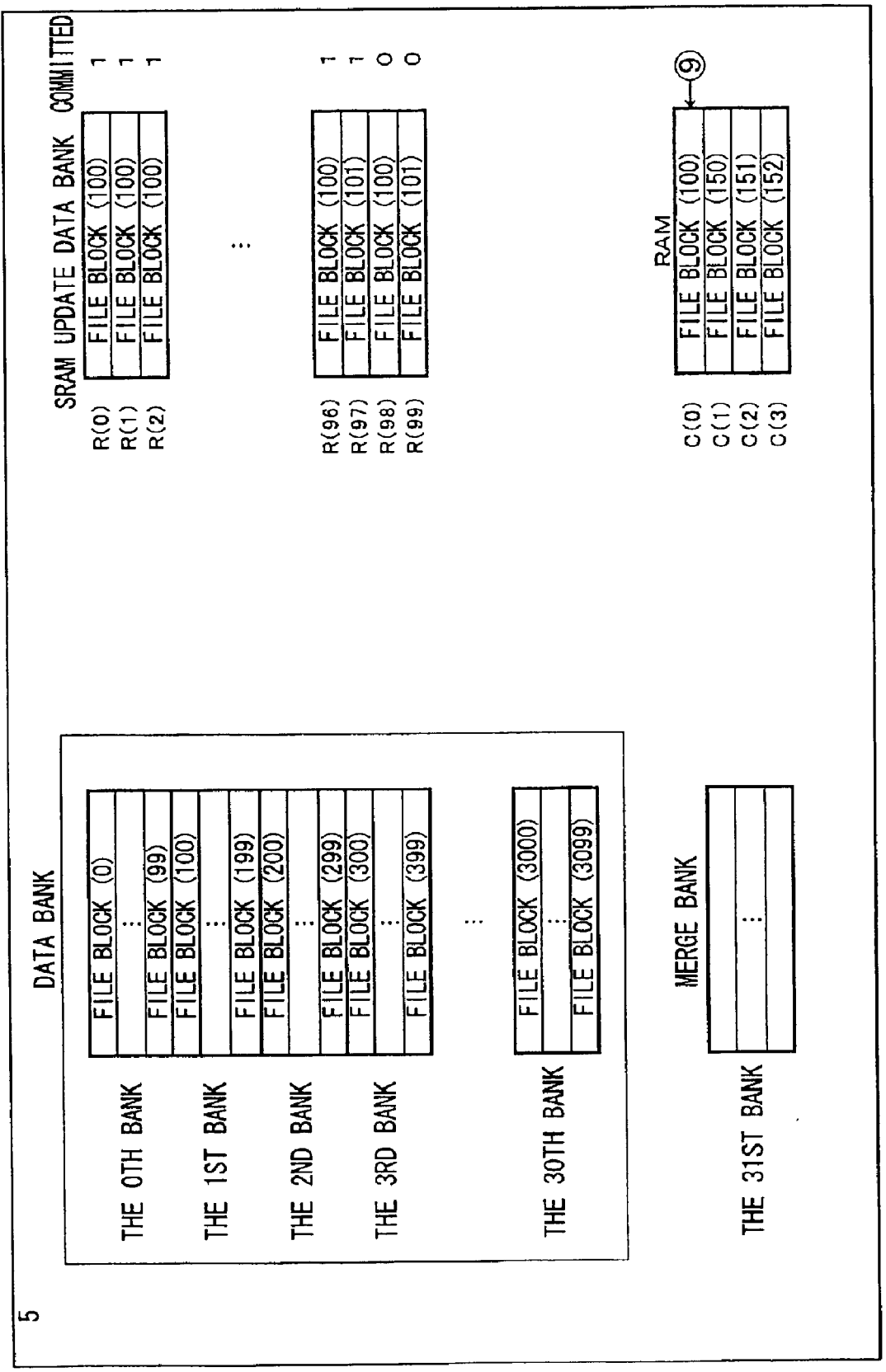

Referring to FIGS. 33A and 33B, the control structure of the merge process executed in the file system according to the present embodiment is described. It is noted that the process steps in FIGS. 33A and 33B that are the same as the ones in FIGS. 16A and 16B are denoted by the same step numbers. The processes thereof are also the same. Therefore, detailed description thereof will not be repeated here.

At S3100, if variable J is greater than or equal to 32, CPU 1200 moves forward the file block for which the committed flag is reset that is included in update data bank 2301, to create a free space. Subsequently, the merge process is terminated.

The operation of the file system according to the present embodiment, based on the structure and flow charts as described above, will be described with reference to FIGS. 34 to 38. In the description below, it is assumed that data is alternately written into file block (100) and file block (101) in response to one data rewrite command, which is repeated. The operation proceeds in the ascending order of circled numbers in FIGS. 34 to 38. The number at the head of each paragraph below corresponds to each of the circled numbers.

As shown in FIG. 34, in the initial state, thirty-one banks from the 0th bank to the 30th bank are set as data bank 2100, whereas the 31st bank is set as merge bank 2200. Update data bank 2301 configured by the SRAM is occupied except for entry R (99). File blocks in update data bank 2301 have already been committed except for the ones in entries R (98) and R (99). There is no free entry in cache area 3100 of RAM 3000.

1) The first target file block (100) is not stored in any entry in cache area 3100 of RAM 3000, but is stored in entry R (96) within update data bank 2301. Moreover, there is no free entries in cache area 3100 of RAM 3000. Thus, entry C (0) in cache area 3100 of RAM 3000 is stored in entry R (99) in the update data bank to free up entry C (0) in cache area 3100 of RAM 3000.

2) File block (100) stored in entry R (96) in update data bank 2301 is stored into entry C (0) in cache area 3100 of RAM 3000.

3) The contents of entry C (0) in cache area 3100 of RAM 3000 are updated. This terminates the writing operation to file block (100).

4) The second target file block (101) is not stored in an entry within cache area 3100 of RAM 3000, but is stored in entry R (97) in update data bank. Moreover, there is no free entries in cache area 3100 of RAM 3000. Thus, entry C (0) in cache area 3100 of RAM 3000 is stored into entry R (98) storing not-yet committed file block (100), to free up entry C (0) in cache area 3100 of RAM 3000.

5) File block (101) stored in entry R (97) in update data bank 2301 is stored into entry C (0) in cache area 3100 of RAM 3000.

6) The contents of entry C (0) in cache area 3100 of RAM 3000 are updated. This terminates the writing operation to file block (101).

7) The third target file block (100) is not stored in an entry within cache area 3100 of RAM 3000, but stored in entry R (96) in update data bank 2301. Further, there is no free entry in cache area 3100 of RAM 3000. Thus, entry C (0) within cache area 3100 of RAM 3000 is stored into entry R (99) storing not-yet-committed file block (101) to free up entry C (0) in cache area 3100 of RAM 3000.

8) File block (100) stored in entry R (96) of update data bank 2301 is stored into entry C (0) in cache area 3100 of RAM 3000.

9) The contents of entry C (0) in cache area 3100 of RAM 3000 are updated. This terminates the writing operation to file block (100). Writing operation to file block (101) is further executed.

As described above, according to the file system of the present embodiment, the update data bank is configured by the SRAM, allowing overwriting to the same file block. This can avoid lack of free space in the update data bank and can reduce the number of bank erasures, increasing the life of a flash memory and realizing a high-speed process.

Fourth Embodiment

The file system according to the present embodiment executes a merge process different from the one for the file system according to the first embodiment described earlier. The other parts of the hardware configuration and flow charts are the same as the ones in the first embodiment, except for the process steps described below. Therefore, detailed description thereof are not be repeated here.

Figure 39A:
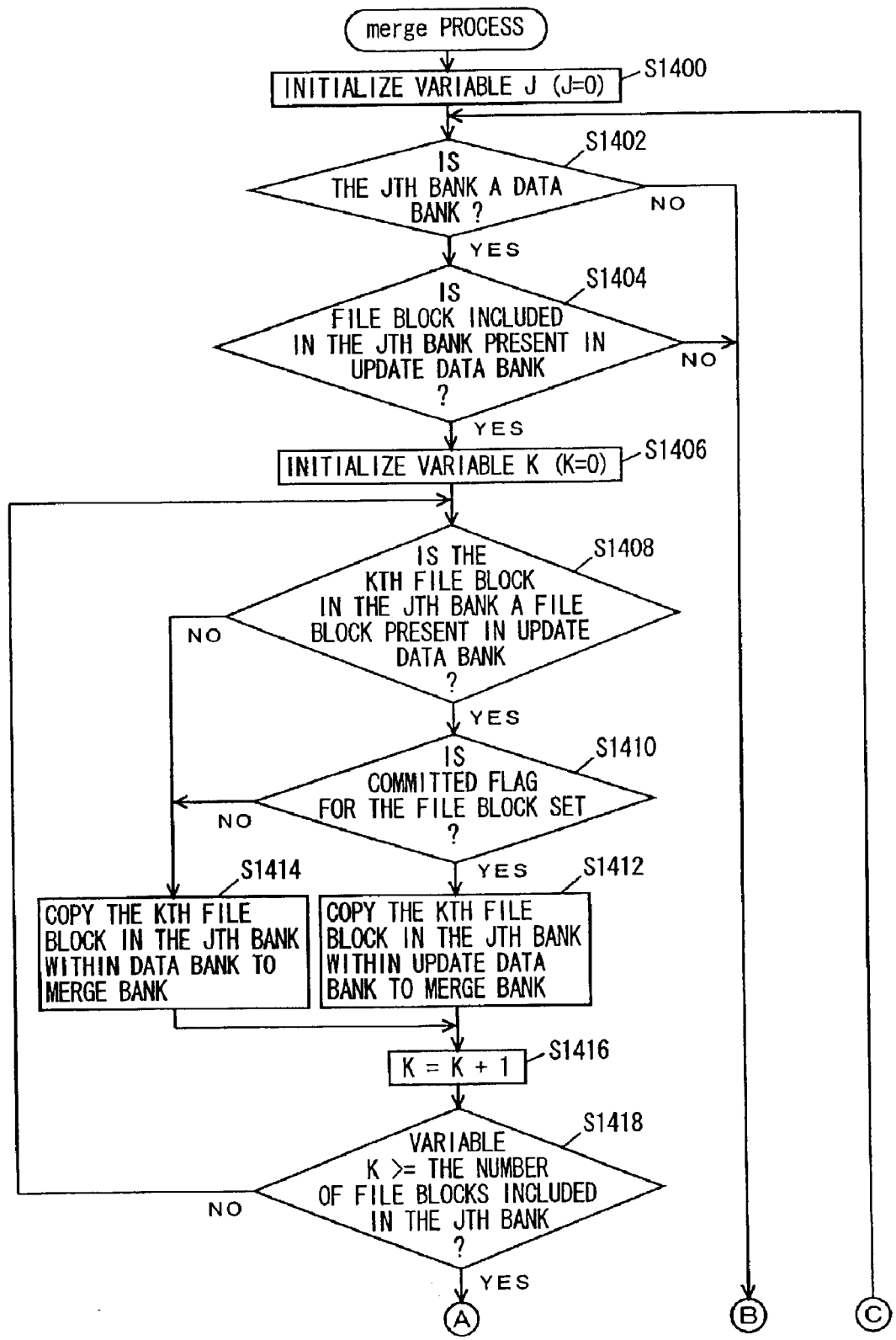
FIGS. 39A and 39B are flow charts showing the procedure of controlling a merge process according to the fourth embodiment of the present invention.
Figure 39B:
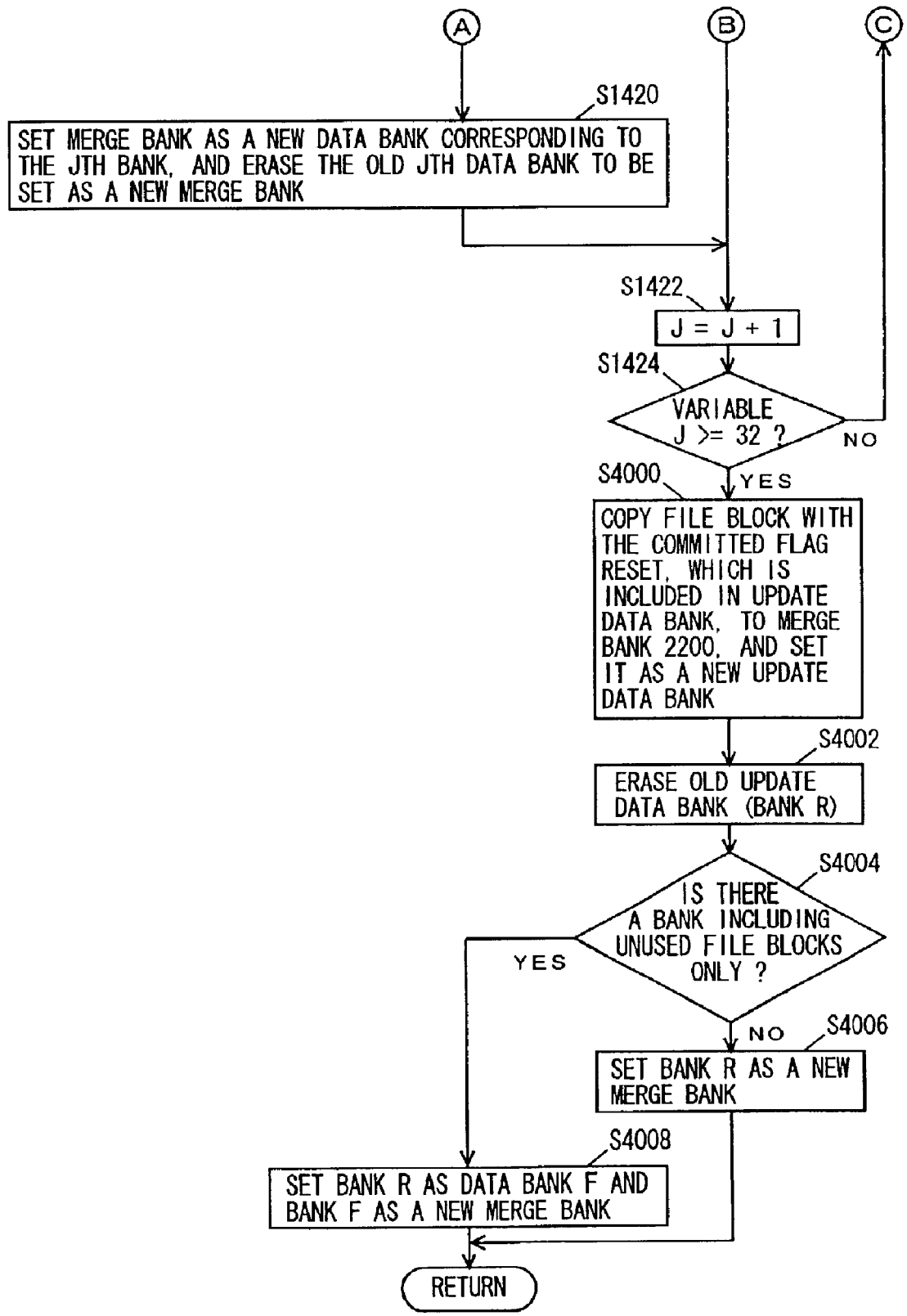

Referring to FIGS. 39A and 39B, the control structure of the merge process executed in the file system according to the present embodiment is described. It is noted that the process steps in FIGS. 39A and 39B that are the same as the ones in FIGS. 16A and 16B are denoted by the same step numbers. The processes thereof are also the same. Therefore, detailed description thereof will not be repeated here.

At S4000, CPU 1200 copies a file block with the committed flag reset, which is included in update data bank 2300, to merge bank 2200, which is then set as a new update data bank. At S4002, CPU 1200 erases the old update data bank. This bank is called a bank R. At S4004, CPU 1200 determines whether or not there is a bank including unused file blocks only. If there is a bank including unused file blocks only (YES at S4004), the process goes on to S4008. If not (NO at S4004), the process goes on to S4006.

At S4006, CPU 1200 sets bank R as a new merge bank. At S4008, CPU 1200 sets that bank as a data bank F, and sets the old bank F as a new merge bank.

Figure 41:
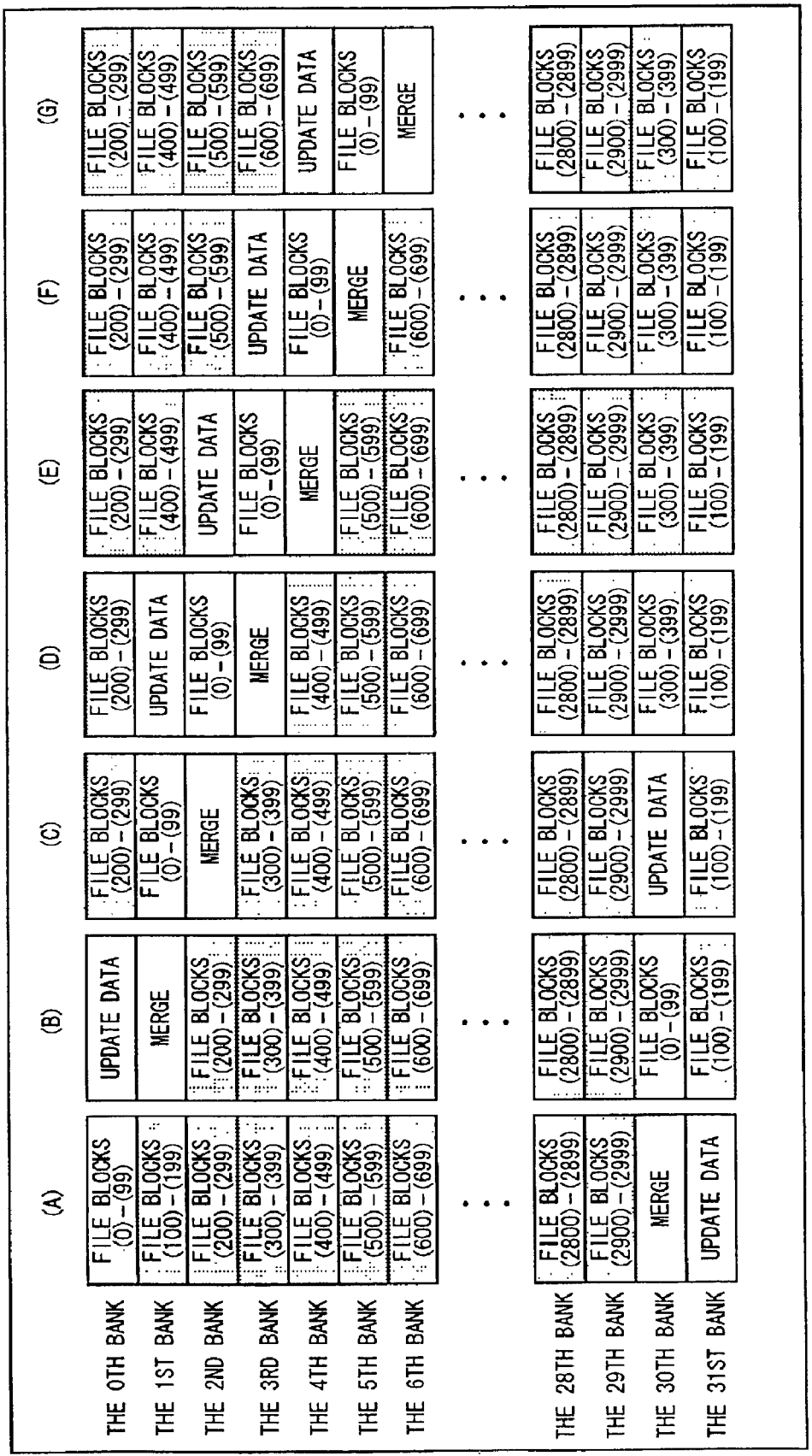
FIG. 41 illustrates the change of contents stored in banks by the process according to the fourth embodiment of the present invention.

The operation of the file system according to the present embodiment, based on the structure and flow chart as described above will be described with reference to FIGS. 40 and 41. In the description below, it is assumed that data is repeatedly written into file blocks included in the 0th bank, i.e. from file block (0) to file block (99).

As shown in FIG. 40, in the initial state, thirty banks from the 0th bank to the 29th bank are set as data bank 2100, whereas the 30th bank is set as merge bank 2200 and the 31st bank as update data bank 2300. All entries within update data bank 2300 are free. All entries within cache area 3100 of RAM 3000 are free. This is shown in FIG. 41(A). The shaded banks indicate that all file blocks included in those banks are unused.

Starting with such an initial state, data is repeatedly written into file blocks (0) to (99). As the update data bank becomes full, a merge process is executed.

Data is copied from the 31st bank which is an update data bank and the 0th bank which is a data bank, to the 30th bank which is a merge bank. The 30th bank is set as a new data bank (for storing file blocks (0) to (99)). The 0th bank which was a data bank is erased to be set as a new merge bank. The 0th bank is set as a new update data bank, and the 31st bank that was the old update data bank is erased. As the first bank is unused, the 31st bank which is the old update data bank is set as a new data bank (for storing file blocks (100) to (199)). The first bank is erased to be set as a new merge bank. This is shown in FIG. 41(B).

Further, from here, data is repeatedly written into file blocks (0) to (99). As the update data bank becomes full, a merge process is executed.

Data is copied from the 0th bank which is an update data bank and the 30th bank which is a data bank, to the first bank which is a merge bank. The first bank is set as a new data bank (for storing file blocks (0) to (99)). The 30th bank which was a data bank is erased to be set as a new merge bank. The 30th bank is set as a new update data bank, and the 0th bank that was the old update data bank is erased. As the second bank is unused, the 0th bank which is the old update data bank is set as a new data bank (for storing file blocks (200) to (299)). The second bank is erased to be set as a new merge bank. This is shown in FIG. 41(C).

Furthermore, from here, data is repeatedly written into file blocks (0) to (99). As the update data bank becomes full, a merge process is executed.

Data is copied from the 30th bank which is an update data bank and the first bank which is a data bank, to the second bank which is a merge bank. The second bank is set as a new data bank (for storing file blocks (0) to (99)). The first bank that was a data bank is erased to be set as a new merge bank. The first bank is set as a new update data bank, and the 30th bank that was the old update data bank is erased. As the third bank is unused, the 30th bank that was the old update data bank is set as a new data bank (for storing file blocks (300) to (399)). The third bank is erased to be set as a new merge bank. This is shown in FIG. 41(D).

As described above, according to the file system of the present embodiment, such operations are repeated and the state of banks are changed as shown in FIGS. 41(E) to (G). This can avoid concentration of bank erasure onto the three banks, i.e. the 0th bank, the 30th bank and the 31st bank. Banks used can be switched as appropriate, allowing disconcentration of bank erasing operation and thereby avoiding certain banks in a flash memory having shorter life.

Fifth Embodiment

The file system according to the present embodiment executes a writing process different from that executed in the first embodiment described earlier. The other parts of the hardware configuration and flow charts except for the process steps described below are the same as those in the first embodiment. Therefore, detailed description thereof will not be repeated here.

Figure 42:
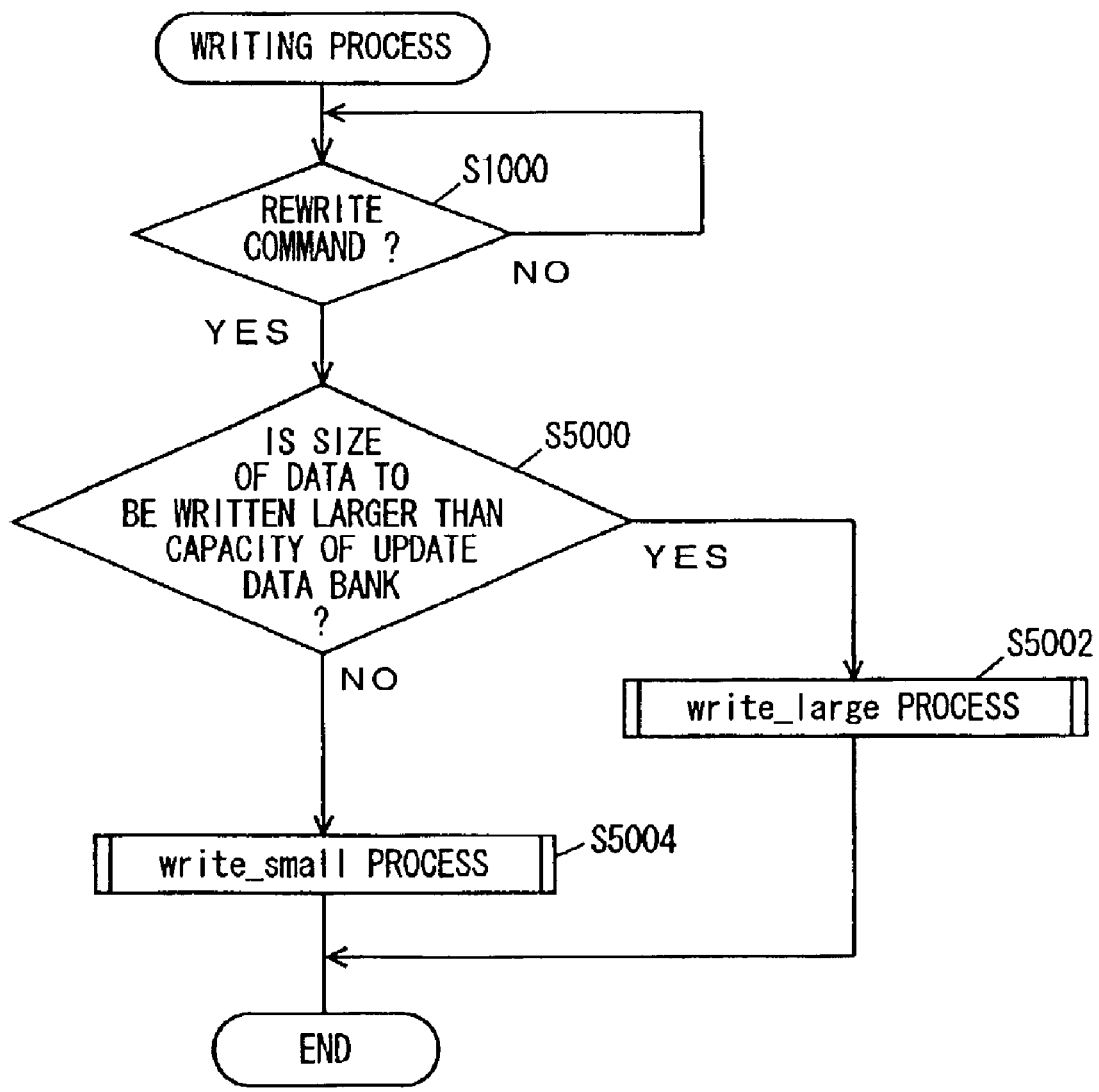
FIG. 42 is a flow chart showing the procedure of controlling a write process according to the fifth embodiment of the present invention.

Referring to FIG. 42, the control structure of the writing process executed in the file system according to the present embodiment is described. It is noted that the process steps in FIG. 42 that are the same as the ones in FIGS. 12A and 12B are denoted by the same step numbers. The processes thereof are also the same. Therefore, detailed description thereof will not be repeated here.

At S5000, CPU 1200 determines whether or not the size of data to be written is larger than the capacity of the update data bank. If the size of the data to be written is larger than the capacity of the update data bank (YES at S5000), the process goes on to S5002. If not (NO at S5000), the process goes on to S5004.

At S5002, CPU 1200 executes a write_large process. The write_large process will be described later in detail.

At S5004, CPU 1200 executes a write_small process. The write_small process will be described later in detail.

Figure 43A:
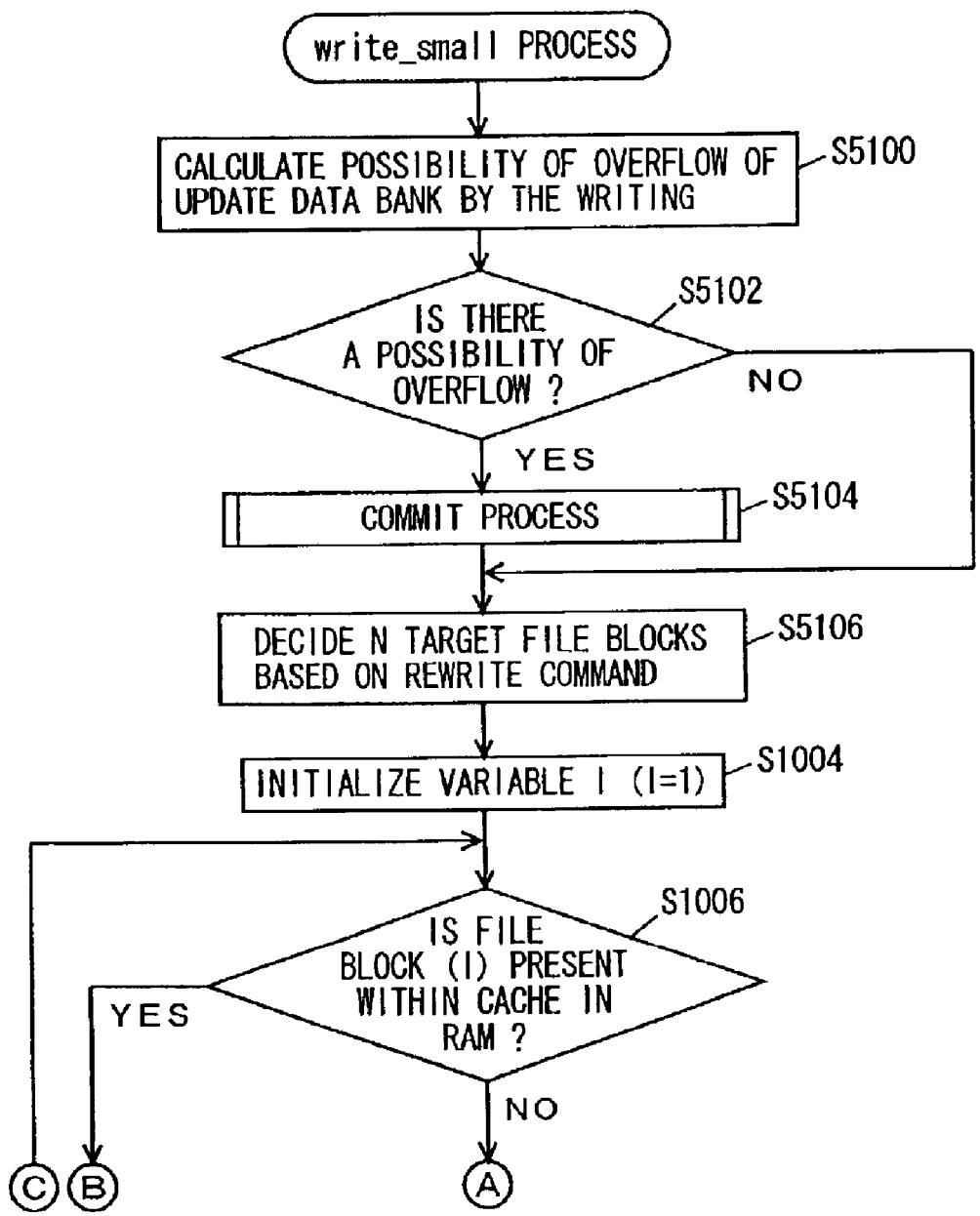
FIGS. 43A and 43B are flow charts showing the procedure of controlling a write_small process according to the fifth embodiment of the present invention.
Figure 43B:
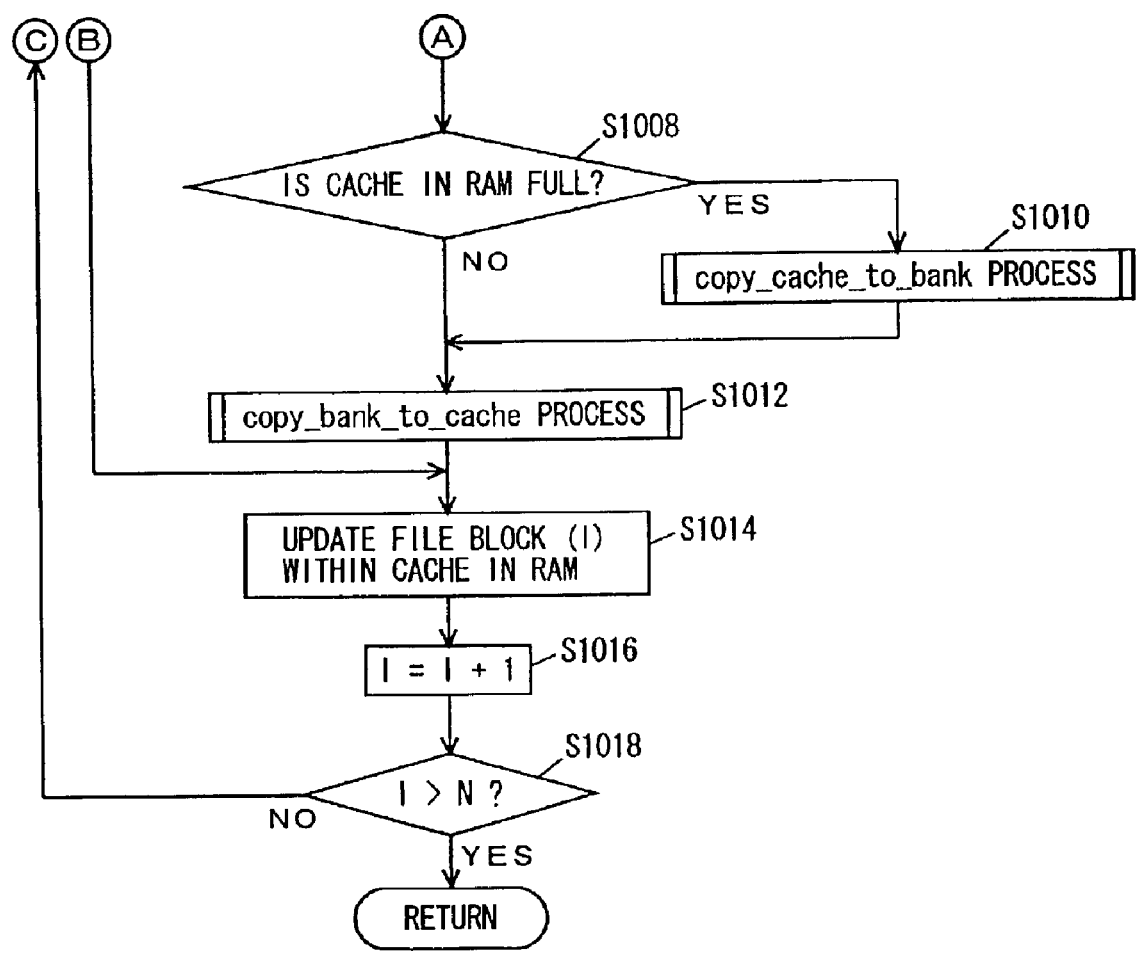

Referring to FIGS. 43A and 43B, the control structure of the write_small process executed in the file system according to the present embodiment is described. It is noted that the process steps shown in FIGS. 43A and 43B that are the same as the ones in FIGS. 12A and 12B are denoted by the same step numbers. The processes thereof are also the same. Therefore, detailed description thereof will not be repeated here.

At S5100, CPU 1200 calculates the possibility that the writing shown in FIG. 42 causes overflow of the update data bank. At S5102, CPU 1200 determines whether or not there is a possibility of overflow of the update data bank by the writing. If there is a possibility of overflow (YES at S5102), the process goes on to S5104. If not (NO at S5102), the process goes on to S5106.

At S5104, CPU 1200 executes a commit process. The commit process is the same as that described in the first embodiment. Therefore, detailed description of the commit process will not be repeated.

At S5106, CPU 1200 decides N target file blocks based on a rewrite command. Subsequently, the process goes on to S1004 through S1018.

Figure 44A:
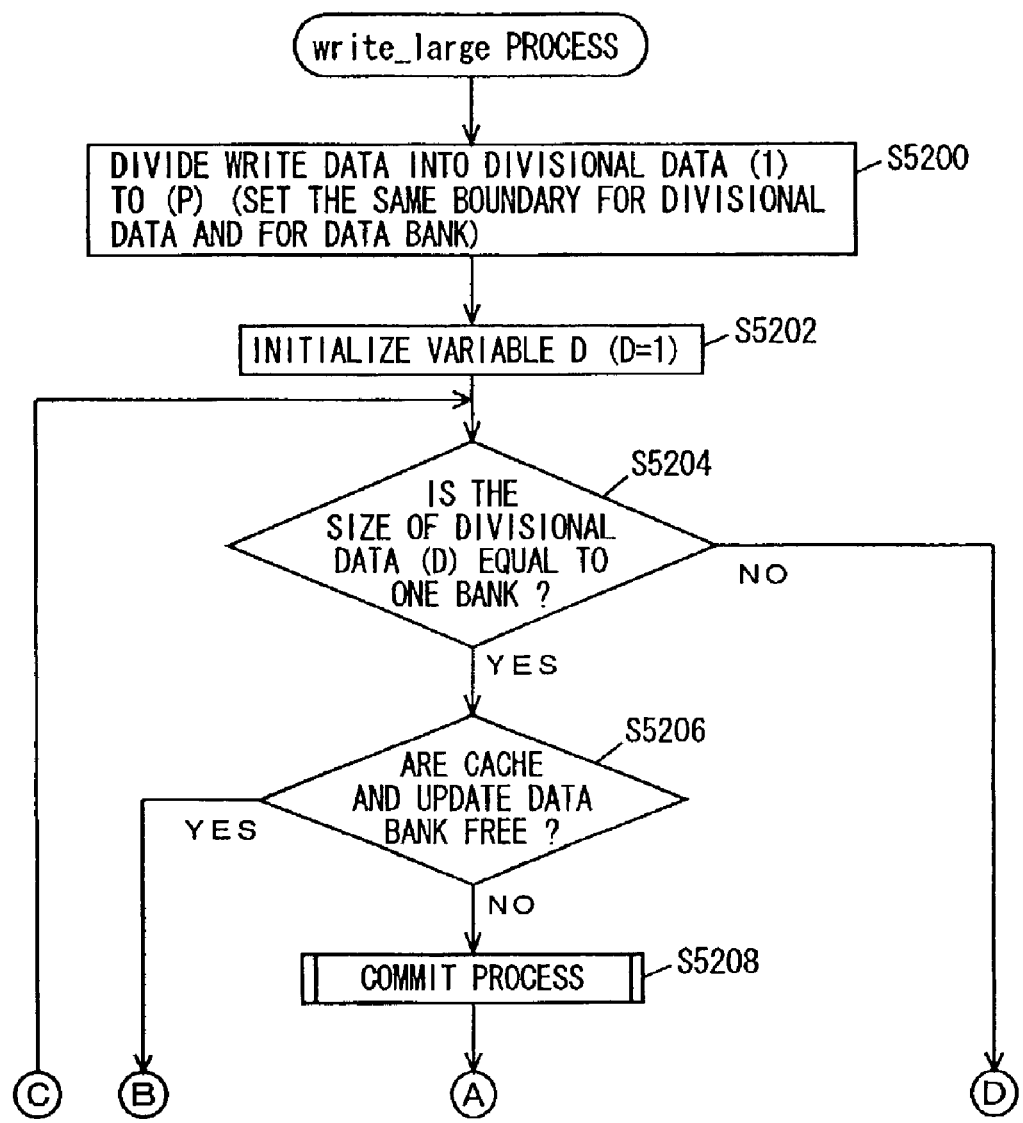
FIGS. 44A and 44B are flow charts showing the procedure of controlling a write_large process according to the fifth embodiment of the present invention.
Figure 44B:
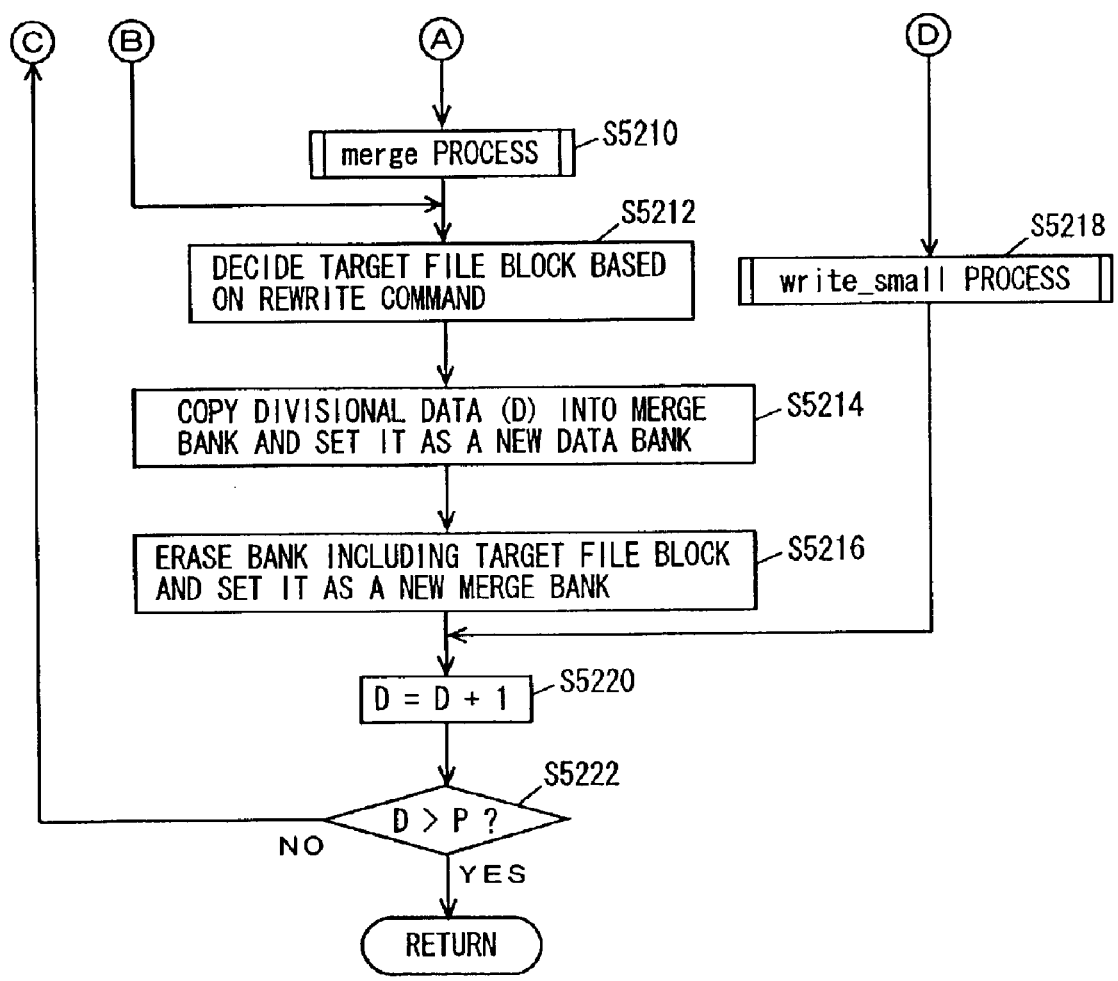

Referring to FIGS. 44A and 44B, the control structure of the write_large process executed in the file system according to the present embodiment is described.

At S5200, CPU 1200 divides write data into divisional data (1) to (P). Here, the boundary of the divisional data is made to correspond to that of the data bank. At S5202, CPU 1200 initializes a variable D (D=1). At S5204, CPU 1200 determines whether or not the size of the divisional data (D) is equal to that of one bank. If the size of divisional data (D) is equal to that of one bank (YES at S5204), the process goes on to S5206. If not (NO at S5204), the process goes on to S5218.

At S5206, CPU 1200 determines whether or not the cache and the update data bank are free. If the cache and the update data bank are free (YES at S5206), the process goes on to S5212. If not (NO at S5206), the process goes on to S5208.

At S5208, CPU 1200 executes a commit process. The commit process is the same as that in the first embodiment described earlier. Therefore, details of the commit process will not be repeated here.

At S5210, CPU 1200 executes a merge process. The merge process is the same as the merge process in the first embodiment described earlier. Therefore, description of the merge process will not be repeated here.

At S5212, CPU 1200 decides a target file block, based on a rewrite command. At S5214, CPU 1200 copies divisional (D) to the merge bank, which is set as a new data bank.

At S5216, CPU 1200 erases a bank including the target file block, to set that bank as a new merge bank.

At S5218, CPU 1200 executes a write_small process.

At S5220, CPU 1200 adds 1 to variable D. At S5222, CPU 1200 determines whether or not variable D is greater than the number of divisional data P. If variable D is greater than the number of the divisional data P (YES at S5222), the write_large process is terminated. If not (NO at S5222), the process goes back to S5204.

The operation of the file system according to the present embodiment, based on the structure and flow charts described above, will be described with reference to FIGS. 45 to 51. In the description below, as shown in FIG. 45, it is assumed that data writing is performed for 231 blocks, i.e., from file blocks (150) to (380), in response to one data rewrite command.

Figure 45:
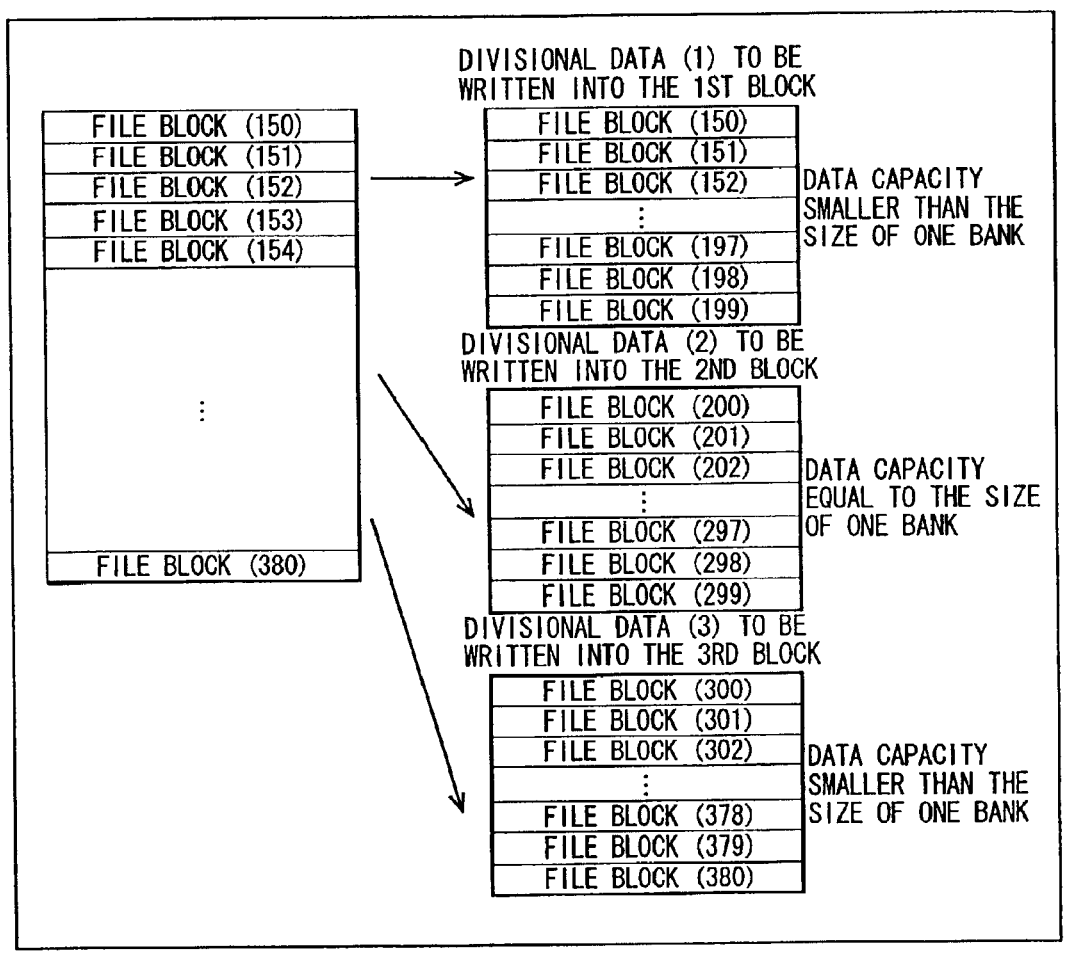
FIG. 45 shows the structure of files to which data is to be written in the fifth embodiment of the present invention.

As shown in FIG. 45, the 231 blocks are divided into three divisional data (divisional data (1), divisional data (2) and divisional data (3)). The divided data do not spread across a plurality of banks. Divisional data (1) to be written into the first bank includes data of file blocks (150) to (199), the capacity of which being smaller than the data capacity of one bank. Divisional data (2) to be written into the second bank includes data of file blocks (200) to (299), the capacity of which being equal to the data capacity of one bank. Divisional data (3) to be written into the third bank includes data of file blocks (300) to (380), the capacity of which being smaller than the data capacity of one bank. The operation proceeds in the ascending order of circled numbers in FIGS. 46 to 51. The number at the head of each paragraph below corresponds to each of the circled numbers.

Figure 46:
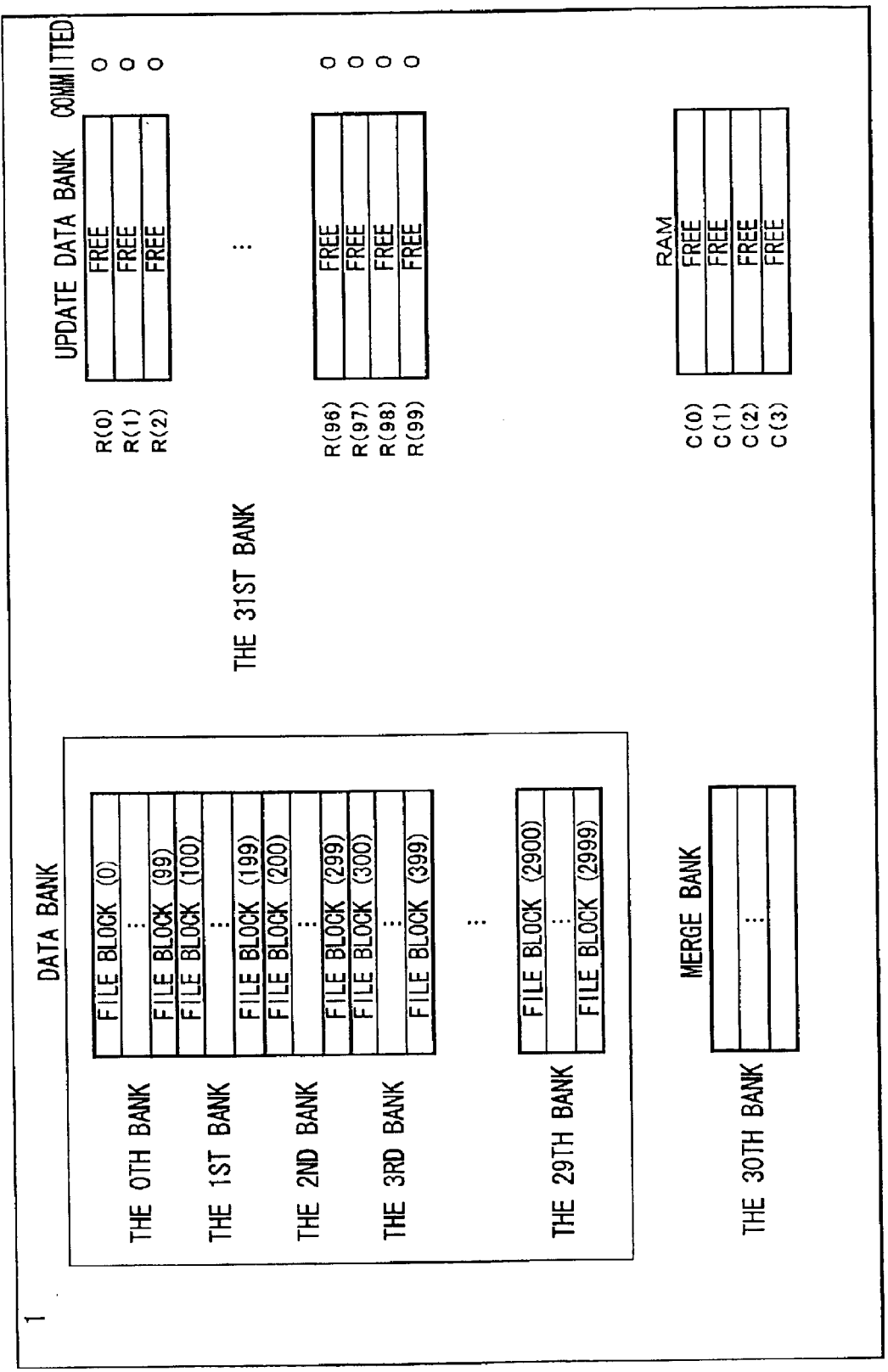
Figure 47:
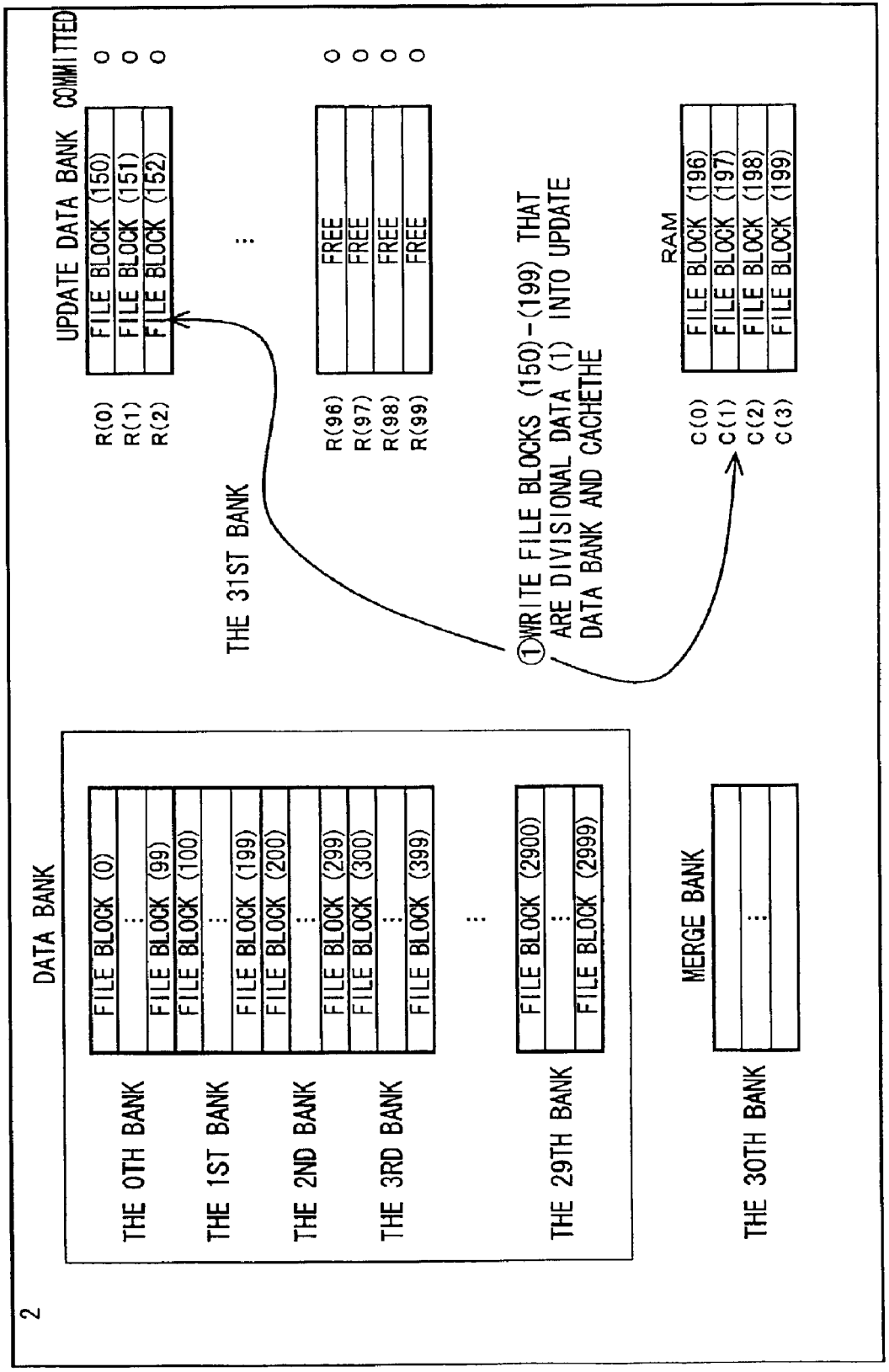
Figure 48:
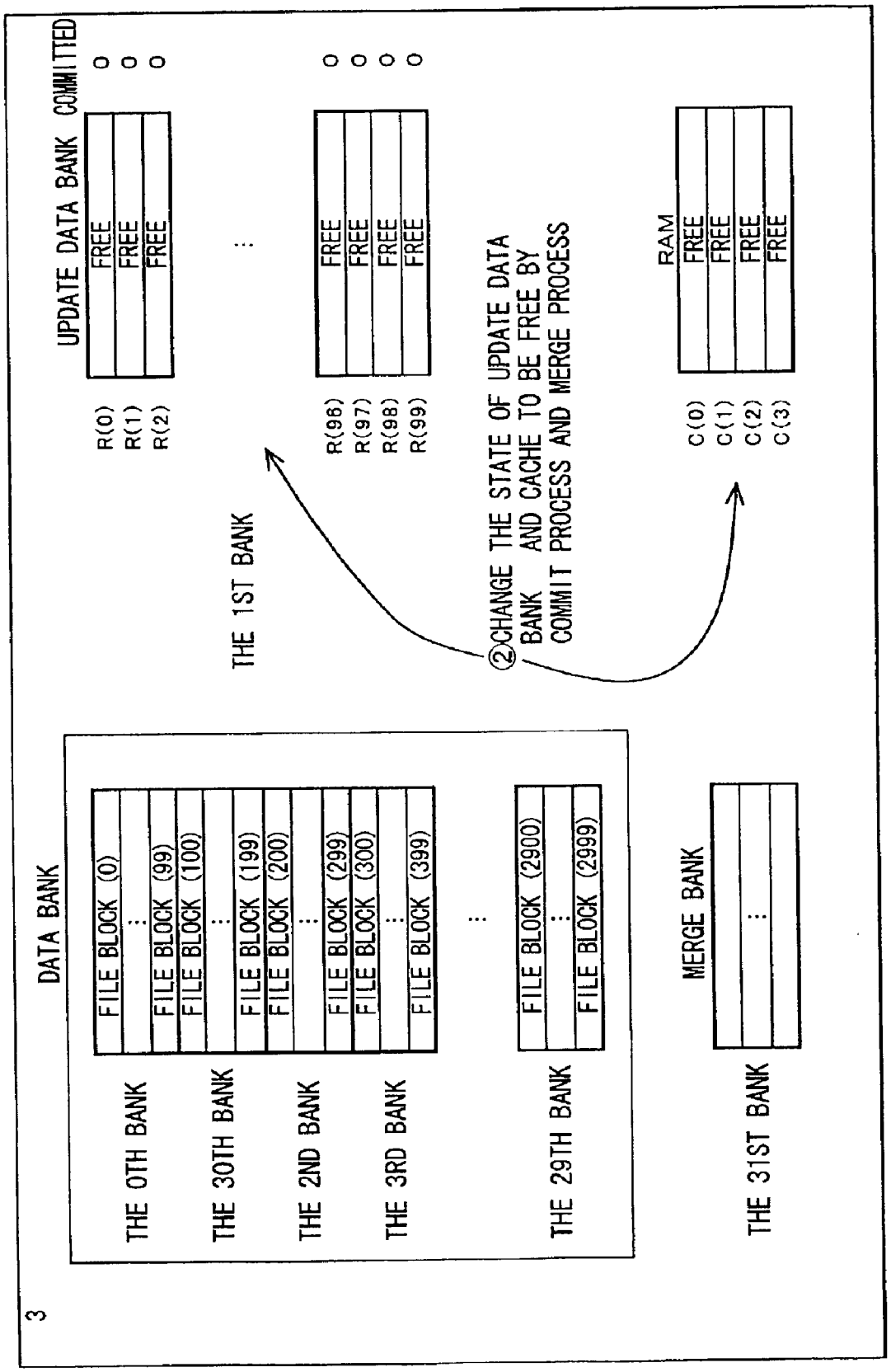
Figure 49:
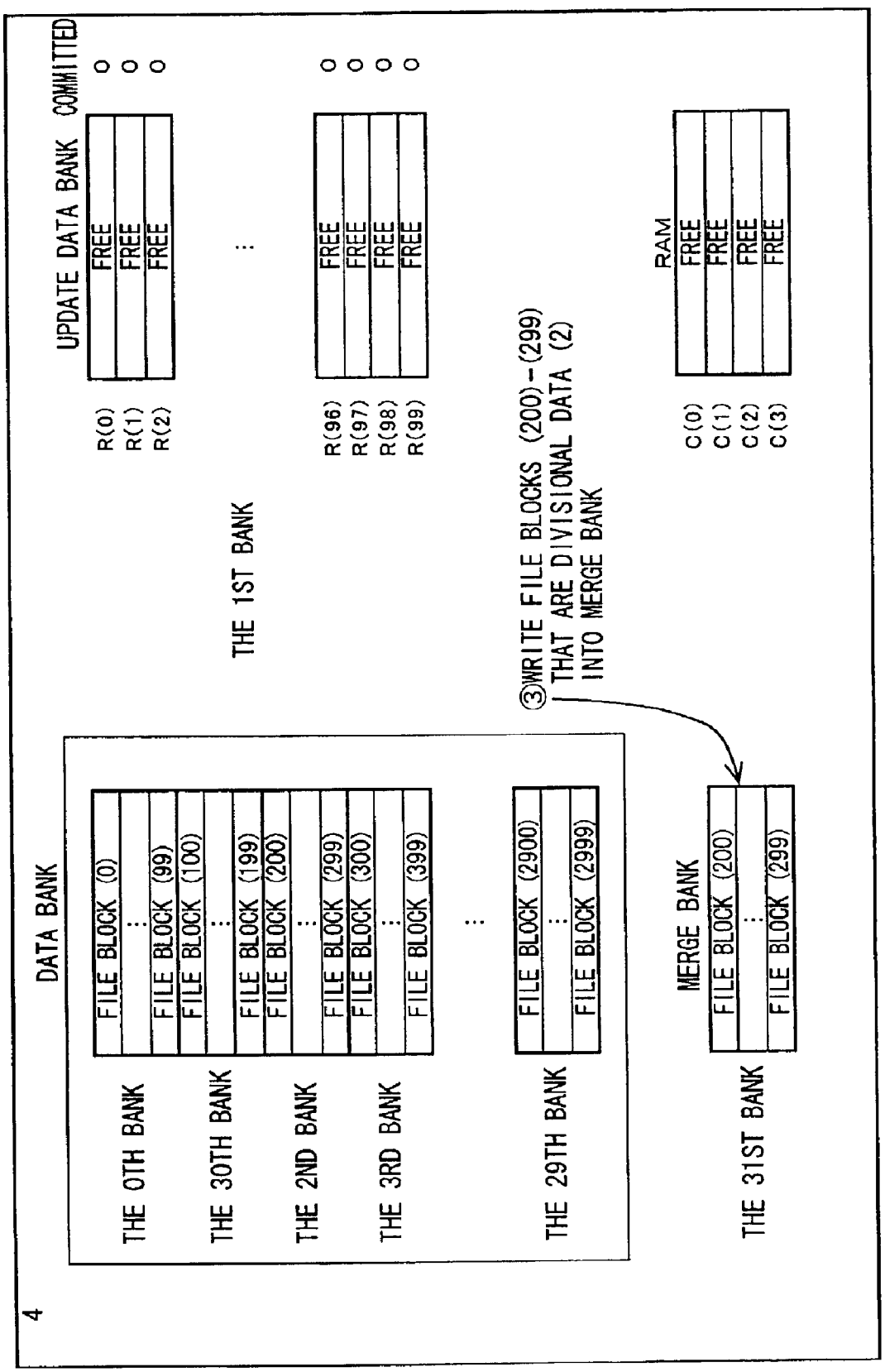
Figure 50:
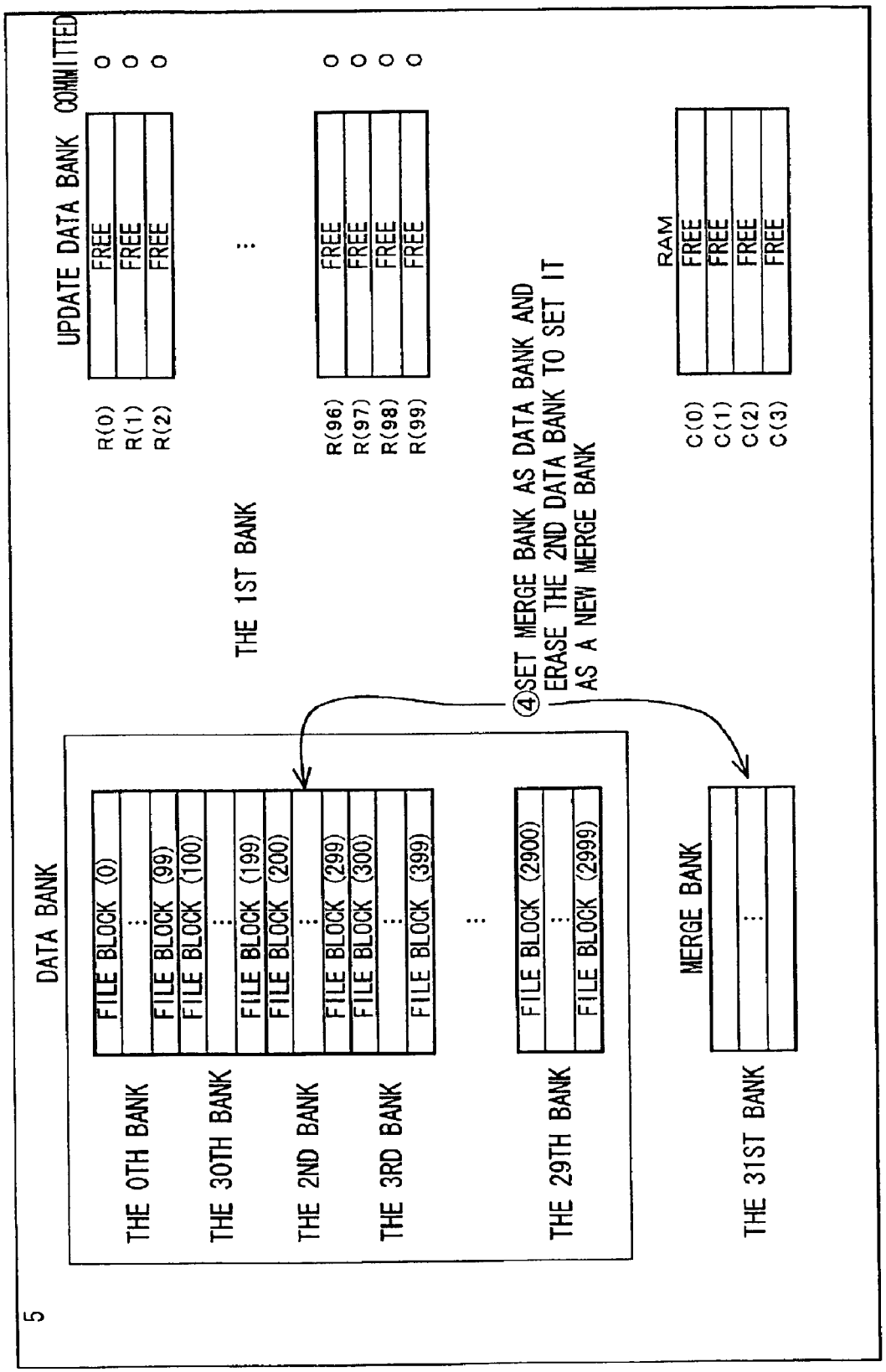

As shown in FIG. 46, in the initial state, thirty banks from the 0th bank to the 29th bank are set as data bank 2100, whereas the 30th bank is set as merge bank 2200 and the 31st bank is set as update data bank 2300. All entries in update data bank 2300 are free. All entries in cache area 3100 of RAM 3000 are free.

1) File blocks (150) to (199) that are divisional data (1) are written into update data bank 2300 and into cache area 3100 of RAM 3000. Here, all entries in update data bank 2300 are free, and writing of divisional data (1) that is smaller than the capacity of one bank would not fill up the update data bank, so that no commit process is executed. At this time point, data of file blocks (150) to (195) are stored in update data bank 2300, and data of file blocks (196) to (199) are stored in cache area 3100 of RAM 3000.

2) Before writing divisional data (2), a commit process and a merge process are executed, freeing up update data bank 2300 and cache area 3100 of RAM 3000.

3) File blocks (200) to (299), which are divisional data (2), are written into update data bank 2300 and cache area 3100 of RAM 3000. Here, the capacity of divisional data (2)

is the same as the capacity of one bank. Divisional data (2) is written into merge bank 2200, rather than update data bank 2300. At this time point, data of file blocks (200) to (299) are stored in merge bank 2200. Entries in update data bank 2300 and in cache area 3100 of RAM 3000 all remain free.

4) The merge bank storing divisional data (2) is set as a new data bank (for storing file blocks (200) to (299)), while the second bank is erased to be set as a new merge bank.

5) File blocks (300) to (380), which are divisional data (3), are written into update data bank 2300 and cache area 3100 of RAM 3000. Here, all entries in update data bank 2300 are free, and writing of divisional data (3) that is smaller than the capacity of one bank would not fill up the update data bank, so that no commit process is executed. At this time point, data of file blocks (300) to (376) are stored in update data bank 2300, and data of file blocks (377) to (380) are stored in cache area 3100 of RAM 3000.

As described above, according to the file system of the present embodiment, a merge process is executed only when consistency of the file system is secured, so that secured consistency of the entire file system can be reproduced even if unexpected power shut-off occurs during data writing. Moreover, when the capacity of data to be written is the same as the capacity of a bank, the data is written into the merge bank without going through the update data bank, reducing the number of bank erasures.

Sixth Embodiment

The file system according to the present embodiment executes a merge process different from that executed in the first embodiment described earlier. The other parts of the hardware configuration and the flow charts except for the process steps indicated below are the same as those in the first embodiment. Therefore, detailed description thereof will not be repeated here.

Figure 52A:
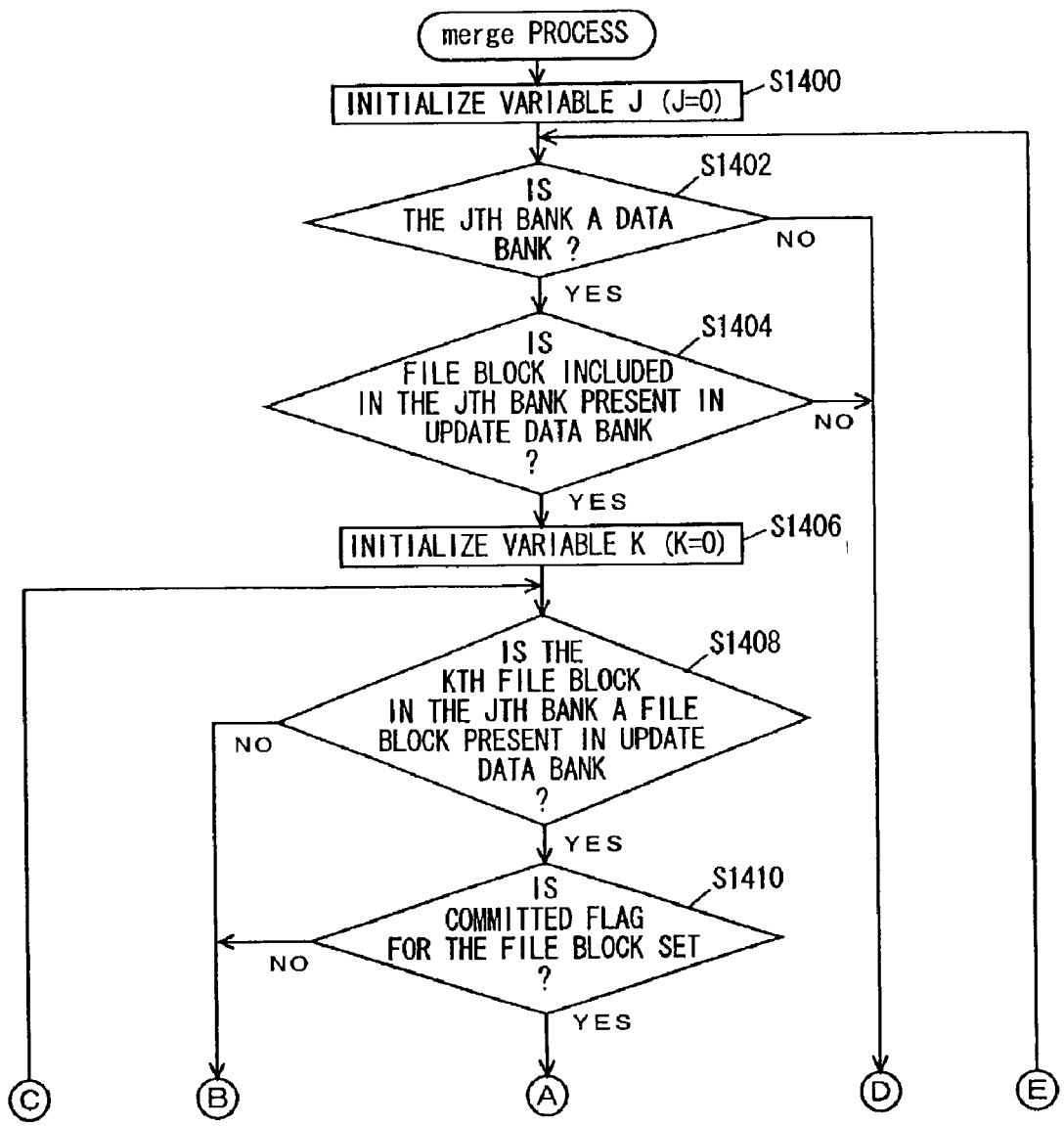
FIGS. 52A and 52B are flow charts showing the procedure of controlling a merge process according to the sixth embodiment of the present invention.
Figure 52B:
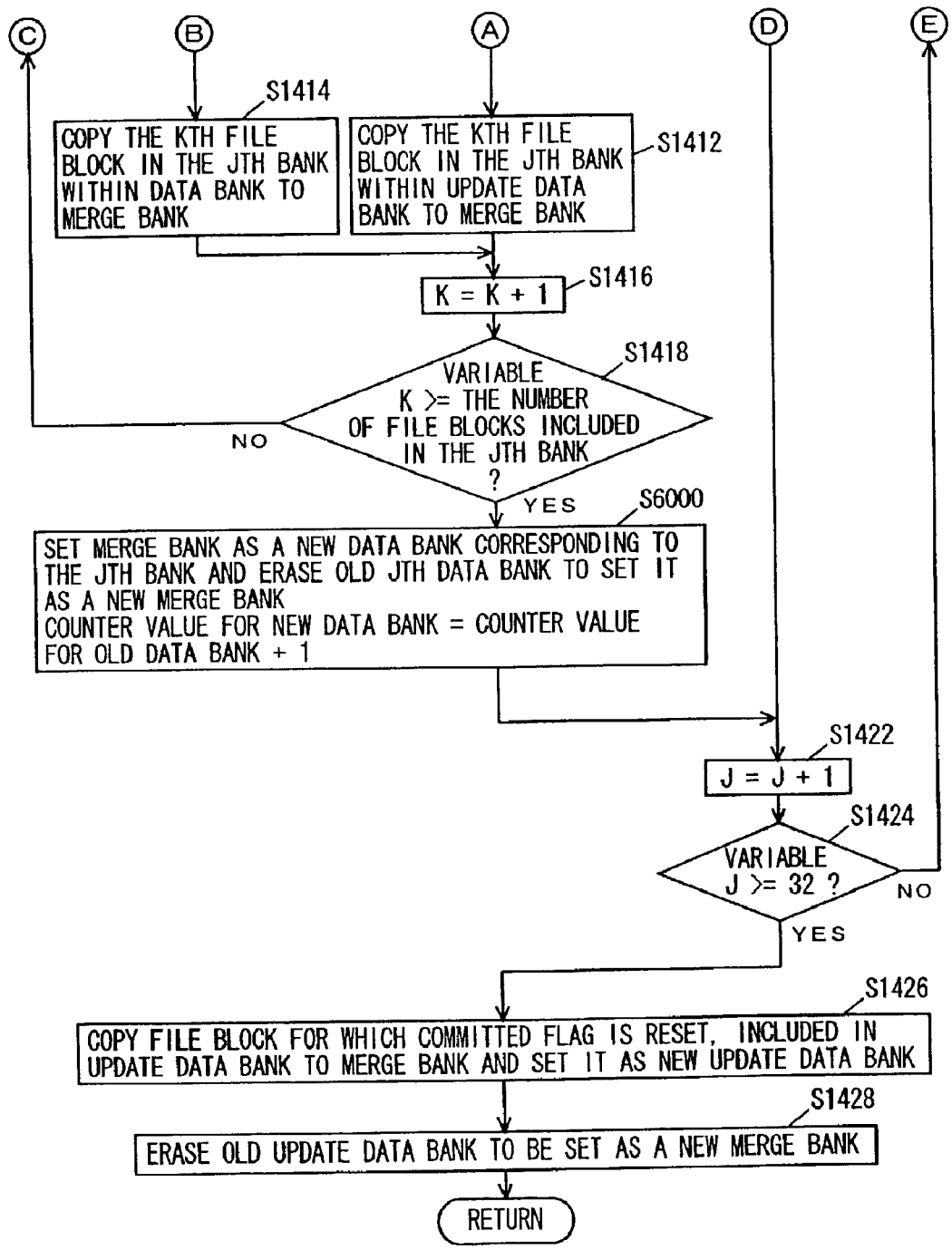

Referring to FIGS. 52A and 52B, the control structure of the merge process executed in the file system according to the present embodiment is described. It is noted that the process steps in FIGS. 52A and 52B that are the same as the ones shown in FIGS. 16A and 16B are denoted by the same step numbers. The processes thereof are also the same. Therefore, detailed description thereof will not be repeated here.

At S6000, CPU 1200 sets a merge bank as a new data bank corresponding to the Jth bank, and erases the old Jth bank to be set as a new merge bank. Here, a counter value for the new data bank is obtained by adding 1 to the counter value for the old data bank.

The operation of the file system according to the present embodiment, based on the structure and flow charts as described above, will be described with reference to FIG. 53. In the description below, it is assumed that the data is repeatedly written into file blocks included in the first bank, i.e. file block (0) to file block (99).

As shown in FIG. 53(A), in the initial state, thirty banks from the 0th bank to the 29th bank are set as data bank 2100, whereas the 30th bank is set as merge bank 2200 and the 31st bank is set as update data bank 2300. All entries in update data bank 2300 are free. It is assumed that all entries in cache area 3100 of RAM 3000 are free.

Data is repeatedly written into file blocks (0) to (99). As the update data bank becomes full, a merge process is executed.

Data is copied from the 31st bank which is an update data bank and the 0th bank which is a data bank, to the 30th bank which is a merge bank. Here, a value obtained by adding 1 to the count value for the 0th bank (=0) is set as the 30th counter value (=1). The 30th bank is set as a new data bank (for storing file blocks (0) to (99)). This is shown in FIG. 53(B).

At this time point, if the power is shut off, among the two banks (the 0th bank and the 30th bank) storing file blocks (0) to (99), the one with a larger counter value is determined as a bank in which more recent data is stored.

The 0th bank which was a data bank is erased to be set as a new merge bank. The 0th bank is set as a new update data bank, and the 31st bank which was the old update data bank is erased. The 31st bank is set as a new merge bank. This is shown in FIG. 53(C).

Further, data is repeatedly written into file blocks (0) to (99). As the update data bank becomes full, a merge process is executed.

Data is copied from the 0th bank which is an update data bank and the 30th bank which is a data bank to the 31st bank which is a merge bank. Here, a value obtained by adding 1 to the count value for the 30th bank (=1) is set as the 31st counter value (=2). The 31st bank is set as a new data bank (for storing file blocks (0) to (99)).

The 30th bank that was a data bank is erased to be set as a new merge bank. The 30th bank is set as a new update data bank, and the 0th bank that was the old update data bank is erased. The 0th bank is set as a new merge bank. This is shown in FIG. 53(D).

As described above, according to the file system of the present embodiment, even if the power-supply is shut off during the merge process, secured consistency of the entire file system can be reproduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A file system including a non-volatile semiconductor memory device having a plurality of banks, each of said banks including a plurality of blocks, said non-volatile semiconductor memory device being erasable by said bank, said plurality of banks being divided into at least one update data bank, at least one merge bank and a data bank, said file system comprising:

an update data storage unit for storing update data corresponding to a data rewrite command into said update data bank;

a latest data selection unit for selecting, when a predetermined first condition is satisfied, latest update data for each block from the update data stored in said update data bank; and a processing unit for processing said selected latest update data, said processing unit including a first merge data storage unit for storing said selected latest update data into a first block in said merge bank, an associated data selection unit for selecting data associated with said latest update data from said data bank, a second merge data storage unit for storing said selected data into a second block in said merge bank, and a setting unit for setting the merge bank storing said latest update data and the data associated with said latest update data as a new data bank.

2. The file system according to claim 1, wherein said first condition is a condition in which there is no free block in said update data bank.

3. The file system according to claim 1, further comprising a volatile semiconductor memory device storing at least two blocks, wherein said update data storage unit includes a unit for storing data before update into a block in said volatile semiconductor memory device, a unit for selecting a block storing data corresponding to a data rewrite command, from the blocks in said volatile semiconductor memory device, a unit for updating said data before update stored in said selected block, and a unit for storing said updated data into said update data bank.

4. The file system according to claim 1, further comprising:

an extraction unit for extracting a bank in which all blocks are initialized, from a plurality of data banks; and a setting unit for setting the bank extracted by said extraction unit as said merge bank.

5. The file system according to claim 1, wherein said processing unit further includes an update data bank setting unit for initializing a data bank storing said associated data, to set the bank as a new update data bank, and a merge bank setting unit for initializing a bank which is said update data bank, to set the bank as a new merge bank.

6. The file system according to claim 5, wherein said processing unit further includes a creation unit for creating information indicating that said set data bank is a newest data bank.

7. The file system according to claim 1, further comprising:

a management information storage unit for storing, when a predetermined second condition is satisfied, management information related to data stored in said update data bank into said non-volatile semiconductor memory device; and an information storage unit for storing information indicating that said management information is stored, associated with said update data, for each block in said update data bank, in response to said management information being stored.

8. The file system according to claim 7, wherein said latest update data selection unit includes a unit for selecting update data which is latest update data for each block and is associated with information indicating that said management information is stored, from the update data stored in said update data bank.

9. The file system according to claim 7, wherein said update data bank setting unit includes a unit for initializing a bank storing said associated data, storing update data which is associated with no information indicating that said management information is stored, into said initialized bank, and setting the bank as a new update data bank.

10. The file system according to claim 7, wherein said second condition is a condition in which updating of a plurality of blocks corresponding to a data rewrite command is terminated.

11. The file system according to claim 7, wherein said second condition is a condition in which there is no free block in said update data bank.

12. The file system according to claim 7, further comprising a dividing unit for dividing data to be written, when a capacity of the data to be written is larger than a size of an update data bank, into data each having a capacity at most the size of the update data bank, said second condition being a condition in which said divided data is written.

13. The file system according to claim 7, further comprising:

a dividing unit for dividing data to be written, when a capacity of the data to be written is larger than a size of an update data bank, into data each having a capacity equal to a size of a merge bank; and a unit for storing said divided data into the merge bank.

14. A file system, including a non-volatile semiconductor memory device having a plurality of banks and a volatile semiconductor memory device having a backup function, said volatile semiconductor device including at least one update data bank, each of said banks including a plurality of blocks, said non-volatile semiconductor memory device being erasable by said bank, the plurality of banks in said non-volatile semiconductor device being divided into at least one merge bank and a data bank, said file system comprising:

an update data storage unit for storing update data corresponding to a data rewrite command into said update data bank;

a latest update data selection unit for selecting, when a predetermined first condition is satisfied, latest update data for each block, from update data stored in the plurality of blocks included in said update data bank; and a processing unit for processing said selected latest update data, said processing unit including a first merge data storage unit for storing said selected latest update data into a first block in said merge bank, an associated data selection unit for selecting data associated with said latest update data from said data bank, a second merge data storage unit for storing said selected data into a second block in said merge bank, and a setting unit for setting a merge bank storing latest update data and the data associated with said latest update data as a new data bank.

15. The file system according to claim 14, wherein said first condition is a condition in which there is no free block in said update data bank.

* * * * *